(12) United States Patent
Hazard et al.

(10) Patent No.: US 11,640,561 B2
(45) Date of Patent: May 2, 2023

(54) DATASET QUALITY FOR SYNTHETIC DATA GENERATION IN COMPUTER-BASED REASONING SYSTEMS

(71) Applicant: Diveplane Corporation, Raleigh, NC (US)

(72) Inventors: Christopher James Hazard, Raleigh, NC (US); Jacob David Beel, Raleigh, NC (US); Yash Shah, Raleigh, NC (US); Ravisutha Sakrepatna Srinivasamurthy, Raleigh, NC (US); Michael Resnick, Raleigh, NC (US)

(73) Assignee: Diveplane Corporation, Raleigh, NC (US)

( * ) Notice: Subject to any disclaimer, the term of this patent is extended or adjusted under 35 U.S.C. 154(b) by 0 days.

(21) Appl. No.: 17/333,671

(22) Filed: May 28, 2021

(65) Prior Publication Data
US 2021/0326652 A1 Oct. 21, 2021

Related U.S. Application Data

(63) Continuation-in-part of application No. 17/038,955, filed on Sep. 30, 2020, which is a continuation-in-part
(Continued)

(51) Int. Cl.
*G06F 15/16* (2006.01)
*G06K 9/62* (2022.01)
(Continued)

(52) U.S. Cl.
CPC ....... *G06K 9/6257* (2013.01); *G06F 21/6254* (2013.01); *G06K 9/6264* (2013.01); *G06N 5/045* (2013.01); *G06N 20/00* (2019.01)

(58) Field of Classification Search
CPC .... G06K 9/6257; G06K 9/6264; G06N 20/00; G06N 5/045; G06F 21/6254
(Continued)

(56) References Cited

U.S. PATENT DOCUMENTS

| 4,935,877 A | 6/1990 | Koza |
| 5,581,664 A | 12/1996 | Allen et al. |

(Continued)

FOREIGN PATENT DOCUMENTS

| WO | WO2017057528 | 4/2017 |
| WO | WO2017189859 | 11/2017 |

OTHER PUBLICATIONS

International Prelimiary Report on Patentability for Application No. PCT/US2019/066321, dated Jun. 24, 2021, 12 pages.
(Continued)

*Primary Examiner* — Moustafa M Meky
(74) *Attorney, Agent, or Firm* — Dority & Manning, P.A.

(57) ABSTRACT

Techniques for synthetic data generation in computer-based reasoning systems are discussed and include receiving a request for generation of synthetic data based on a set of training data cases. One or more focal training data cases are determined. For undetermined features (either all of them or those that are not subject to conditions), a value for the feature is determined based on the focal cases. In some embodiments, the generated synthetic data may be checked for similarity against the training data, and if similarity conditions are met, it may be modified (e.g., resampled), removed, and/or replaced.

20 Claims, 9 Drawing Sheets

Related U.S. Application Data of application No. 17/006,144, filed on Aug. 28, 2020, which is a continuation-in-part of application No. 16/713,714, filed on Dec. 13, 2019.

(60) Provisional application No. 63/179,916, filed on Apr. 26, 2021, provisional application No. 63/168,521, filed on Mar. 31, 2021, provisional application No. 63/036,741, filed on Jun. 9, 2020, provisional application No. 63/024,152, filed on May 13, 2020.

(51) Int. Cl.
*G06N 5/045* (2023.01)
*G06N 20/00* (2019.01)
*G06F 21/62* (2013.01)

(58) Field of Classification Search
USPC .......................................................... 709/200
See application file for complete search history.

(56) References Cited

U.S. PATENT DOCUMENTS

| | | | |
|---|---|---|---|
| 6,282,527 | B1 | 8/2001 | Gounares et al. |
| 6,741,972 | B1 | 5/2004 | Girardi et al. |
| 7,873,587 | B2 | 1/2011 | Baum |
| 9,443,194 | B2 | 9/2016 | Chu et al. |
| 9,489,635 | B1 | 11/2016 | Zhu |
| 9,922,286 | B1 | 3/2018 | Hazard |
| 10,382,799 | B1* | 8/2019 | Walters ............... G06Q 10/04 |
| 10,459,444 | B1 | 10/2019 | Kentlev-Klay |
| 10,460,235 | B1* | 10/2019 | Truong ............... G06F 11/3636 |
| 10,592,386 | B2* | 3/2020 | Walters ............... G06F 9/541 |
| 10,599,957 | B2* | 3/2020 | Walters ............... G06F 40/166 |
| 10,664,381 | B2* | 5/2020 | Walters ............... G06N 3/088 |
| 10,559,299 | B1 | 11/2020 | Arel et al. |
| 10,884,894 | B2* | 1/2021 | Walters ............... G06K 9/6265 |
| 11,032,585 | B2* | 6/2021 | Walters ............... G06K 9/6257 |
| 11,256,555 | B2* | 2/2022 | Goodsitt ............... G06V 30/1985 |
| 2001/0049595 | A1 | 12/2001 | Plumer et al. |
| 2004/0019851 | A1 | 1/2004 | Purvis et al. |
| 2005/0137992 | A1 | 6/2005 | Polak |
| 2006/0195204 | A1 | 8/2006 | Bonabeau et al. |
| 2008/0153098 | A1 | 6/2008 | Rimm et al. |
| 2008/0307399 | A1 | 12/2008 | Zhou et al. |
| 2009/0006299 | A1 | 1/2009 | Baum |
| 2009/0144704 | A1 | 6/2009 | Niggemann et al. |
| 2010/0106603 | A1 | 4/2010 | Dey et al. |
| 2010/0287507 | A1 | 11/2010 | Paquette et al. |
| 2011/0060895 | A1 | 3/2011 | Solomon |
| 2011/0161264 | A1 | 6/2011 | Cantin |
| 2011/0225564 | A1 | 9/2011 | Biswas et al. |
| 2013/0006901 | A1 | 1/2013 | Cantin |
| 2013/0339365 | A1 | 12/2013 | Balasubramanian et al. |
| 2014/0108314 | A1 | 4/2014 | Chen et al. |
| 2014/0200930 | A1 | 7/2014 | Zizzamia et al. |
| 2016/0055427 | A1 | 2/2016 | Adjaoute |
| 2017/0010106 | A1 | 1/2017 | Shashua et al. |
| 2017/0012772 | A1 | 1/2017 | Mueller |
| 2017/0053211 | A1 | 2/2017 | Heo et al. |
| 2017/0091645 | A1 | 3/2017 | Matus |
| 2017/0161640 | A1 | 6/2017 | Shamir |
| 2017/0236060 | A1 | 8/2017 | Ignatyev |
| 2018/0018533 | A1 | 1/2018 | Taranta, II et al. |
| 2018/0018590 | A1 | 1/2018 | Szeto et al. |
| 2018/0072323 | A1 | 3/2018 | Gordon et al. |
| 2018/0089563 | A1 | 3/2018 | Redding et al. |
| 2018/0235649 | A1 | 8/2018 | Elkadi |
| 2018/0336018 | A1 | 11/2018 | Lu et al. |
| 2019/0147331 | A1 | 5/2019 | Arditi |
| 2019/0205667 | A1 | 7/2019 | Avidan et al. |
| 2019/0327501 | A1* | 10/2019 | Walters ............... G06N 3/04 |
| 2020/0012662 | A1 | 1/2020 | Walters et al. |
| 2020/0012900 | A1* | 1/2020 | Walters ............... G06N 3/0445 |
| 2020/0012935 | A1* | 1/2020 | Goodsitt ............... G06N 7/00 |
| 2020/0273569 | A1 | 8/2020 | Sharma et al. |
| 2021/0064018 | A1 | 3/2021 | Hazard et al. |
| 2021/0097343 | A1* | 4/2021 | Goodsitt ............... G06K 9/6257 |
| 2021/0150684 | A1* | 5/2021 | Elmoznino ............... G06T 5/50 |
| 2021/0365305 | A1 | 11/2021 | Walters et al. |

OTHER PUBLICATIONS

Abdi, "Cardinality Optimization Problems", The University of Birmingham, PhD Dissertation, May 2013, 197 pages.

Aboulnaga, "Generating Synthetic Complex-structured XML Data", Proceedings of the Fourth International Workshop on the Web and Databases, WebDB 2001, Santa Barbara, California, USA, May 24-25, 2001, 6 pages.

Abramson, "The Expected-Outcome Model of Two-Player Games", PhD Thesis, Columbia University, New York, New York, 1987, 125 pages.

Abuelaish et al., "Analysis and Modelling of Groundwater Salinity Dynamics in the Gaza Strip", Cuadernos Geograficos, vol. 57, Issue 2, pp. 72-91.

Agarwal et al., "Nearest-Neighbor Searching Under Uncertainty II", ACM Transactions on Algorithms, vol. 13, Issue 1, Article 3, 2016, 25 pages.

Aggarwal et al., "On the Surprising Behavior of Distance Metrics in High Dimensional Space", International Conference on Database Theory, London, United Kingdom, Jan. 4-6, 2001, pp. 420-434.

Akaike, "Information Theory and an Extension of the Maximum Likelihood Principle", Proceedings of the 2nd International Symposium on Information Theory, Sep. 2-8, 1971, Tsahkadsor, Armenia, pp. 267-281.

Alhaija, "Augmented Reality Meets Computer Vision: Efficient Data Generation for Urban Driving Scenes", arXiv: 1708.01566v1, Aug. 4, 2017, 12 pages.

Alpaydin, "Machine Learning: The New AI", MIT Press, Cambridge, Massachusetts, 2016, 225 pages.

Alpaydin, "Voting Over Multiple Condensed Nearest Neighbor", Artificial Intelligence Review, vol. 11, 1997, pp. 115-132.

Altman, "An Introduction to Kernel and Nearest-Neighbor Nonparametric Regression", The American Statistician, vol. 46, Issue 3, 1992, pp. 175-185.

Anderson, "Synthetic data generation for the internet of things," 2014 IEEE International Conference on Big Data (Big Data), Washington, DC, 2014, pp. 171-176.

Archer et al., "Empirical Characterization of Random Forest Variable Importance Measures", Computational Statistics & Data Analysis, vol. 52, 2008, pp. 2249-2260.

Beyer et al., "When is 'Nearest Neighbor' Meaningful?" International Conference on Database Theory, Springer, Jan. 10-12, 1999, Jerusalem, Israel, pp. 217-235.

Bull, Haploid-Diploid Evolutionary Algorithms: The Baldwin Effect and Recombination Nature's Way, Artificial Intelligence and Simulation of Behaviour Convention, Apr. 19-21, 2017, Bath, United Kingdom, pp. 91-94.

Cano et al., "Evolutionary Stratified Training Set Selection for Extracting Classification Rules with Tradeoff Precision-Interpretability" Data and Knowledge Engineering, vol. 60, 2007, pp. 90-108.

Chawla, "SMOTE: Synthetic Minority Over-sampling Technique", arXiv:1106.1813v1, Jun. 9, 2011, 37 pages.

Chen, "DropoutSeer: Visualizing Learning Patterns in Massive Open Online Courses for Dropout Reasoning and Prediction", 2016 IEEE Conference on Visual Analytics Science and Technology (VAST), Oct. 23-28, 2016, Baltimore, Maryland, USA, 10 pages.

Chomboon et al., An Empirical Study of Distance Metrics for k-Nearest Neighbor Algorithm, 3rd International Conference on Industrial Application Engineering, Kitakyushu, Japan, Mar. 28-31, 2015, pp. 280-285.

Colakoglu, "A Generalization of the Minkowski Distance and a New Definition of the Ellipse", arXiv:1903.09657v1, Mar. 2, 2019, 18 pages.

(56) References Cited

OTHER PUBLICATIONS

Dernoncourt, "MoocViz: A Large Scale, Open Access, Collaborative, Data Analytics Platform for MOOCs", NIPS 2013 Education Workshop, Nov. 1, 2013, Lake Tahoe, Utah, USA, 8 pages.
Ding, "Generating Synthetic Data for Neural Keyword-to-Question Models", arXiv:1807.05324v1, Jul. 18, 2018, 12 pages.
Dwork et al., "The Algorithmic Foundations of Differential Privacy", Foundations and Trends in Theoretical Computer Science, vol. 9, Nos. 3-4, 2014, pp. 211-407.
Efros et al., "Texture Synthesis by Non-Parametric Sampling", International Conference on Computer Vision, Sep. 20-25, 1999, Corfu, Greece, 6 pages.
Fathony, "Discrete Wasserstein Generative Adversarial Networks (DWGAN)", OpenReview.net, Feb. 18, 2018, 20 pages.
Ganegedara et al., "Self Organizing Map Based Region of Interest Labelling for Automated Defect Identification in Large Sewer Pipe Image Collections", IEEE World Congress on Computational Intelligence, Jun. 10-15, 2012, Brisbane, Australia, 8 pages.
Gao et al., "Efficient Estimation of Mutual Information for Strongly Dependent Variables", 18th International Conference on Artificial Intelligence and Statistics, San Diego, California, May 9-12, 2015, pp. 277-286.
Gehr et al., "AI2: Safety and Robustness Certification of Neural Networks with Abstract Interpretation", 39th IEEE Symposium on Security and Privacy, San Francisco, California, May 21-23, 2018, 16 pages.
Gemmeke et al., "Using Sparse Representations for Missing Data Imputation in Noise Robust Speech Recognition", European Signal Processing Conference, Lausanne, Switzerland, Aug. 25-29, 2008, 5 pages.
Ghosh, "Inferential Privacy Guarantees for Differentially Private Mechanisms", arXiv:1603:.01508v1, Mar. 4, 2016, 31 pages.
Goodfellow et al., "Deep Learning", 2016, 800 pages.
Google AI Blog, "The What-If Tool: Code-Free Probing of Machine Learning Models", Sep. 11, 2018, https://pair-code,github.io/what-if-tool. retrieved on Mar. 14, 2019, 5 pages.
Gottlieb et al., "Near-Optimal Sample Compression for Nearest Neighbors", Advances in Neural Information Processing Systems, Montreal, Canada, Dec. 8-13, 2014, 9 pages.
Gray, "Quickly Generating Billion-Record Synthetic Databases", SIGMOD '94: Proceedings of the 1994 ACM SIGMOD international conference on Management of data, May 1994, Minneapolis, Minnesota, USA, 29 pages.
Hastie et al., "The Elements of Statistical Learning", 2001, 764 pages.
Hazard et al, "Natively Interpretable Machine Learning and Artificial Intelligence: Preliminary Results and Future Directions", arXiv:1901v1, Jan. 2, 2019, 15 pages.
Hinneburg et al., "What is the Nearest Neighbor in High Dimensional Spaces?", 26th International Conference on Very Large Databases, Cairo, Egypt, Sep. 10-14, 2000, pp. 506-515.
Hmeidi et al., "Performance of KNN and SVM Classifiers on Full Word Arabic Articles", Advanced Engineering Informatics, vol. 22, Issue 1, 2008, pp. 106-111.
Hoag "A Parallel General-Purpose Synthetic Data Generator", ACM SIGMOID Record, vol. 6, Issue 1, Mar. 2007, 6 pages.
Houle et al., "Can Shared-Neighbor Distances Defeat the Curse of Dimensionality?", International Conference on Scientific and Statistical Database Management, Heidelberg, Germany, Jun. 31-Jul. 2, 2010, 18 pages.
Imbalanced-learn. "SMOTE", 2016-2017, https://imbalanced-learn.readthedocs.io/en/stable/generated/imbleam.over_sampling.SMOTE.html, retrieved on Aug. 11, 2020, 6 pages.
Indyk et al., "Approximate Nearest Neighbors: Towards Removing the Curse of Dimensionality", Procedures of the 30th ACM Symposium on Theory of Computing, Dallas, Texas, May 23-26, 1998, pp. 604-613.
International Search Report and Written Opinion for PCT/US2018/047118, dated Dec. 3, 2018, 9 pages.
International Search Report and Written Opinion for PCT/US2019/026502, dated Jul. 24, 2019, 16 pages.
International Search Report and Written Opinion for PCT/US2019/066321, dated Mar. 19, 2020, 17 pages.
Internet Archive, "SystemVerilog distribution Constraint—Verification Guide", Aug. 6, 2018, http://web.archive.org/web/20180806225430/https://www.verificationguide.com/p/systemverilog-distribution-constraint.html, retrieved on Mar. 3, 2020, 4 pages.
Internet Archive, "SystemVerilog Testbench Automation Tutorial", Nov. 17, 2016, https://web.archive.org/web/20161117153225/http://www.doulos.com/knowhow/sysverilog/tutorial/constraints/, retrieved on Mar. 3, 2020, 6 pages.
Kittler, "Feature Selection and Extraction", Handbook of Pattern Recognition and Image Processing, Jan. 1986, Chapter 3, pp. 115-132.
Kohavi et al., "Wrappers for Feature Subset Selection", Artificial Intelligence, vol. 97, Issues 1-2, Dec. 1997, pp. 273-323.
Kontorovich et al., "Nearest-Neighbor Sample Compression: Efficiency, Consistency, Infinite Dimensions", Advances in Neural Information Processing Systems, 2017, pp. 1573-1583.
Kulkarni et al., "Hierarchical Deep Reinforcement Learning: Integrating Temporal Abstraction and Intrinsic Motivation", arXiv:1604.06057v2, May 31, 2016, 14 pages.
Kuramochi et al., "Gene Classification using Expression Profiles: A Feasibility Study", Technical Report TR 01-029, Department of Computer Science and Engineering, University of Minnesota, Jul. 23, 2001, 18 pages.
Kushilevitz et al., "Efficient Search for Approximate Nearest Neighbor in High Dimensional Spaces", Society for Industrial and Applied Mathematics Journal Computing, vol. 30, No. 2, pp. 457-474.
Leinster et al., "Maximizing Diversity in Biology and Beyond", Entropy, vol. 18, Issue 3, 2016, 23 pages.
Liao et al., "Similarity Measures for Retrieval in Case-Based Reasoning Systems", Applied Artificial Intelligence, vol. 12, 1998, pp. 267-288.
Lin et al., "Why Does Deep and Cheap Learning Work So Well?" Journal of Statistical Physics, vol. 168, 2017, pp. 1223-1247.
Lin, "Development of a Synthetic Data Set Generator for Building and Testing Information Discovery Systems", Proceedings of the Third International Conference on Information Technology: New Generations, Nevada, USA, Apr. 10-12, 2016, Las Vegas, Nevada, USA, 6 pages.
Liu et al., "Learning discrete distributions: user vs item-level privacy", arXiv:2007.13660v3, Jan. 11, 2021, 38 pages.
Lukaszyk, "A New Concept of Probability Metric and its Applications in Approximation of Scattered Data Sets", Computational Mechanics, vol. 33, 2004, pp. 299-304.
Lukaszyk, "Probability Metric, Examples of Approximation Applications in Experimental Mechanics", PhD Thesis, Cracow University of Technology, 2003, 149 pages.
Mann et al., "On a Test of Whether One or Two Random Variables is Stochastically Larger than the Other", The Annals of Mathematical Statistics, 1947, pp. 50-60.
Martino et al., "A Fast Universal Self-Tuned Sampler within Gibbs Sampling", Digital Signal Processing, vol. 47, 2015, pp. 68-83.
Mohri et al., Foundations of Machine Learning, 2012, 427 pages—uploaded as Part 1 and Part 2.
Montanez, "SDV: An Open Source Library for Synthetic Data Generation", Massachusetts Institute of Technology, Master's Thesis, Sep. 2018, 105 pages.
Negra, "Model of a Synthetic Wind Speed Time Series Generator", Wind Energy, Wiley Interscience, Sep. 6, 2007, 17 pages.
Nguyen et al., "NP-Hardness of $\ell$ 0 Minimization Problems: Revision and Extension to the Non-Negative Setting", 13th International Conference on Sampling Theory and Applications, Jul. 8-12, 2019, Bordeaux, France, 4 pages.
Olson et al., "PMLB: A Large Benchmark Suite for Machine Learning Evaluation and Comparison", arXiv:1703.00512v1, Mar. 1, 2017, 14 pages.
Patki, "The Synthetic Data Vault: Generative Modeling for Relational Databases", Massachusetts Institute of Technology, Master's Thesis, Jun. 2016, 80 pages.

(56) References Cited

OTHER PUBLICATIONS

Patki, "The Synthetic Data Vault", 2016 IEEE International Conference on Data Science and Advanced Analytics (DSAA), Oct. 17-19, 2016, Montreal, QC, pp. 399-410.
Pedregosa et al., "Machine Learning in Python", Journal of Machine Learning Research, vol. 12, 2011, pp. 2825-2830.
Pei, "A Synthetic Data Generator for Clustering and Outlier Analysis", The University of Alberta, 2006, 33 pages.
Phan et al., "Adaptive Laplace Mechanism: Differential Privacy Preservation in Deep Learning" 2017 IEEE International Conference on Data Mining, New Orleans, Louisiana, Nov. 18-21, 2017, 10 pages.
Poerner et al., "Evaluating Neural Network Explanation Methods Using Hybrid Documents and Morphosyntactic Agreement", Proceedings of the 56th Annual Meeting of the Association for Computational Linguistics (Long Papers), Melbourne, Australia, Jul. 15-20, 2018, pp. 340-350.
Prakosa "Generation of Synthetic but Visually Realistic Tune Series of Cardiac Images Combining a Biophysical Model and Clinical Images" IEEE Transactions on Medical Imaging, vol. 32, No. 1. Jan. 2013, pp. 99-109.
Priyardarshini, "WEDAGEN: A synthetic web database generator", International Workshop of Internet Data Management (IDM'99), Sep. 2, 1999, Florence, IT, 24 pages.
Pudjijono, "Accurate Synthetic Generation of Realistic Personal Information" Advances in Knowledge Discovery and Data Mining, Pacific-Asia Conference on Knowledge Discovery and Data Mining, Apr. 27-30, 2009, Bangkok, Thailand, 12 pages.
Raikwal et al., "Performance Evaluation of SVM and K-Nearest Neighbor Algorithm Over Medical Data Set", International Journal of Computer Applications, vol. 50, No. 14, Jul. 2012, pp. 975-985.
Rao et al., "Cumulative Residual Entropy: A New Measure of Information", IEEE Transactions on Information Theory, vol. 50, Issue 6, 2004, pp. 1220-1228.
Reiter, "Using CART to Generate Partially Svnthetic Public Use Microdata" Journal of Official Statistics, vol. 21, No. 3, 2005, pp. 441-462.
Ribeiro et al., "'Why Should I Trust You': Explaining the Predictions of Any Classifier", arXiv:1602.04938v3, Aug. 9, 2016, 10 pages.
Rosenberg et al., "Semi-Supervised Self-Training of Object Detection Models", IEEE Workshop on Applications of Computer Vision, 2005, 9 pages.
Schaul et al., "Universal Value Function Approximators", International Conference on Machine Learning, Lille, France, Jul. 6-11, 2015, 9 pages.
Schlabach et al., "FOX-GA: A Genetic Algorithm for Generating and ANalayzing Battlefield COurses of Action", 1999 MIT.
Schreck, "Towards an Automatic Predictive Question Formulation", Massachusetts Institute of Technology, Master's Thesis, Jun. 2016, 121 pages.
Schreck, "What would a data scientist ask? Automatically formulating and solving prediction problems", 2016 IEEE International Conference on Data Science and Advanced Analytics (DSAA), Oct. 17-19, 2016, Montreal, QC, pp. 440-451.
Schuh et al., "Improving the Performance of High-Dimensional KNN Retrieval Through Localized Dataspace Segmentation and Hybrid Indexing", Proceedings of the 17th East European Conference, Advances in Databases and Information Services, Genoa, Italy, Sep. 2013, pp. 344-357.
Schuh et al., "Mitigating the Curse of Dimensionality for exact KNN Retrieval", Procedddings of the 26th International Florida Artificial Intelligence Research Society Conference, St. Pete Beach, Florida, May 22-24, 2014, pp. 363-368.
Schwarz et al., "Estimating the Dimension of a Model", The Annals of Statistics, vol. 6, Issue 2, Mar. 1978, pp. 461-464.
Silver et al., "Mastering the Game of Go Without Human Knowledge", Nature, vol. 550, Oct. 19, 2017, pp. 354-359.
Skapura, "Building Neural Networks", 1996, p. 63.
Smith, "FeatureHub: Towards collaborative data science", 2017 IEEE International Conference on Data Science and Advanced Analytics (DSAA), Oct. 19-21, 2017, Tokyo, pp. 590-600.
Stephenson et al., "A Continuous Infonnation Gain Measure to Find the Most Discriminatory Problems for AI Benchmarking", arxiv.org, arxiv.org/abs/1809.02904v2, retrieved on Aug. 21, 2019, 8 pages.
Stoppiglia et al., "Ranking a Random Feature for Variable and Feature Selection" Journal of Machine Learning Research, vol. 3, 2003, pp. 1399-1414.
Sun et al., "Fuzzy Modeling Employing Fuzzy Polyploidy Genetic Algorithms", Journal of Information Science and Engineering, Mar. 2002, vol. 18, No. 2, pp. 163-186.
Sun, "Learning Vine Copula Models for Synthetic Data Generation", arXiv:1812.01226vl, Dec. 4, 2018, 9 pages.
Surya et al., "Distance and Similarity Measures Effect on the Performance of K-Nearest Neighbor Classifier", arXiv:1708.04321v1, Aug. 14, 2017, 50 pages.
Tan et al., "Incomplete Multi-View Weak-Label Learning", 27th International Joint Conference on Artificial Intelligence, 2018, pp. 2703-2709.
Tao et al., "Qualify and Efficiency in High Dimensional Nearest Neighbor Search", Proceedings of the 2009 ACM SIGMOD International Conference on Management of Data, Providence, Rhode Island, Jun. 29-Jul. 2, 2009, pp. 563-576.
Tishby et al., "Deep Learning and the Information Bottleneck Principle", arXiv:1503.02406v1, Mar. 9, 2015, 5 pages.
Tockar, "Differential Privacy: The Basics", Sep. 8, 2014, https://research.neustar.biz/2014/09/08/differential-privacy-the-basics/ retrieved on Apr. 1, 2019, 3 pages.
Tomasev et al., "Hubness-aware Shared Neighbor Distances for High-Dimensional k-Nearest Neighbor Classification", 7th international Conference on Hybrid Artificial Intelligent Systems, Salamanca, Spain, Mar. 28-30, 2012, 38 pages.
Tran, "Dist-GAN: An Improved GAN Using Distance Constraints", arXiv:1803.08887V3, Dec. 15, 2018, 20 pages.
Trautmann et al., "On the Distribution of the Desirability Index using Harrington's Desirability Function", Metrika, vol. 63, Issue 2, Apr. 2006, pp. 207-213.
Triguero et al., "Self-Labeled Techniques for Semi-Supervised Learning: Taxonomy, Software and Empirical Study", Knowledge and Information Systems, vol. 42, Issue 2, 2015, pp. 245-284.
Tuomisto, "A Consistent Terminology for Quantifying Species Diversity? Yes, It Does Exist" Oecologia, vol. 164, 2010, pp. 853-860.
Vacek et al., "Using Case-Based Reasoning for Autonomous Vehicle Guidance", International Conference on Intelligent Robots and Systems, San Diego, California, Oct. 29-Nov. 2, 2007, 5 pages.
Verleysen et al., "The Curse of Dimensionality in Data Mining and Time Series Prediction" International Work-Conference on Artificial Neural Networks, Barcelona, Spain, Jun. 8-10, 2005, pp. 758-770.
Viera, "Generating Synthetic Sequential Data using GANs", Medium: Toward AI, Jun. 29, 2020, 31 pages.
Wachter et al., "Counterfactual Explanations Without Opening the Black Box: Automated Decisions and the GDPR", Harvard Journal of Law and Technology, vol. 31, No. 2, Spring 2018, 47 pages.
Wang et al., "Falling Rule Lists" 18th International Conference on Artificial Intelligence and Statistics, San Diego, California, May 9-12, 2015, 10 pages.
Wei et al., "An Operation-Time Simulation Framework for UAV Swarm Configuration and Mission Planning", 2013.
Weselkowski et al., "TraDE: Training Device Selection via Multi-Objective Optimization", IEEE 2014.
Wu, "The Synthetic Student: A Machine Learning Model to Simulate MOOC Data", Massachusetts Institute of Technology, Master's Thesis, May 2015, 103 pages.
Xiao, "Towards Automatically Linking Data Elements", Massachusetts Institute of Technology, Master's Thesis, Jun. 2017, 92 pages.
Xu et al., "An Algorithm for Remote Sensing Image Classification Based on Artificial Immune B-Cell Network", The International

(56) References Cited

OTHER PUBLICATIONS

Archives of the Photogrammetry, Remote Sensing and Spatial Information Sciences, vol. XXXVII, Part 86b, Beijing China, Jul. 3-11, 2008, 6 pages.
Zhao et al., "Semi-Supervised Multi-Label Learning with Incomplete Labels", 24th International Joint Conference on Artificial Intelligence, Buenos Aires, Argentina, Jul. 25-31, 2015, pp. 4062-4068.
Gajawada et al., "Missing Value Imputation Method Based on Clustering and Nearest Neighbours", International Journal of Future Computer and Communication, vol. 1, No. 2, Aug. 2012, 3 pages.

* cited by examiner

US 11,640,561 B2

DATASET QUALITY FOR SYNTHETIC DATA GENERATION IN COMPUTER-BASED REASONING SYSTEMS

BENEFIT CLAIM

This application is a continuation-in-part of U.S. patent application Ser. No. 17/038,955, filed Sep. 30, 2020, which is in turn a continuation-in-part of U.S. patent application Ser. No. 17/006,144, filed Aug. 28, 2020, is in turn a continuation-in-part of U.S. patent application Ser. No. 16/713,714, filed Dec. 13, 2019, which claims priority to and the benefit of U.S. Provisional Patent Application No. 63/814,585 having a filing date of Mar. 6, 2019, and which is in turn a continuation-in-part of U.S. patent application Ser. No. 16/219,476, filed Dec. 13, 2018. U.S. patent application Ser. No. 17/038,955 and U.S. patent application Ser. No. 17/006,144 each claim priority to and the benefit of U.S. Provisional Patent Application No. 63/036,741 filed Jun. 9, 2020 and U.S. Provisional Patent Application No. 63/024,152 filed May 13, 2020. This application also claims priority to and the benefit of U.S. Provisional Patent Application No. 63/168,521 filed Mar. 31, 2021 and U.S. Provisional Patent Application No. 63/179,916 filed Apr. 26, 2021. Each of the applications identified above is hereby incorporated by reference herein in its entirety.

FIELD OF THE INVENTION

The present invention relates to computer-based reasoning systems and more specifically to synthetic data in computer-based reasoning systems.

BACKGROUND

Computer-based reasoning systems can be used to predict outcomes based on input data. For example, given a set of input data, a regression-based machine learning system can predict an outcome or make a decision. Computer-based reasoning systems will likely have been trained on much training data in order to generate its reasoning model. It will then predict the outcome or make a decision based on the reasoning model.

One of the hardest problems for computer-based reasoning systems is, however, the acquisition of training data. Some systems may require millions or more sets of training data in order to properly train a system. Further, even when the computer-based reasoning system has enough data to use to train the computer-based reasoning system, that data may not be anonymous or anonymized in a way that satisfies user expectation, terms of service, etc. Other systems require the right sampling of training data. For example, even though a pump may spend 99% of its time in proper operating modes with similar data, a computer-based reasoning system to control it may need significantly more training on the potential failure scenarios with unusual data that comprise the other 1% of the operation time. Additionally, the training data may not be appropriate for use in reinforcement learning because significant amounts of data may be required in certain parts of the knowledge space or because the high costs associated with acquiring data such that the sampling process must be very selective. Further, for many organizations, privacy or anonymity of original training data may be critical. For example, maintaining customer privacy can be critical for regulatory compliance, limiting liability, and protecting reputation.

Various techniques described herein use data quality assessments to overcome one or more of these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The claims provide a summary of the invention.

DETAILED DESCRIPTION

Figure 1A:
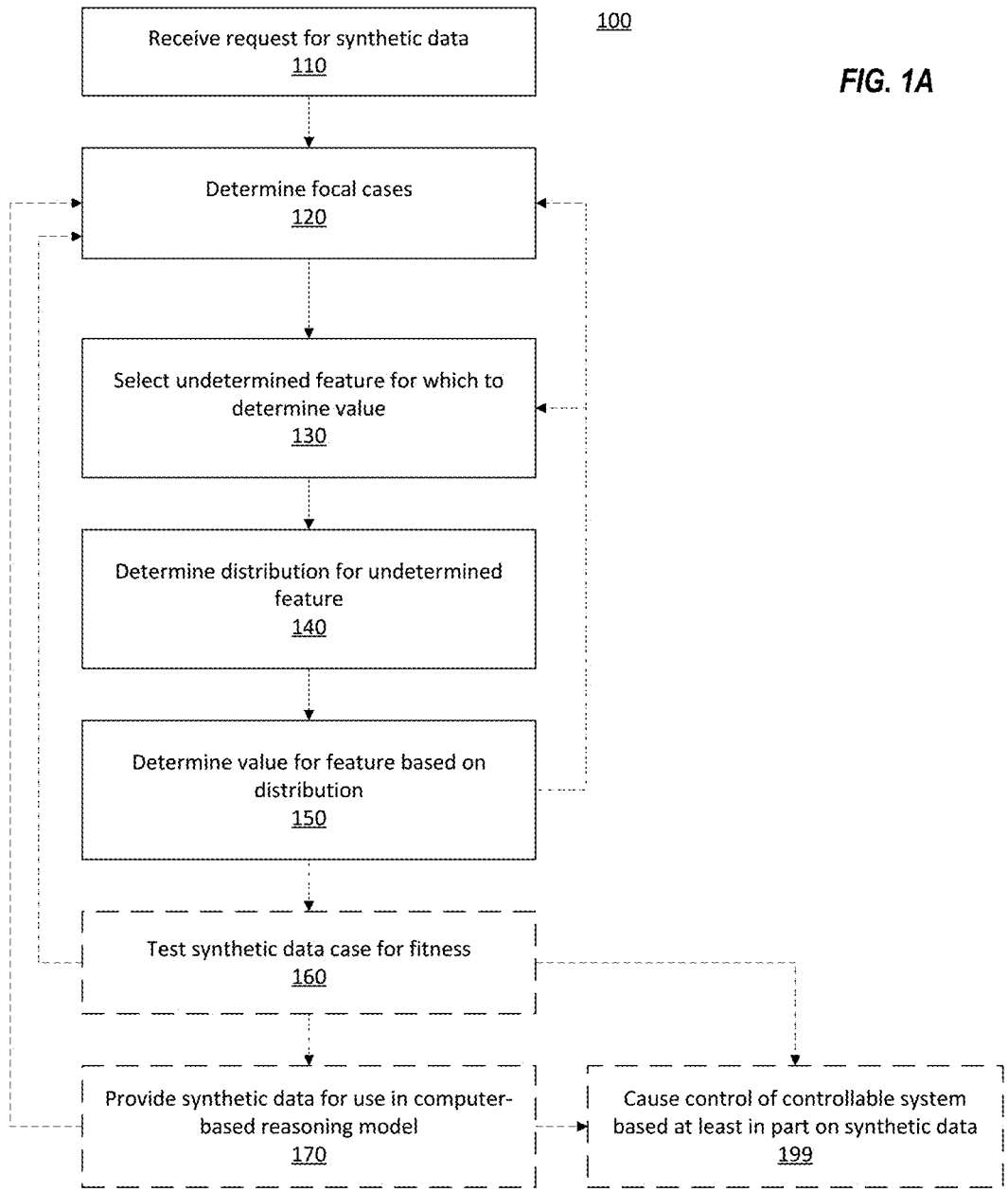
FIG. 1A, FIG. 1B, FIG. 1C, and FIG. 1D are flow diagrams depicting example processes for synthetic data generation in computer-based reasoning systems.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The techniques herein provide for synthetic data generation in computer-based reasoning systems. In some embodiments, the computer-based reasoning is a case-based reasoning system. As discussed elsewhere herein, computer-based reasoning systems need extensive, and often specific training data. It can be prohibitively expensive and time consuming to create such training data. Further, in numerous situations, including in the context of reinforcement learning, the specific training data needed to properly train a computer-based reasoning model may be difficult or impossible to obtain. Training is often needed on rare, but important, scenarios, which are costly, difficult, or dangerous to create, and, as such, that training data may not be available.

The techniques herein use existing training data and, optionally, target surprisal to create synthetic data. In some embodiments, conditions may also be applied to the creation of the synthetic data in order to ensure that training data meeting specific conditions is created. For undetermined features, a distribution for the feature among the training cases is determined, and a value for the feature is determined based on that distribution. In some embodiments, the values for some features are determined based at least in part on the conditions or condition requirements that are placed on the synthetic data. In some embodiments, the features that have conditions on them are called "conditioned features." As used herein, the term "undetermined features" encompasses its plain and ordinary meaning, including, but not limited to those features for which a value has not yet been determined, and for which there is no condition or conditional requirement. For example, in those embodiments or instances where there are no conditions on the synthesized data, all of the features may initially be undetermined features. After a value for a feature is determined, it is no longer an undetermined feature, but instead (as described herein) may be used to as part of determining subsequent undetermined features.

In some embodiments, the undetermined features may be conditioned on previous values (where "previous values" may also be termed "previous-in-time values") of the same variable. For example, a known previous value of a currently-undetermined feature may, in certain embodiments, be useful in determining the current (and possibly later) value(s) for that feature. These may be called time series values or time series features. For example, the price of a property may vary over time, and may be related to the value at a previous time (or previous times). As another example, the position of a vehicle may be related to one or more previous positions of the vehicle. Generated synthetic data for property price and vehicle positions may each be conditioned on the previous value of the property price or vehicle position, respectively. The same could apply to any other example of generation of values for undetermined features herein. Further, as noted herein, the value of an undetermined feature may be conditioned on two or more previous values, or on the first derivative, second derivative, or higher order derivatives. For example, if a vehicle (such as a plane) is in free fall, then it may be useful to condition position on two or more previous values in order to better represent the acceleration due to gravity.

In some embodiments, two or more undetermined values may be conditioned on the values (for one or more time periods) of previous values or derivatives with regard to other values. For example, turning back to the vehicle example, the value for each position axis (X, Y, and Z) could be conditioned on all of the values of (X, Y, and Z). Conditioning on previous value(s) or derivatives of two or more features may be useful when in order to capture a multidimensional relationship between the undetermined features and the previous value(s) of the two or more features.

In some embodiments, the time periods for the previous value (e.g., the timestep back to the previous value) can be any appropriate time period, such as one millisecond, two seconds, four minutes, three days, etc. Further, in some embodiments, all of the time periods are equal, and in others, the time periods differ (among undetermined features) and/or from one time step to another. Further, in some embodiments, the values for undetermined features are conditioned on functions or curves related to the value over time. For example, the value for an undetermined feature could be conditioned on a curve fitted to the previous 2 (or more) values for the undetermined feature.

In some embodiments, all of the features of a case could be conditioned on previous values or derivatives of the features. For example, using the position example, if the only features in the case were the (X, Y, Z) axis components of position, then all of those features might vary with time. In some embodiments, a subset of the features for a case might vary with time. For example, the price of a property might be conditioned on previous price of the property, but the square footage of the lot might not vary over time, and therefore may not be conditioned on previous values for the square footage of the lot.

In some embodiments, multiple time series can be included together based on one or more identifiers or features that group the time series data together. Such groups of time series together are sometimes referred to as panel data. Data may be synthesized based on one or more time series or conditioned upon specific attributes of one or more time series. Further, some datasets may include time series that have only one or only two data points. In such datasets, a stationary distribution may be used to model those isolated data points and capture their representation in the synthesized panel data.

In some embodiments, feature bounds associated with the feature or any of its derivatives can be used to generate the value for the feature (e.g., using the techniques discussed herein). As particular examples, the feature value may be sampled based on a uniform distribution, truncated normal, or any other bounded parametric or nonparametric distribution, between the feature bounds. In some embodiments, if the feature bounds are not used to generate the values, then the techniques herein include checking feature bounds (if any have been specified, determined, or are otherwise known) of the value determined for the feature. In some embodiments, if feature bounds are known for a specific feature, and the value determined for that feature is outside the feature bounds, then corrective action can be taken. Corrective action can include one or more of re-determining a value for the feature, and optionally again checking the new value against the feature bounds, choosing a value within the range of the feature bounds, replacing the determined value with a new value determined based on a distribution just within the feature bounds (e.g., a uniform, normal, or other distribution within the feature bounds), and/or the like. As a particular example, feature bounds may be used for time series velocities (discussed elsewhere herein).

In many embodiments or contexts, it may be important for synthetic data and/or synthetic training data to differ from the existing training data. As used herein, the phrase synthetic data may be used in certain places and the phrase synthetic training data may be used in other places, and the two phrases may be interchangeable. The techniques apply equally regardless of whether the phrase synthetic training data or synthetic data is used. As such, where the phrase synthetic training data is used, the techniques apply equally to synthetic data, and vice-versa. As an example of the importance of synthetic data differing from the training data, it may be useful to have the synthetic data not contain identical data cases as the original training data or even data cases that meet certain similarity conditions with (e.g., being overly "similar" or "close" to) original training data cases. As such, in the event that synthetic data is identical or too similar to existing training data, the synthetic data case may be modified (e.g., resampled) and retested, or discarded. In some embodiments, the generated synthetic data may be compared against at least a portion of the existing training data, and a determination may be made whether to keep the synthetic data case based on the distance of the synthetic data case to one or more elements of in the existing training data. For example, in some embodiments, each synthetic data case generated using the techniques herein are compared to the existing training data in order to determine whether it is overly "similar" to existing training data. Determining whether the synthetic data case is overly similarity to a training case may be accomplished, in some embodiments, by determining the shortest distance between the synthetic data case and the data cases in the training data. In other embodiments, the distance is determined between time series data, such as between a synthesized time series and any or all candidate original time series data, either as a generalized mean distance of all of the time series points (including arithmetic mean, geometric mean, harmonic mean, maximum distance, and minimum distance), earthmover metrics, entropy, pattern or shape comparisons, and/or other distance or distance-like measures. If the shortest distance is below a certain threshold, then the synthetic data case is deemed to be too "close" to an existing case. In the event that the synthetic data case is overly similar to an existing training case, the synthetic data case may be discarded, or values for one or more features may be redetermined and then the modified synthetic data case may be tested for similarity to the synthetic data cases. Any appropriate measure, metric, or premetric discussed herein may be used to determine the "distance" or "closeness" of the synthetic case with other cases, including Euclidean distance, Minkowski distance, Damerau-Levenshtein distance, Kullback-Leibler divergence, 1-Kronecker delta, cosine similarity, Jaccard index, Tanimoto similarity, and/or any other distance measure, metric, pseudometric, premetric, index, etc. Further, the distance measure may be based on all of the features of the cases, or on a subset of the features. For example, the distance measure may be based on a subset of features that, for example, are known to be combinable as identifiers of individuals. Additionally, in some embodiments, the closeness of synthetic data cases is determined as the synthetic data cases are generated, after many or all of the synthetic data cases are generated, or a combination of the two.

The techniques herein may include checking generated synthetic data with the dataset quality metrics with respect to data in the (original) training dataset (discussed extensively herein). Although the dataset quality metrics are discussed with respect to use with dataset after they have been fully generated, they could also be used with a dataset (or part of a dataset) that as it is generated (e.g., after a single data element is generated, or after N (>1) synthetic data elements have been generated). Further, the dataset quality metrics may be run on a portion of the synthetic data (e.g., a subset of the synthetic data elements).

In some embodiments, the techniques include checking whether the synthetic data includes meets similarity conditions for (e.g., being identical or (overly) similar or close to) data cases in the original training data by assessing a certainty score, such as conviction (where the conviction score may be prediction conviction, familiarity convictions, and/or any of the conviction measures discussed herein, and conviction or any type of conviction may also be termed a "conviction score" such as a prediction conviction score, a familiarity conviction score, etc.). In the event that the certainty score indicates that synthetic data is identical or overly similar to existing training data, the synthetic data case may be modified (e.g., resampled, one or more features resampled, etc.) and retested, or discarded. Determining whether the synthetic data case is overly similarity to the original training data may be accomplished, in some embodiments, by determining the certainty score of the synthetic data with respect to the original training data. For example, in some embodiments, the certainty score is prediction conviction (described extensively elsewhere herein) and is in part a measure of the new synthetic data's weighted distance to other points and can be expressed as the information required to describe the position of the point in question relative to existing points. Depending on implementation, the prediction conviction score of a new synthetic data item that is overly similar or close to training data may be higher than synthetic data that is not as close to existing data for a similar level of uncertainty in that part of the data. In some instances and some embodiments, using dataset quality metrics may be beneficial (e.g., over privacy that is just based on adding noise to each data case), because it may ensure that each generated synthetic data case is sufficiently different from all cases in the set of original training data as opposed to sufficiently different from a particular data case from the set of original training data.

In some embodiments, as part of the similarity condition, the certainty score is compared to a threshold, and the certainty score of the new data case is beyond the threshold, then the new data case is modified (e.g., resampled) and retested, or discarded. For example, if prediction conviction is used as the certainty score, then when the prediction conviction is beyond a certain threshold (e.g., above two), then the synthetic data case may be resampled and retested or discarded.

In some embodiments, the certainty score is used in a probability calculation used to determine whether to resample and retest or discard the synthetic data. For example, if the prediction conviction is beyond a certain threshold (e.g., greater than 1.8), then the prediction conviction can be used as part of an equation to determine whether to resample and retest or discard the synthetic data (e.g., probability of resampling and retesting or discarding the data could be f(prediction conviction) such as min(100, (prediction conviction)^2*10) or min(100, (prediction conviction)*4.6), or a maximum entropy probability distribution based on parameters and/or data and/or data types and/or domains, such as an exponential, Laplace, or binomial distribution).

Further, the certainty score may be calculated based on all of the features of the data cases, or on a subset of the features. For example, the certainty score may be based on a subset of features that, for example, are known to be combinable as identifiers of individuals, and, therefore, in some embodiments, it may be beneficial to not duplicate them. Additionally, in some embodiments, the certainty score of synthetic data cases is determined as the synthetic data cases are generated, after many or all of the synthetic data cases are generated, or a combination of the two.

In some embodiments, similarity or closeness of a synthetic data case may be a combination of any of the measures and techniques discussed herein. For example, a case may be resampled and replaced or discarded if both (or either) of a distance measure and/or a certainty score are each beyond respective thresholds.

Figure 1B:
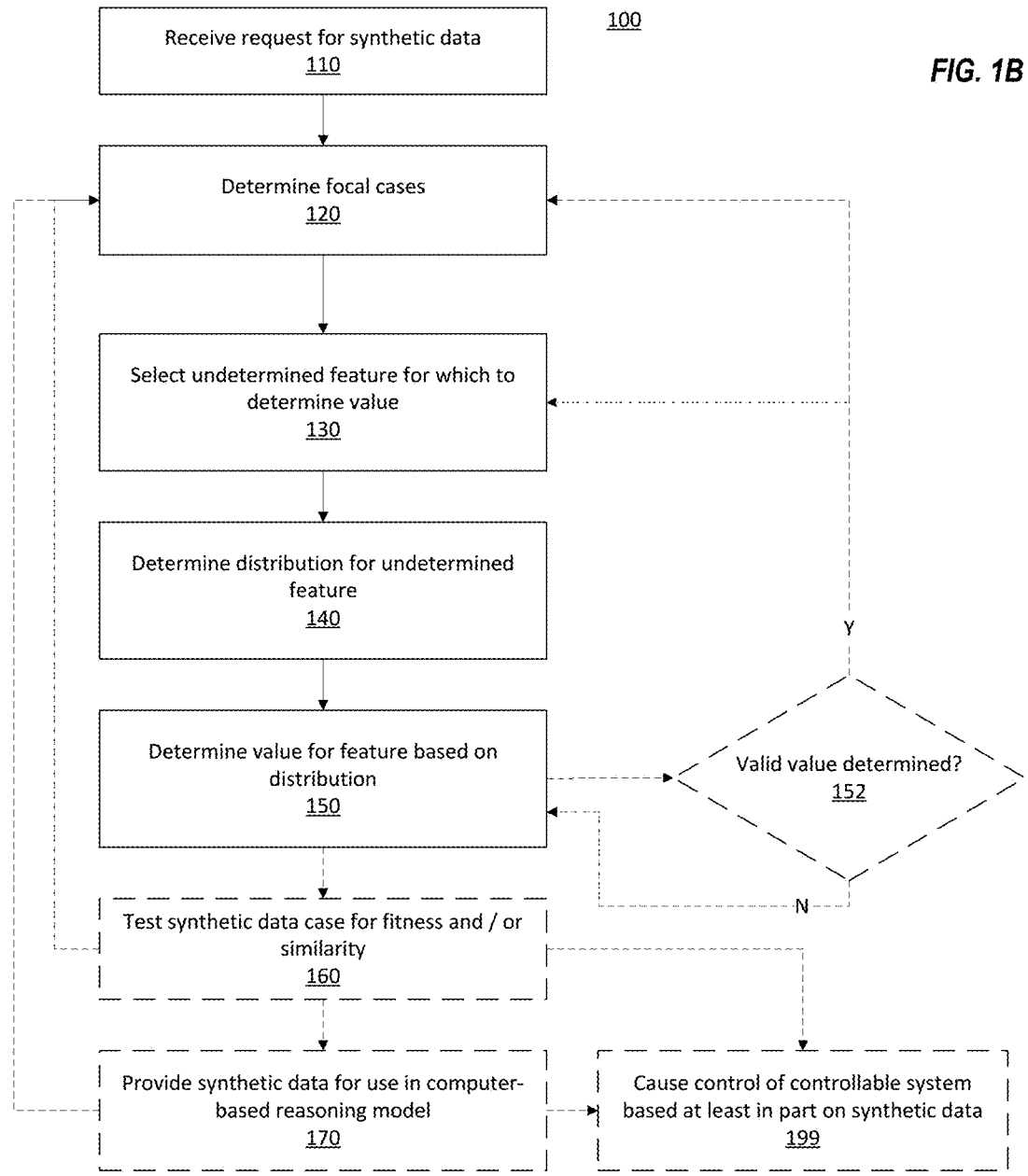
Figure 1C:
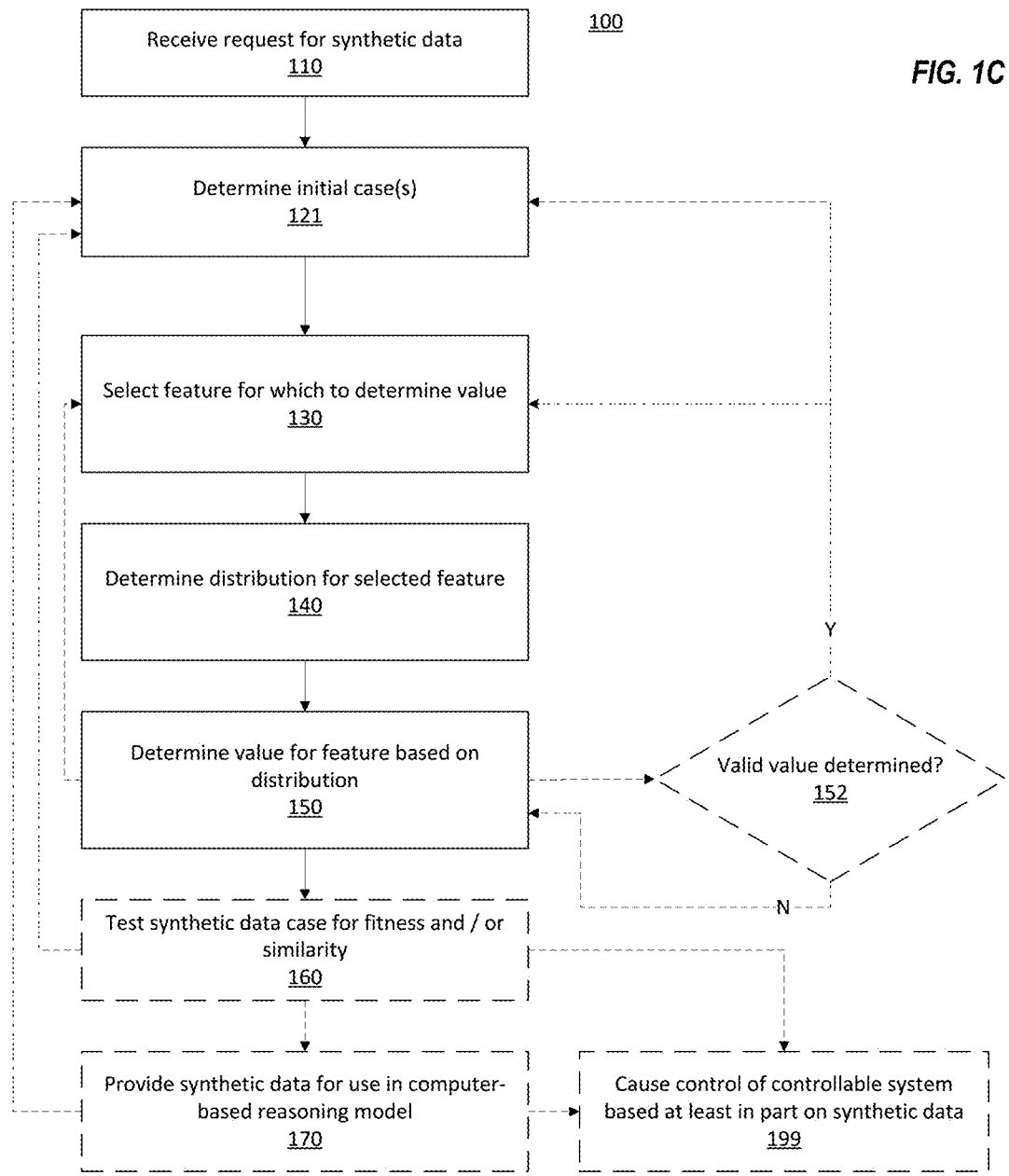

In some embodiments, the techniques may include determining the k-anonymity, t-closeness, l-diversity, and/or other privacy measures for synthetic data cases (e.g., either as the synthetic data cases are generated, after many or all the synthetic data cases are generated, or a combination of the two) (e.g., as part of determining validity 152, fitness 160, and/or similarity 160 in FIGS. 1A, 1B, 1C, and/or 1D). In some embodiments, determining the k-anonymity or t-closeness of a synthetic data case may include determining whether there are k or more training data cases that are "close" to the synthetic data case (e.g., within a threshold distance—e.g., a "similarity threshold"), and, if there are at least k training data cases that are "close", keeping the synthetic data case because one would not be able to associate the synthetic data case with less than k possible training data cases. In some embodiments, if there is at least one training data case, but fewer than k training data cases, that are within the similarity threshold of the synthetic data case, then the synthetic data case may be discarded, or values for one or more features may be redetermined and then the modified synthetic data case may be tested for similarity and/or k-anonymity and/or t-closeness to the synthetic data cases. In some embodiments, even if there are k or more training data cases that are within the similarity threshold distance of the synthetic data case, if one or more of the training data cases are within a closer threshold distance to the synthetic data case, then the synthetic data case may be discarded, or values for one or more features or data elements in a time series may be redetermined and then the modified synthetic data case may be tested for similarity and/or k-anonymity to the synthetic data cases. This may be useful, for example, to avoid having one of the k or more training data cases be overly similar to the synthetic data case such that the synthetic data case and one or more of the training data cases are or are nearly identical. For example, if a synthetic data case is identical to one of the training cases, even if there are k other training cases that are similar, it may still be useful to exclude that case.

The number k used in k anonymity may be set by the users of the system or be automatically set based on desired anonymity, and may be related or unrelated to the "k" used for kNN searching. Further, the number k can be any appropriate number, such as 1, 2, 9, 101, 1432, etc. The number k can be the expected value of the number of data elements, the minimum number of elements that could be associated with a given point, or some other generalization of expectation including harmonic mean and geometric mean.

In some embodiments, the distance t for t-closeness may be set by the users of the system or be automatically set based on uncertainty envelopes or confidence measures of the data including expected residual values, on ratios of uncertainty measures of the data including expected residual values, on distance measures, on information theoretic or surprisal measures, or other distance or similarity measures between data elements.

In some embodiments, the distribution for a feature may be perturbed based on target surprisal and/or conviction. In some embodiments, the distribution for a feature may be perturbed based on a multiplicity of surprisal or confidence values, including surprisal or confidence related to model residuals and the similarity or distance to existing points. In some embodiments, generated synthetic data may be tested for fitness. In some embodiments, generated synthetic data may be used as a sampling process to obtain observations about unknown parts of the computer-based reasoning model and to update the model based on the new information obtained. In some embodiments, generated synthetic data may be used as a sampling process that conditions the requests to increase the likelihood of the system it is driving attaining a goal. Further, the generated synthetic data may be provided in response to a request, used to train a computer-based reasoning model, and/or used to cause control of a system.

Some embodiments herein use a combination of metrics for analysis of the fitness or data quality of the generated dataset. The fitness or dataset quality metrics may include one or more statistical quality metrics that compare the statistical properties of the set of training data cases and the set of two or more synthetic data cases (where an example statistical property is mean, standard deviation, metrics for similarity of distribution, etc.); one or more model comparison metrics, which may quantify the machine learning model properties and performance of the set of training data cases and the set of two or more synthetic data cases; and at least one privacy metric, which may quantify the likelihood of identification of private data in the set of training data cases from the set of two or more synthetic data cases. In some embodiments, only data that meets certain fitness or data quality thresholds (e.g., measuring the fitness metric or data quality metric against a threshold) in order for the data to be fit for use. As discussed herein, the data may be resampled and replaced or discarded if a data quality or fitness metric does not meet a respective threshold.

General Overview of Preserved Features and Synthesizing Table Data

In some embodiments, conditioning values is accomplished by preserving values for one or more features ("preserved features") from the set of training data to the synthesized data. The term "preserved feature" may have its plain and ordinary meaning, including, but not limited to a feature for which a value is preserved from a corresponding value of a case in the set of training date. The preserved features may be indicated in a request received for data synthesis, chosen based on metadata related to the column (e.g., that it is a unique identifier for table training data), pre-programmed into an embodiment, etc. In some embodiments, when a feature value is preserved, a case may be selected (e.g., based on conditioning, randomly, each case may be selected in turn, the cases may be sorted in some way and then selected, and/or using any of the techniques herein, etc.), and the value for the preserved feature from that training data case may be used as the value for the feature in the synthetic data case. In some embodiments, each case from the set of training data may be used (e.g., created a synthetic data case based on the preserved value from each training data case), and the value for the preserved feature from each of those cases may be used to populate the value for the corresponding features in the synthetic data cases, in which case, there would be a 1:1 correspondence in the numbers of cases in the set of training data and the synthetic data. Fewer than all of the cases from the set of training data may also be used as sources for values for the preserved feature data. Additionally, in some embodiments, values outside of the training set may be specified and used for the preserved feature data. In some embodiments, cases from the set of training data may be used more than once, and more, equal to, or less than the number of the cases in the set of training data as values for preserved features in the synthetic data, which may be described as "sampling with replacement". Further, in some embodiments more than one value per case may be preserved for the synthetic data (e.g., an age feature and a gender feature), and preserving features may be used with any other technique herein (e.g., conditioning on previous-in-time values, conditioning on values, conditioning, etc.). Preserving values may be useful in order to have those preserved values influence the determination of the values for other features in the synthetic data case. Further, it may be useful to preserve features when there is a hierarchical or other relationship among data that can be preserved and/or emulated by preserving the values of the preserved features.

In some embodiments, after the synthetic data generation is complete, the preserved value may be changed or replaced globally. This may be useful, for example, when the preserved value has sensitivity to it, such as containing confidential, personal, or other sensitive information. In some embodiments, after the synthetic generation is complete, the preserved value may be changed based on some condition, for example, if there is only one entry with a given family name, or changed to a different actual or fictitious name that is likely to be found in the country indicated by other features.

In some embodiments, the techniques, including the use of preserved features, can be used to synthesize data from tables. For example, some tables include a unique identifier or "UID" in each row of the table, and the UIDs can be preserved as discussed herein. The UIDs are typically nominals (e.g., represented using integers or uniquely generated string IDs such as UUIDs), where the term nominal encompasses its plain and ordinary meaning that it represents a name, or is used to identify something, and does not act as a value or position. In some embodiments, this means that differing UIDs are all equidistant from each other. For example, a UID of 402 is the same distance (e.g., a distance of "1") from 401, as it is from UID 7, UID 114 and UID 986, and each of those UIDs are also the same "1" distance from each other. In some embodiments, tables may be generated by conditioning each synthesized data case based on a UID (e.g., one synthesized data case (table row) for each UID, one table row for some of the UIDs, or one table row or more for some or all of the UIDs, etc., as discussed herein). The techniques may operate such that, in selecting the K nearest neighbors or focal cases (discussed extensively herein), the data case from the set of training data that has the same UID is part of the set of K nearest neighbors or focal cases. This may occur because conditioning on the UID results in the distance to the training data case with that same UID is zero, and the distance to all other training data cases with the UID being the same (e.g., "1"). As such, the training data case with the same UID would be in the set of focal cases and the remaining K data cases will, in some embodiments, represent a random selection of data cases from the set of training data cases. The value for first undetermined feature of the synthetic data case is determined based on the focal cases (discussed extensively herein). That value for the undetermined feature will be "influenced" by the training data case with the same UID, but will not (necessarily) have precisely the same value as the training data case with the same UID for that feature. As discussed extensively herein, subsequent undetermined features will be conditioned on the previous conditions and previous determined feature values. For example, the second undetermined feature will be conditioned on the UID and the value for the first undetermined feature. Therefore, the influence on subsequent values for undetermined features of the synthetic data case with the same UID may be present in both the UID and the influence for the determined value(s) for the features in the synthetic data case.

In some embodiments, not only does conditioning on the UID may allow for creation of values in a single table of synthetic data, but it also allows for preserving relationships across tables. For example, some databases have multiple tables, and entries in those tables may be related by UIDs. For example, a first table may include patient demographics and have a UID that is unique for each patient. A second table may include information about billing for that patient, and include the same UID, thereby allowing reference to the first table. A third table may include information about patient visits and include the same UID to identify the patient, thereby allowing reference to the first and second tables. The use of the same UID across tables allows the tables to be used together (e.g., by using a table JOIN). When generating data based on multiple tables, the data synthesized for each table may be conditioned on the UIDs. As such, first, the relationships between tables will be preserved, and the training data associated with the UID will influence the synthesis of data for each table as discussed herein. In some embodiments, this may be useful when it is desired that the synthetic data generated (e.g., multiple tables) mimic the table properties of the set of training data cases (e.g., multiple tables). In some embodiments, synthetic data may be conditioned on two or more UIDs in a single table. For example, the set of the tables with patient data described above may include the second table having the UID to identify the patient entry in the first table (call that UID1, which would be unique in table one), and a UID for each billing event (UID2, which would be unique in table two). In table two, there may be multiple billing entries per patient. Therefore, there may be multiple UID2s for each UID1. In other examples, this could include more levels of hierarchy (e.g., three or more UIDs per row). In some embodiments, the synthesis of data may be conditioned on each set of UIDs. For example, the values for undetermined features for the synthetic data case may be conditioned on UID1[i] and UID2[j], where each UID1[i] may be associated with one or more UID2[j]s (and where j may range from 1 . . . number of rows that contain UID1[i]). The determination of values for undetermined features would then be performed as discussed herein.

In some embodiments, synthetic data cases may be generated for each table, for each UID (or set of UIDs). This may be beneficial when a synthetic dataset of similar size to the set of training data cases is desired. In some embodiments, UIDs from the set of training data cases may be chosen at random, and a smaller, same, or greater number of synthetic data cases can be synthesized as compared to the set of training data. Further, in some embodiments, the number of times a UID may be used for data synthesis may be limited to one (e.g., to keep each unique), to the number of times that the UID appears in the corresponding table in the set of training data cases (e.g., to preserve a similar set of relationships in the synthetic data cases), or to any other appropriate number (e.g., higher than one time for each UID, or based on the distribution of the original training dataset). Further, in some embodiments, there may be no limit on the reuse of UIDs to generate synthetic data. Further still, the limitations on the reuse of UIDs withing any individual table of synthetic data may differ per table (or per UID).

In some embodiments, a single given UID may be used as the basis to synthesize multiple new IDs, which may be described as "sampling with replacement". In these embodiments, the one-to-one relationship between training data and synthetic data may not exist even though the UIDs remain unique, yet relationships may be preserved relative to the UIDs, and, instead of using the same UID on each case generated based on that single UID, separate or different UIDs may be used for these synthesized cases for use with matching with other tables.

In some embodiments, the UIDs will be selected based on a weighted sampling across the tables, which may be informed by the relationships that join multiple tables. For example, if a particular join between two or more tables is common and yields a large representation of a particular UID, then that UID should be appropriately weighted and be resampled or reused more commonly than a UID that is less frequently represented.

Some UIDs may simply be a sequence of integers with no particular value. UIDs could also be something more unique, such as the social security number of a person. For this reason and others, in some embodiments, after the data is synthesized conditioned on UIDs, the UIDs may be changed. For example, if the UIDs in the synthesized data are the same as in the set of training data cases, then the UIDs may be globally changed (in all tables) in order to avoid any residual identifying information that may exist in the UID. The change would preserve the relationships among the tables in the synthetic data by changing all instances of UID[i] to UID[i]'. Further, as discussed elsewhere herein, in the event that synthetic data is identical or too similar to existing training data (e.g., as measured by one of the measures (e.g., distance or certainty score) discussed herein), the synthetic data case may be modified (e.g., resampled) and retested, discarded, and/or replaced.

Figure 5:
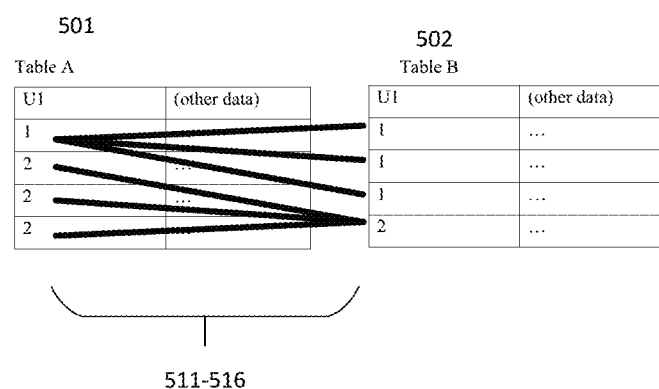
FIG. 5 is an image showing examples of a join between two tables.

In some embodiments, the techniques may include determining "links" (see, e.g., links 511-516 in FIG. 5) based on possible joins among two or more tables in a database and using those links in order to determine one or more conditions used in generation of data. For example, the links may be used in order to determine the probability distribution of preserved values (e.g., UIDs) in a particular table. Stated another way, in some embodiments, the techniques include selecting or generating data such as a UID based on a weighted sampling across the tables, and this selection or generation may be informed by the relationships that join multiple tables. For example, if a particular join between two or more tables is common and yields a large representation of a particular UID (a large number of links 511-516), then that UID may be resampled or reused more than a UID that is less frequently represented in the links 511-516. As used herein, the term "link" may represent overlap of corresponding values (e.g., UIDs) from table to table. As depicted in FIG. 5, a link 511-516 may represent, for a particular join, the occurrence of overlap between matched values in particular columns of two (or more) tables (e.g., preserved features, unique IDs, or UIDs).

In some embodiments, a set of two or more possible joins and/or known joins (corresponding to two or more sets of links) may be used in order to determine the conditioning (e.g., based on those two or more sets of links among tables) for the data to be generated. As one example, a set of queries containing joins, may be used it its entirety, or partially (e.g., by randomly sampling, or by ranking joins by the most common queries first and choosing the N most common joins), in order to determine the conditioning for the UIDs (or other preserved values). As another example, the techniques may also include sampling across all possible joins for a set of tables in order to determine the conditioning of the UIDs (or other values shared across tables). The number of possible joins in a set of tables (whether a database or a component of a database) may be very large. So, in some embodiments, it may be beneficial to sample among those possible joins in order to determine a set of joins for conditioning for the UID or other preserved value. Additionally, the set of possible joins may be selected based on a representative distribution of possible joins. As a specific example, consider a set of known queries where 10% of queries join 2 tables, 80% join 3 tables, and 10% join 4 tables. The techniques may include sampling all possible queries based on that distribution (e.g., joining 2, 3, or 4 tables based on that distributions). Further, in some embodiments, a combination of any of the above may be used. For example, some known queries (and their joins) may be used, and some joins may be sampled from all possible joins (based on the distribution of joins or not). In some embodiments, known queries may be those known to be used to query a database (whether known from log files, user specification, etc.). In various embodiments, the weighting for calculating conditions based on links may be based on an equal weighting from all joins used to create the links, or the contribution of the joins to the conditioning could be weighted differently. For example, joins based on known queries (or joins) may have heavier weights (like 1.5, 2, 9, 17 times the weight of other joins, and/or based on any known frequency of such known queries or joins) than joins that are sampled from the space of all possible joins. When sampling from the set of possible joins, the types of joins used may be any appropriate join or combination of joins (such as inner join, outer join, left join, right join, cross join, natural join, equi-join, etc.) and may use one or more columns to form compound or composite keys when joining tables.

Consider the particular example in FIG. 5 where Table A 501 has a column U1, and Table B 502 has a corresponding column U1, with the values depicted. If an embodiment were to generate synthetic data solely based on Table 501 without taking into account the effects of joins (depicted as links 511-516 between corresponding values in Table A and Table B): there may be a 75% chance of generating U1 "1", and a 25% chance of generating a U1 of "2". If an embodiment were to generate synthetic data solely based on Table 502 without taking into account the effects of joins: there would be a 25% chance of generating U1 1, and a 75% chance of generating a U1 of 2.

Continuing the example, in some embodiments, the techniques include conditioning generation of data for a table (e.g., table 501 or 502 of FIG. 5), based on the effects of joining tables (e.g., links 511-516). For example, those values with more links among tables may be more likely to be generated. As a particular example, if the links 511-516 are used to condition the generation of U1 (in either table 501 or 502—or elsewhere), and the weighting for the links are all equal, then there is an equal weighting for each value of U1 ("1" and "2") since there are three links 511-516 for each of values "1" and "2". Restated: there would be a 50% probability of generating either "1" or "2" for U1 in that example.

In some embodiments, the techniques include using the number of links 511-516 in combination with the occurrence of the U1 in the original table(s). For example, using the example in FIG. 5, new synthetic data may be generated with U1 values "1" and "2" based on conditions, and those conditions may be determined based just on the occurrence of the U1 in the table 501 or 502 alone (describe elsewhere herein), based on the join sampling weight (50% each for "1" and "2" based on number of links—with three for each of "1" and "2"—described above), or a combination of the two. As an example of the latter, the conditioning values may be combined based on averaging the probabilities from the table in question. Specifically, for table 501, combining the probability of U1 values from table 501 with the link 511-516 percentages, the likelihoods may be ((50%+75%)/2=62.5% for U1 "1"; and (25%+50%)/2=37.5% for U1="2"), or any other appropriate method.

The techniques herein are primarily discussed with respect to uses on databases or datastores, and, even if not stated specifically in each example and embodiment, the techniques apply equally to sets of connected tables (sometimes called "components") of databases or connected datasets within datastores. A single database or datastore may be comprised of one or more components, and the techniques herein apply to components of databases or datastores, as well as to sets of components of databases or datastores, and to databases or datastores, regardless of number of components.

Example Processes for Synthetic Data Generation

FIG. 1A is a flow diagram depicting example processes for synthetic data generation in computer-based reasoning systems. In some embodiments, process 100 proceeds by receiving 110 a request for synthetic data. For example, a system or system operator may request additional or different training data in order to train a computer-based reasoning that will be used to control a system. In some cases, the system or operator may request anonymous data that is similar to a current training dataset (or different from, but still anonymized). In other cases, the system or operator may require more data than is in the current training dataset, and therefore may request additional data to augment the current training dataset. In some cases, synthetic data may be requested to direct sampling via a reinforcement learning process. The synthesized data (perhaps combined with original training data or by itself) may be used as part of a computer-based reasoning system to cause control of a system. Many controllable systems can be controlled with the techniques herein, such as controllable machinery, autonomous vehicles, lab equipment, etc. In some embodiments, the request for synthetic data may include a target surprisal and/or conviction for the target data. In some embodiments, if low target surprisal is requested, then the synthetic data may be close to and not differ much from existing data. If high target surprisal is requested, then the generated synthetic data may differ much from the existing data.

The request can be received 110 in any appropriate manner, such as via HTTP, HTTPS, FTP, FTPS, a remote procedure call, an API, a function or procedure call, etc. The request can be formatted in any appropriate way, including in a structured format, such as HTML, XML, or a proprietary format or in a format acceptable by the API, remote procedure call, or function or procedure call. As one example, the request may be received 110 by a training and analysis system 210 in the manner discussed above.

In some embodiments, optionally, the received 110 request for synthetic data may also include one or more conditions for the synthetic data. These conditions may be restrictions on the generated synthetic data. For example, if the synthetic data being generated is for a checkers game, a condition on the data may be that includes only moves that are part of a winning strategy, that survive for at least S moves without losing, and/or win within W moves. Another set of conditions on the synthetic data may be a particular board layout (e.g., the starting checkers game state, the current checkers game state), etc.

When the received 110 request includes one or more conditions for the synthetic data, the closest cases to the conditions may be determined 120 as focal cases. In some embodiments, the closest cases to the conditions may be determined as the K nearest neighbors (KNN) for the conditions (e.g., the K cases that are "closest" to meeting the conditions). For example, if there are two features that have conditions, A and B, and the conditions are A=3 and B=5, then the KNN for the conditions would be those cases that are closest to meeting the conditions of A=3 and B=5. In some instances, if there are more than K cases that fully meet the condition (e.g., there are more than K cases that have feature values of A=3 and B=5, which scenario will be more common if the conditions are on features which are nominal or categorical), then K cases may be selected from those cases meeting the condition. These K cases may be selected from among those that fully meet the conditions can be done randomly, or using any appropriate technique, such as by looking at the surprisal and/or conviction of those cases and choosing the K with the highest (or lowest) surprisal and/or conviction, or all of the K cases may be used. K may be 1, 2, 3, 5, 10, 100, a percentage of the model, specified dynamically or locally within the model, or any appropriate number. For distance measurements discussed herein (e.g., for use with K nearest neighbors), any appropriate measure, metric, or premetric may be used, including Euclidean distance, Minkowski distance, Damerau-Levenshtein distance, Kullback-Leibler divergence, 1-Kronecker delta, cosine similarity, Jaccard index, Tanimoto similarity, and/or any other distance measure, metric, pseudometric, premetric, index, etc.

The conditions may be any appropriate single, multiple, and/or combination of conditions. For example, individual values may be given for features (e.g., A=5 and B=3); ranges may be given (e.g., A>=5 and B<4); multiple values may be given (e.g., E="cat", "dog", or "horse"); one or more combination can be given (e.g., [(A>1 and B<99) or (A=7 and E="horse")]).

As discussed elsewhere herein, some embodiments condition the values of a feature on one or more previous-in-time values of a feature. In such cases, the value of C may be conditioned on C[t−1] (representing the value of C in a previous time period), and/or C[t−2], etc. in addition to or instead of other conditions. For example, the conditions may include A=5, B=3 and C[t−1]=99, C[t−2]=87. In some embodiments, the condition may just be on previous values (e.g., just conditioned based on C[t−1]=12). In some embodiments, the conditions may include previous-in-time values from multiple features. For example, the conditions may include A=5, A[t−1]=4, B=3, B[t−1]=2, C[t−1]=99.

As also discussed elsewhere herein, in some embodiments the conditions used may include a preserved feature values, such as the UIDs for the synthetic data. The UID may be a UID that exists in the set of training data cases. In addition to conditioning on the determination of values for undetermined features on the UID(s), the values may also be conditioned on one or more other values for features. For example, if a table of demographics for a financial institution has account demographics, it may have a UID. Synthetic data cases may be synthesized based on conditioning for each UID (or a subset, or randomly choosing UIDs, as discussed elsewhere herein). As discussed elsewhere herein, the training case with the same UID would then be one of the chosen focal cases (described herein). As another example, the synthetic table may be generated based on the condition of the UID, and the value of a feature, such as an age range. The focal cases would then be chosen based on the UID as well as the age range. This may result in the training case with the same UID being one of the focal cases. Further, there may be more than one UID used as a condition for synthesis of a particular data case, which may be useful when a table in the set of training data has more than one UID in each row.

The values for the conditioned features may be set or determined based on the corresponding values for the features in the focal cases (e.g., determined as the KNN of the conditions, as described above). For example, for each conditioned feature, the mean, mode, an interpolated or extrapolated value, most-often occurring value of the corresponding feature from among the focal cases may be chosen as the value for the feature in the synthetic data case. In some embodiments, the distribution of the values of the conditioned features in the focal cases may be calculated and a value may be chosen based on that distribution, which may include the maximum likelihood value, selection via random sampling, inverse distance weighting, kernel functions, or other function or learned metric. In some embodiments, the values for conditioned features are set to (or based on) the condition values (vs. the values for the conditioned feature in the focal cases as described above). For example, if the conditions are A=5 and B=3, then feature A may be set to the value 5 and feature B may be set to the value 3 regardless of the values of that feature in the focal cases.

When there are no conditions received 110 with the request for synthetic data, a random case may be selected as a focal case or a set of random cases may be selected as the set of focal cases. In embodiments using identifier contribution allocation, the random selection of an initial case may be weighted by the identifier contribution allocation, described elsewhere herein. When there are no conditions, then, in some embodiments, the techniques begin by selecting a random case, selecting the first feature, or a random feature, or the next feature prioritized by some metric, importance, conviction, or ranking, and select the value from the selected case as the value of the feature in the synthetic data value. Then, the techniques may proceed as described. For example, in some embodiments, the value for a first feature (e.g., A=12 or UID=17) is chosen from the chosen case and then the KNN are determined 120. The KNN may be the K cases that are closest to having that value (e.g., A=12 or UID=17) are chosen as the focal cases. Additionally, other values computed from the data that are related to surprisal, confidence, or distance may be used in the selection of the focal cases (e.g., preferring the values to be chosen from areas where there is insufficient data, or when combined with other surprisal metrics, to prefer values where there is not a lack of data but where the model residuals or uncertainty are high).

After the focal cases for the synthetic data have been determined 120 (whether or not based on received 110 conditions), then a first undetermined feature is selected 130. When there are no conditions, selecting 130 the first undetermined feature comprises selecting 130 one of the features from the randomly selected case that was not previously (or already) determined. When there are conditions on the synthetic data, then the conditioned features are first set based on the conditions and the focal cases that are KNN of the condition (as described elsewhere herein). After the first feature(s) have been determined (whether or not there are conditions), then the next (undetermined) feature may be selected. Selecting 130 which undetermined feature to determine next can be done in any appropriate manner, such as selecting randomly among the remaining undetermined features, choosing the feature with the highest or lowest conviction, etc.

The distribution of values for the undetermined feature is then determined 140. For example, the distribution may be assumed to be log normal, Laplace, Gaussian, normal, or any other appropriate distribution, and be centered, e.g., on the computed undetermined feature value or on the median or mode or weighted sample or selection (e.g., weighted by identifier contribution allocation (described extensively herein), probability, inverse distance, frequency, and/or other measure of likelihood) of the values for the undetermined feature in the set of focal cases (or in the training data). In some embodiments where identifier contribution allocation is used, the weighting determined as part of the identifier contribution allocation may be used for the first feature value determined (only), or may be used for other and/or multiple of the feature values.

The distribution for the feature can also be determined by parameterizing it via surprisal using the distribution's entropy. For example, if a distribution has an error, $\sigma$, with the error modeled as a Gaussian distribution, and we know that the entropy of a sample from Gaussian distribution is $\frac{1}{2} \log(2 \Pi e \sigma^2)$, we can adjust the error parameter to match a specified level of surprisal for that feature when taking a sample of the feature as the synthesized value. Alternatively, surprisal and/or conviction may also be determined by measuring other types of information, such as Kullback-Leibler Divergence ("KL divergence" or "$\text{Div}_{KL}(x)$") or cross entropy, and a desired surprisal can be attained by adjusting the corresponding parameters for the distribution. Methods describing distance from a point as a probability can be used to map the surprisal to distance, and may include any relevant distribution. When synthesizing data for multiple features, each feature can be set to the same surprisal, or alternatively each feature can "use up" the surprisal budget for the synthetic data parameterizing each feature's distribution with its own amount of surprisal, treating total surprisal of the synthesized data as a budget or goal for all of the features together. Some features may be accorded more surprisal than others, and therefore may "use up" more of the surprisal budget. In cases where higher surprisal is desired, distributions will typically be wider. In situations where lower surprisal is desired, distributions will typically be narrower. The relative surprisal accorded each feature may be set or determined in any appropriate manner, including assigning the relative amount of surprisal randomly, having the relative amounts set by a human operator, and/or setting them based on a particular measure or metric, such as having the features with the lowest (or highest) surprisal in the training data being accorded more of the surprisal budget. Extensive additional discussion of these techniques is given elsewhere herein.

The value of for the undetermined feature for the synthetic data case may then be determined 150 based on the determined 140 distribution. Determining the value based on the determined 140 distribution comprises selecting a value (or sampling) randomly based on a random number and the determined 140 distribution. In some embodiments, this is performed via inverse transform sampling. As one example, a random value representing the $3^{rd}$ percentile of the distribution of the random variable would translate to a value in the $3^{rd}$ percentile of the distribution, and a uniformly generated random number may be transformed into the distribution by the inverse cumulative density function. In some embodiments, the distribution does not have a closed form solution to translate a uniformly chosen random number to a random number from the parameterized distribution, and techniques to generate the required random number include rejection sampling, the Box-Muller transform, and the Ziggurat algorithm. As denoted by the dotted line from determining 150 and selecting 130 and/or determining 120, the process 100 may continue to determine values for features until there are no more undetermined features. In order to determine 150 values for each subsequent undetermined feature in the synthetic data case, the already-determined (or previously-determined) feature values are used to determine 120 the K nearest neighbors (a new set of focal cases) to that set of already-determined values (e.g., all of the feature values set to that point). For example, if values A=3, B=5, and C=9.7 (or UID=17, A=3, B=5, and C=9.7) have already been set for the synthetic data case, either via conditioning or using process 100 (and value D is next to be determined), then the K nearest neighbors to the values for A, B, and C (or UID, A, B, and C) will be the new set of focal cases (as depicted by the dotted line between determining 150 and determining 120 and/or selecting 130). Then the distribution (e.g., DistD) for that subsequent undetermined feature (e.g., feature D) is determined 140 for the new set of focal cases. A value for the subsequent undetermined feature (e.g., D) is the determined based on a random sampling of the distribution (e.g., DistD) determined for that feature. When all of the feature values have been determined 150, then the synthetic data case is complete.

In some embodiments, determining 150 a value for a nominal feature may include skipping the distribution determining 140 step, and instead determining the value for the feature differently based on the desired surprisal or conviction. For example, if the desired conviction is infinity or an arbitrarily large number (low surprisal), then the value for the nominal feature may be chosen so that the data case as a whole represents a data case in the original training data cases, thus representing unsurprising results. If conviction is closer to one (e.g., within a threshold value of one), then the distribution used to determine the nominal value may be a blend of the global residual (e.g., the probability of each nominal value in the set of original training data cases) and the local residual (e.g., the probability of each nominal value in the set of focal cases). Blending the local residual and global residual may take any appropriate form, such as weighting each of the local and global residual, and combined the two weighted results. The weights may be any appropriate weight, such as equal weights, or a weighting determined based on conviction. Further, the blending of local and global residual may be more continuous than just two samples, involving multiple samples of the distribution based on the conviction. If desired conviction is or approaches zero (high surprisal), then the value for the nominal may be chosen randomly among the possible nominal values (e.g., using a 1/N probability for each of N possible nominal values). When conviction is outside the thresholds to use the "infinity" conviction, the "one" conviction, and the "zero" conviction, then, in various embodiments, different or similar calculation methods may be used. For example, in some embodiments, if desired conviction is less than one half, then the calculation techniques associated with a conviction of zero may be used. In some embodiments, a nominal value can be chosen based on a weighting of the two techniques, optionally with the distance to the key conviction value being the weighting. For example, with a desired conviction of 0.5, the weighting between use of 1/N probability for each of N possible nominal values may be weighted 50% and the blending of global and local residuals may be weighted 50% and the value for the feature may be determined based on the weighted results.

In some embodiments, optionally, the synthetic data case can be tested for fitness 160. Testing the synthetic data case for fitness 160 can include any appropriate technique, including confirming that the synthetic data case meets any received 110 conditions, or whether it meets other criteria, such as a fitness score or function. The fitness score or function may be any appropriate function. In some embodiments, the fitness function depends on the domain of the synthetic data case and can be a measure of performance of the synthetic data case as compared to other data cases. For example, the fitness function may be a measure of speed, processing efficiency, or some other measure of performance. Further, the fitness function might be modified at random, to introduce additional variation. Further, as discussed herein, determining the fitness of the synthetic data case may include determining the k-anonymity, validity, and/or similarity of the synthetic data case.

In some embodiments, a single data case may be tested for fitness and/or similarity 160 (in the case of FIG. 1A, 1B, 1C, and FIG. 1D) and/or multiple data cases may be tested together for fitness and/or similarity (not depicted in FIG. 1A, 1B, 1C, and FIG. 1D). For example, the k-anonymity, validity, and/or similarity of the set of two or more data cases may be tested 160 together, and the decision whether to retest, discard, and/or replace the set of two or more data cases would be made as a whole. Further, in some embodiments, any of the metrics described herein for dataset quality may be used to test the similarity and/or fitness for any of one or more data case as part of testing fitness and/or similarity 160. For example, any of the metric or calculations used (together or separately) as part of determining 630 a dataset quality metric may be used to determine the fitness and/or similarity 160 of one or more data cases.

For example, a test for fitness and/or similarity 160 may include comparing a dataset quality metric to one or more thresholds, and each of the dataset quality metric may be determined based on one or more statistical quality metrics, one or more model comparison metrics, and/or one or more privacy metrics. As one example embodiment, a test for fitness may be made based on comparing a dataset quality metric that is determined based on:

One or more statistical quality metrics and one or more model comparison metrics One or more privacy metrics and one or more model comparison metrics One or more statistical quality metrics and one or more privacy metrics Two or more statistical quality metrics Two or more model comparison metrics Two or more privacy metrics And/or any combination of the above Further, in some embodiments, testing for fitness and/or similarity 160 may include testing one or more metrics to one or more thresholds without first computing a dataset quality metrics. For example, one or more of statistical quality metrics, model comparison metrics, and/or privacy metrics (or a combination or function of the foregoing) may be compared to threshold(s). As a particular example embodiment, testing for fitness and/or similarity 160 may include comparing one or more dataset quality metrics to one or more thresholds, and the fitness or lack of similarity 160 may be met if the dataset quality metrics are beyond the threshold(s) (e.g., less or more than 0.5, 1, 2.5, 99, etc.).

Further, in some embodiments, two or more metrics may each be compared to thresholds. For example, in some embodiments, a dataset quality metric (e.g., calculated based on one or more statistical quality metrics, one or more model comparison metrics, and/or one or more privacy metrics) may be compared to a first threshold and one or more statistical quality metrics, one or more model comparison metrics, and/or one or more privacy metrics may each be compared to additional thresholds as part of testing for fitness and/or similarity 160. As a more specific example embodiment, a privacy metric (or any one or more of the other metrics) may be compared to a first threshold(s), and a dataset quality metrics (e.g., calculated based on one or more statistical quality metrics, one or more model comparison metrics, and/or one or more privacy metrics) may be compared to a second threshold, and only if both of those two metrics meet those threshold tests, will fitness and/or lack of similarity 160 be met. As a yet more specific example, after a synthetic data case is generated (e.g., using the techniques herein), a minimum distance percentile metric (discussed herein), and a minimum distance ratio metric (discussed herein) may be determined for the new synthetic data case. If each of the minimum distance percentile metric and the minimum distance ratio metric meet certain thresholds, then the synthetic data case may be considered to have sufficient fitness 160, otherwise, it may be considered to not have sufficient fitness 160. In other examples, one or the other of those two measures (or a function of the two) may be used as the test of fitness 160. In yet other examples, other metrics discussed herein may be combined mathematically and/or compared to thresholds as tests of fitness.

In some embodiments, after the completion of determination and testing of the synthetic data case, optionally, more synthetic data may be generated, as indicated by the dashed line from 160 and 170 to 120 (in the case of FIG. 1A, 1B, and FIG. 1D) and/or 121 (in the case of FIG. 1C). The decision to generate more synthetic data may be based on the received 110 request for synthetic data. For example, the received 110 request may indicate that a certain number (or at least a certain number) of synthetic data cases are to be generated, that cases are generated based on a threshold for surprisal or conviction for new cases (e.g., generate cases as long as the surprisal of each new case is at least beyond a certain threshold), and/or the like. The decision to generate more synthetic data may also be made based on one or more criteria, where the criteria are different from the conditions on the data. For example, the one or more criteria may include generating an amount of data based on the amount of data in the set of training data. As a more specific example, the one or more criteria could include generating data until the number of synthetic data cases (N') meets a threshold based on a function of the number of data cases in the set of training data (N). This function may be N'=N, N'=(N−3)*1.04, N'=N*0.94, or any other function. The criteria may also include generating more cases until particular measures related to the set of training data are approximated by the synthetic data (e.g., a density of cases, distribution of cases, minimal number of cases of particular types, etc.). When there are more synthetic data cases to generate, the process will proceed as discussed herein. In some embodiments, not depicted in FIG. 1A, FIG. 1B, FIG. 1C, or FIG. 1D, the process may additionally or instead return to receive 110 more requests for synthetic data before proceeding to determine and test more synthetic data case(s).

Upon completion of determination and testing of the synthetic data case, optionally, it can be provided 170 as synthetic data. For example, the synthetic data case may be provided 170 in response to the received 110 request for data. In some embodiments, multiple synthetic data cases may be created in response to receiving 110 the original request, and may be provided 170 in response to that request. Providing the synthetic data case(s) in response to the request can take any appropriate form, including having them sent via HTTP, HTTPS, FTP, FTPS, via an API, a remote procedure call, a function or procedure call, etc., and/or in response to one of the foregoing.

In some embodiments, optionally, after one or more synthetic data cases have been created, control of a controllable system can be caused 199 based at least in part on the synthetic data case(s) created using process 100. For example, not depicted in FIG. 1A, a computer-based reasoning model may be trained based on the synthetic data case(s) (and/or other sets of synthetic data cases, the training cases, and or a combination of such cases, or a combination of (sub)sets of such cases, etc.), and that model may be used to control a controllable system. Numerous examples of causing 199 control of a controllable system are discussed herein and include, manufacturing control, vehicle control, image labelling control, smart device control, federated system control, etc.

Additional Example Techniques for Synthetic Data Generation: Identifier Contribution Allocation In some embodiments, one or more identifiers may be used to determine identifier contribution allocations for those (individual or combinations of) identifiers. Generally, the identifier contribution allocation to create a particular synthetic data case may be used to weight the contribution of cases associated with those (individual or combinations of) identifiers ("IDs"). Using these techniques may be beneficial when it is important to de-emphasize, in the generated synthetic data, the distribution of values across an ID (or multiple IDs). Consider an example of a single ID, a customer ID, where, in the training data, the frequency of data for each customer ID is not evenly distributed (e.g., consider 5 customers A-E, where 50% of the orders are from customer A, 40% from customer B, 4% from Customer C, 4% from Customer D, and 2% from Customer E). In order to not reveal the distribution of training cases among the 5 customers in the training data set, the influence of data associated with each customer ID may be modified. As one example, the data associated with each customer may be given similar or equal weight, in aggregate, regardless of the number of data points for that customer. As a further example, the embodiment may assign weights to data points, where the weights are determined based on the number of datapoints for that ID (here, the customer ID). Consider the example above with 100 total orders (e.g., 100 training data cases), corresponding to 50 orders (data cases) for Customer A, 40 for Customer B, and 4 for Customer C, 4 for Customer D, and 2 for Customer E. If equal total identifier contribution allocation for each customer ID is being used in the embodiment, then the data for each customer would be weighted so that it was inversely proportional to the number of orders (data cases) for that customer. In the example, data cases associated with each customer ID would be given a weight: (customer's total identification allocated contribution, which let's say is 20% for each Customer ID)/(number of data points for the customer) for each customer is Customer A (20%/50=0.4%), B (20%/40=0.5%), C (20%/4=5%), D (20/4=5%), E (20%/2=10%) and these could be scaled, e.g., so that the highest % was 100%, resulting in this example in multiplying each by 10: Customer A (4%), B (5%), C (50%), D (50%), and E (100%).

In some embodiments, other distributions for total identifier contribution allocation for each value of an ID may be used, such as randomly assigning total identifier contribution allocations to each customer (e.g., Customer A might be randomly assigned 15%, Customer B 10%, Customer C 40%, Customer D 15%, Customer E 20%—resulting in an identifier contribution allocation for each case for Customer A to be 15%/50, Customer B 10%/40, Customer C 40%/4, Customer D 15%/4, and Customer E 20%/2), determining it as a function of the total cases (e.g., total identifier contribution allocation=squareroot(total number of cases for identifier)/number of customers), manually or automatically assigning the total identifier contribution allocation for one or more ID values, etc. Regardless of how the total identifier contribution allocation is determined, in various embodiments, the weighting for each customer's data may be determined using the following equation to determine weighting: (total identifier contribution allocation)/(number of data points for the customer).

In the previous example, a single feature (e.g., Customer ID) is used as the identifier on which to determine total identifier contribution allocation. In some embodiments, multiple IDs may be used, and each may be used in determining the identifier contribution allocation (sometimes called "case weight") for each individual case. For example, the techniques described above may be performed for each identifier, and the identifier contribution allocations for each may be multiplied together in order to produce an identifier allocation contribution for the data case.

In some other embodiments and examples, a set of features, taken together, may be considered a single "identifier" for which total identifier contribution allocation is determined. Consider, e.g., features that together, may identify an individual, such as two or more of name, address, zip code, dates or times of interaction or transactions, phone number, vehicle IDs, fax numbers, email address, URLs, social security numbers, IP addresses, medical record numbers, biometric identifiers, account numbers, and/or any other unique identifier. The combination of such features may be treated as a single ID, and distribution of data over that feature may be performed using the techniques herein. For example, consider a delivery address at a heavily-peopled workplace combined with a customer number shared by a family. In some embodiments, those two combined may uniquely identify a member of that family that works at that workplace. As such, it may be beneficial to use a combination of delivery address and customer number as a unique identifier and to allocation contribution based on that unique identifier using the techniques herein. This may be beneficial when it is desired that the distribution of data with respect to the combined identifier is something that is important to protect when generating synthetic data. With these combined identifiers, total identifier contribution allocation may be determined based on the combined identifier. For example, if there were 100 unique customers and, when combined with addresses associated with those 100 customers, there were 175 unique (customer ID, address) combinations (e.g., customers averaged having 1.75 addresses associated with their accounts). The total identifier contribution allocation would be determined for each of those 175 combined identifiers using the techniques herein.

In various embodiments, an operator may specify which one or more features should be treated as identifiers and/or identifiers may be determined automatically.

As noted elsewhere herein, the identifier contribution allocation may be used as a weight in order to modify how much each data case "contributes" to the choice of a feature value. In embodiments where identifier contribution allocation is used, this may result in data cases in the original training data associated with more common identifiers being weighted lower than data cases in the original training data associated with less common identifiers.

As a more specific example, in some embodiments, the techniques calculate "case weights" for each data case as follows: for each ID feature, the technique will create a count of unique values for that ID, e.g., if there is one ID feature named 'color', and a dataset with 10 cases, where there are 5 red, 3 green and 2 blue, the case weights for each of the cases may be the reciprocal of the count, thus for the 5 red cases, each of their case weights (identifier contribution allocations) would be 0.2, for the 3 green cases the identifier contribution allocation would be 0.33333, and 0.5 for the blue.

If there are multiple ID features, the computed case_weight may be the product of reciprocals of the counts for each case. For example, if there another ID column (size) with 1 tiny, 5 small, 2 medium and 2 large, the resulting counts and case_weight would be as follows:

| COLOR | SIZE | color_count_reciprocal | size_count_reciprocal | case_weight (identifier contribution allocation), non-normalized |
|---|---|---|---|---|
| red | small | .2 | .2 | .04 |
| red | small | .2 | .2 | .04 |
| red | small | .2 | .2 | .04 |
| red | medium | .2 | .5 | .1 |
| red | large | .2 | .5 | .1 |
| green | tiny | .33333 | 1.0 | .33333 |
| green | small | .33333 | .2 | .06666 |
| green | small | .33333 | .2 | .06666 |
| blue | medium | .5 | .5 | .25 |
| blue | large | .5 | .5 | .25 |

In another example embodiment, the case weights may be, e.g., the reciprocal of the number of cases with the unique combination of values. Using the same color and size example above, we would have:

| COLOR | SIZE | Unique Combo (7 total) | case_weight (rounded identifier contribution allocation), non-normalized) |
|---|---|---|---|
| red | small | red-small | .0476 |
| red | small | red-small | .0476 |
| red | medium | red-medium | .143 |
| red | large | red-large | .143 |
| green | tiny | green-tiny | .143 |
| green | small | green-small | .0714 |
| green | small | green-small | .0714 |
| blue | medium | blue-medium | .143 |
| blue | large | blue-large | .143 |

In some embodiments, the computed identifier contribution allocation may be stored as a hidden or built-in feature value.

In some embodiments, after determining 120 the nearest (focal) cases, the technique may proceed to determine 150 a value for the selected feature by normalizing the influence amounts for each of the nearest neighbors based on their similarity/distance to the prediction. In some embodiments, however, when the techniques related to identifier contribution allocation are being used, the techniques will first scale each of the influence amounts for each of the nearest cases by its corresponding identifier contribution allocation, prior to or as part of the normalization.

Not depicted in the figures, some embodiments include optimizing hyperparameters for accuracy (described elsewhere herein), we take identifier contribution allocation scaling of influence weights into account.

In some embodiments that do not use identifier contribution allocation, when synthesizing non-conditioned data (described elsewhere herein), at the initiation of generating each synthetic data case, a first case may be randomly selected as a starting point, where that random selection is uniformly random from among all cases. In embodiment using identifier contribution allocation, however, that initial selection of a case may be weighted by the identifier contribution allocation. This may be useful, for example, when it is beneficial to have that initial case (and therefore the selection of the first feature value), be influenced by the identifier contribution allocation, and therefore, possibly making the cases associated with rarer IDs more likely to be selected (relatively speaking) than those with more common IDs; this may, in turn, help prevent the initial selection from being biased towards the more common IDs. For example, if a dataset had an ID that is associated with 90% of the data cases in the dataset, if we were still doing uniform random selection, we would start generating with values from cases that had that ID 90% of the time. For embodiments using the identifier contribution allocation techniques, the likelihood of a data case with that ID representing 90% of the dataset being initially selected would be dramatically lower. As another example, without using the identifier contribution allocation techniques, the likelihood of selecting each case would be 1/N, where N is the number of data cases in the original data set. Using the techniques for identifier contribution allocation, the probability of initial selection for each case i may be (depending on embodiment), 1/N*InitialContributionAllocation(i), where IntitialContributionAllocation(i) represents a function described in the techniques above.

Additional Example Processes for Synthetic Data Generation: Value Checking

FIG. 1B is a flow diagram depicting example processes for synthetic data generation in computer-based reasoning systems. Similar numbers and text are used to describe similar actions in FIG. 1A, FIG. 1B, FIG. 1C, and FIG. 1D. The process 100 described in FIG. 1B may include different and/or additional steps. For example, turning to FIG. 1B, as indicated by the dotted line, after the value for a feature is determined 150, the techniques optionally include checking whether the determined 150 value is valid 152. In some embodiments, the determined 150 value is checked for validity 152 using feature information, such as feature bounds and/or k-anonymity. For example, if feature bounds are known for a specific feature, and the value determined 150 for that feature is outside the feature bounds, then corrective action can be taken. Not pictured in FIG. 1, feature bounds may be determined based on the model, the data (e.g., observed and/or determined bounds of the feature), provided by an operator (e.g., set bounds of the feature), and/or the like. In some embodiments, other feature information may also be used to check whether the value is valid 152. For example, if the feature is related to one or more other features via correlation, inversely, or via other known relationship, then the value for the feature can be checked for validity based on the values of the one or more other related features. As a more specific example, if a feature indicates that a distributable agricultural quantity may be fertilizer or seeds, then the distribution rate bounds may differ considerably based on the type of distributable commodity. Nitrogen may have a distribution rate between one and six pounds per one thousand square feet. Ryegrass seeds, on the other hand, may have a distribution rate between five and ten pounds per one thousand square feet. Further, each of these distribution rates may be influenced by geographic region (e.g., as another feature). As such, checking the validity 152 of a distribution rate value may depend on both the type of agricultural item being distributed (a first additional feature) as well as geographic region (a second additional feature).

If the determined 150 value is determined to be invalid 152, then corrective action can be performed. Corrective action can include one or more of re-determining a value for the feature (e.g., as described with respect to determining 150 and represented by the dotted lines from determining 150 to determining 120 and selecting 130), and optionally again checking the validity 152 of the newly determined 150 value. This process may continue until a valid value is determined, and/or up to a certain number of attempts before performing a different type of corrective action. In some embodiments, either after first re-determining 150 a new value for the feature, or instead of re-determining 150 a new value for the feature, a new value for the feature can be determined using the feature information, such as feature range. For example, the new value may be determined using a distribution across the feature range (e.g., using a uniform distribution, a normal distribution, etc.). In some embodiments, the new value for the feature may instead be determined by capping it at the feature boundaries.

Additional Example Processes for Synthetic Data Generation: Identity and/or Similarity Checking As another example of the additions and or changes to the techniques or process 100 depicted in FIG. 1B, FIG. 1C, and FIG. 1D (vs. FIG. 1A), the techniques may include, in addition to or instead of optionally determining fitness 160 of a synthetic data case, determining similarity 160 of the synthetic data case with all or a portion of the training data. Further, in some embodiments, even if not depicted in the figures, determining the validity 152, fitness 160, and/or similarity 160 of generated data may be performed as part of the same step. As noted above, in some embodiments, it may be important for synthetic data to differ from the existing training data. As such, the generated data may be checked for similarity with the training data. This similarity test may be based on a distance measure of all and/or a subset of the features. For example, if a subset of features is considered particularly sensitive or important, the distance measure may be used based on that subset of features. For example, instead of, or in addition to, checking the distance of all features between the generated data and the training data, the distance of a subset of the features may be checked. Furthering the example, if three features have been determined or are known to be particularly determinative, then the distance or similarity of those features for the generated data may be determined (as compared to the training data).

Similarity may be determined using Euclidean distance, Minkowski distance, Damerau-Levenshtein distance, Kullback-Leibler divergence, cosine similarity, Jaccard index, Tanimoto similarity, and/or any other distance measure, metric, pseudometric, premetric, index, and/or the like. In the event that synthetic data is identical or too similar to existing training data (e.g., as measured by one of the measures discussed above), the synthetic data case may be modified (e.g., resampled) and retested, discarded, and/or replaced.

As noted above, similarity of newly-generated synthetic data cases may also be tested using certainty scores (e.g., any of the conviction measures discussed here). If the certainty score is beyond a certain threshold (e.g., prediction conviction being over a threshold), then the case may be modified (e.g., resampled) and retested, discarded, and/or replaced. In some embodiments, as discussed elsewhere herein, a function of the certainty score may be used to determine whether to modify (e.g., resample) and retest, discard, and/or replace the newly-generated synthetic data case, and this function may additionally test to see if the certainty score is beyond or within some threshold or thresholds.

One or more newly generated synthetic data cases may be tested against at least a portion of the training data. For example, in some embodiments, it may be important that newly generated cases differ from all data in the training data. As such, newly generated data cases may be assessed for similarity with all data cases in the training data. If over-similarity is found, then the synthetic data case may be modified (and retested), discarded, or replaced (and the replacement synthetic data case tested for similarity). In some embodiments, it may only be important that the synthetic data case differ from a portion of the existing training data. As such, the newly generated data case may be tested for similarity to only that portion of the cases. As a more specific example, if portions of the training data have personal information and other portions do not (e.g., the latter may have been synthetically generated, and/or may be part of the public domain), then the test for similarity may only be with respect to the portion of concern—the former portion containing personal information. In some embodiments, determining similarity (or fitness) 160 of the generated or synthetic data case may include determining the k-anonymity of the data case (as discussed elsewhere herein).

As noted above, determining the similarity of the synthetic data cases to the existing training data may be important in embodiments where the synthetic data needs to exclude identical and/or merely similar synthetic data as compared to the existing training data. For example, if there is personally identifiable information and/or data usable to re-identify an individual in the existing training data, then it may be useful if the synthetic data differs enough from the existing training data in order to ensure that the synthetic data cannot be re-identified to persons in the existing training data. As a more specific example, if the synthetic data case were generated as identical to a training case in the existing training data for person X, then that synthetic data case would be re-identifiable to person X. In contexts where it is desirable that the synthetic data does not represent any person from the existing training data, then it may be beneficial to determine whether there is any synthetic data that can be re-identified and modify or discard that synthetic data. Further, whether or not the data includes personally identifiable information, ensuring that the synthetic data cases differ from the existing training data may still be desirable. For example, it may be desirable that the synthetic data not represent any particular existing training data in order to ensure that a model can be made without including that training data. For example, a data owner may want to share data (e.g., data related to machine vibration analysis) with a collaborator company, but may not want to share data specific to their operation. As such, they may desire that the synthetic data not be overly similar to their existing training data, but still be useful for the collaborator company. The same can be true for a portion of the data. For example, the data owner may want to ensure that data related to a particular driver (for self-driving vehicles) not be included in the synthetic data. As such, that driver's data may be checked against the synthetic data for over similarity, and any overly-similar data may be modified or discarded.

Additional Example Processes for Synthetic Data Generation

FIG. 1C is a flow diagram depicting example processes for synthetic data generation in computer-based reasoning systems. Similar numbers and text are used to describe similar actions in FIG. 1A, FIG. 1B, FIG. 1C, and FIG. 1D. The process 100 described in FIG. 1C may include different and/or additional steps. For example, turning to FIG. 1C, the process depicted in FIG. 1C includes determining 121 one or more initial case(s). In some embodiments, there may be one initial case, and this initial case may be used as the basis on which the synthetic data is generated. The initial case may be chosen randomly from among the cases in the training data; the values of the features for the initial case may be chosen at random (e.g., set as random values that satisfy the type (e.g., integer, positive number, nominal, etc.) of the feature, such as choosing an integer if the feature requires an integer); may be chosen at random based on the distribution of the features in the training data (as discussed elsewhere herein); may be chosen to match one or more (or all) features of a case in the training data; a combination of these, etc. In some embodiments, two or more seed cases may be chosen (e.g., based on one or more conditions, at random, etc.), and the initial case can be determined based on the two or more seed cases (e.g., averaging the values from among the cases for each feature, using a voting mechanism for feature values, choosing randomly among the feature values of the seed cases, and/or the like).

After the initial case is determined 121, a feature in the case is selected 130 to be replaced, which may also be termed "dropping" the feature from the case. Selecting a feature is described elsewhere herein, and can include selecting a feature at random, selecting a feature with the lowest or highest conviction (of any type), and or any other technique, including those discussed herein. Once a feature is selected 130, then a value for the feature may be determined 150. Determining 150 the value for the feature may be accomplished based on the determined 140 distribution for the feature in the training data (as described elsewhere herein) as a whole (sometimes referred to as the global model). In some embodiments, the value for the features may be determined 150 by determining 140 the distribution for the feature for the local model (e.g., the k nearest neighbors). For example, in some embodiments, the closest k nearest neighbors of the case with the feature dropped out may be determined and the value for the feature may be determined based on the corresponding values for the feature in the k nearest neighbors. The local model distribution may be determined 140 and used to determine 150 the value for the feature. In some embodiments, not depicted in FIG. 1C, the value of the feature for the synthetic data case can be determined from the corresponding values from the k nearest neighbors in any appropriate manner (e.g., not based on the local model distribution), including averaging the values from among the cases for each feature, using a voting mechanism among the values from among the cases for each feature, choosing randomly among the values, and/or the like.

In some embodiments, the value for more than one feature may be dropped out and determined 140 and/or 150 at the same time. For example, two, three, seven, etc. features may be dropped out, and valued for those two, three, seven, etc. features may be determined based on a global model, a local model, etc. as described herein.

In some embodiments, features are dropped out, and new values are determined 140 and/or 150 iteratively until a termination condition is met, as indicated by the dashed line between determining 150 and selecting 130 and determining 120. For example, in some embodiments, features will be dropped out and redetermined a fixed number of times (e.g., if there are F features, then this might happen a multiple of F times (e.g., 6*F), or a fixed number of times, such as 10, 100, 2000, 10^7, etc., regardless of F). Further, features may be dropped out and added back in in an order that ensures that each feature is replaced the same number of times, or a similar number of times (e.g., continue until all features have been replaced six times or replace all features until each feature has been replaced at least six times, but no more than seven times). In some embodiments, the number of times that a feature is replaced is not measured against the number of times that other features are dropped out and replaced, and the techniques proceed irrespective of that measure.

In some embodiments, features are dropped out and added back in until there is below a threshold difference between the case before and after the feature was dropped out and the value for it redetermined. For example, the distance between the case before the feature(s) are dropped out and replaced and the case after feature value(s) are replaced can be determined. In some embodiments, if the distance is below a particular threshold, then the process of iteratively dropping and replacing values will terminate. In some embodiments, the distance of the last R replacements may be measured. For example, if the distance between the pre-replacement case and the post-replacement case for the last R replacements is below a particular threshold, then the dropping and replacing of values will terminate. The distance measure used may be any appropriate distance measure, including those discussed herein and Euclidean distance, Minkowski distance, Damerau-Levenshtein distance, Kullback-Leibler divergence, cosine similarity, Jaccard index, Tanimoto similarity, and/or any other distance measure, metric, pseudometric, premetric, index, or the like.

In some embodiments, the dropping and replacement of feature values may continue until the case is within a threshold distance of a case in the training data. For example, if a case is below a certain threshold distance to a case in the training data, the dropping and replacement of feature values may be terminated. This may be beneficial when it is the case that having a close distance between the synthetic data case and a case in the training data means that the synthetic data case is sufficiently similar to cases in the training data. Further, in some embodiments, the dropping and replacement of feature values may only terminate if the distance is below a certain closeness threshold, but above a second, identity threshold. This approach may be beneficial when being closer than an identity threshold means that the synthetic data case risks being overly similar, and possibly identifiable as, a case in the training data.

In some embodiments, features are dropped out and added back in until there is below a threshold distance between the value of a feature dropped out and that added back in. For example, if the replacement value of a feature is within a certain predefined distance of the value it is replacing, then the process of dropping and replacing values may stop. In some embodiments, the differences of the values for the last R replacements are checked to determine if, together, they are below a particular threshold. If they are, then the process of dropping and replacing values may be terminated and process 100 may continue.

In some embodiments, features are dropped out and added back in until a combination of conditions are met. For example, in some embodiments, a check may be made to ensure that both (or either) of the conditions of the case changing by less than a first threshold distance is met and there having been M iterations already performed.

In some embodiments, after or instead of returning 190 the synthetic data, control of a controllable systems is caused 199 using the synthetic data. Return 190 of synthetic data and causing 199 control of a controllable system using synthetic data are discussed extensively herein.

Additional Example Processes for Synthetic Data Generation

Figure 1D:
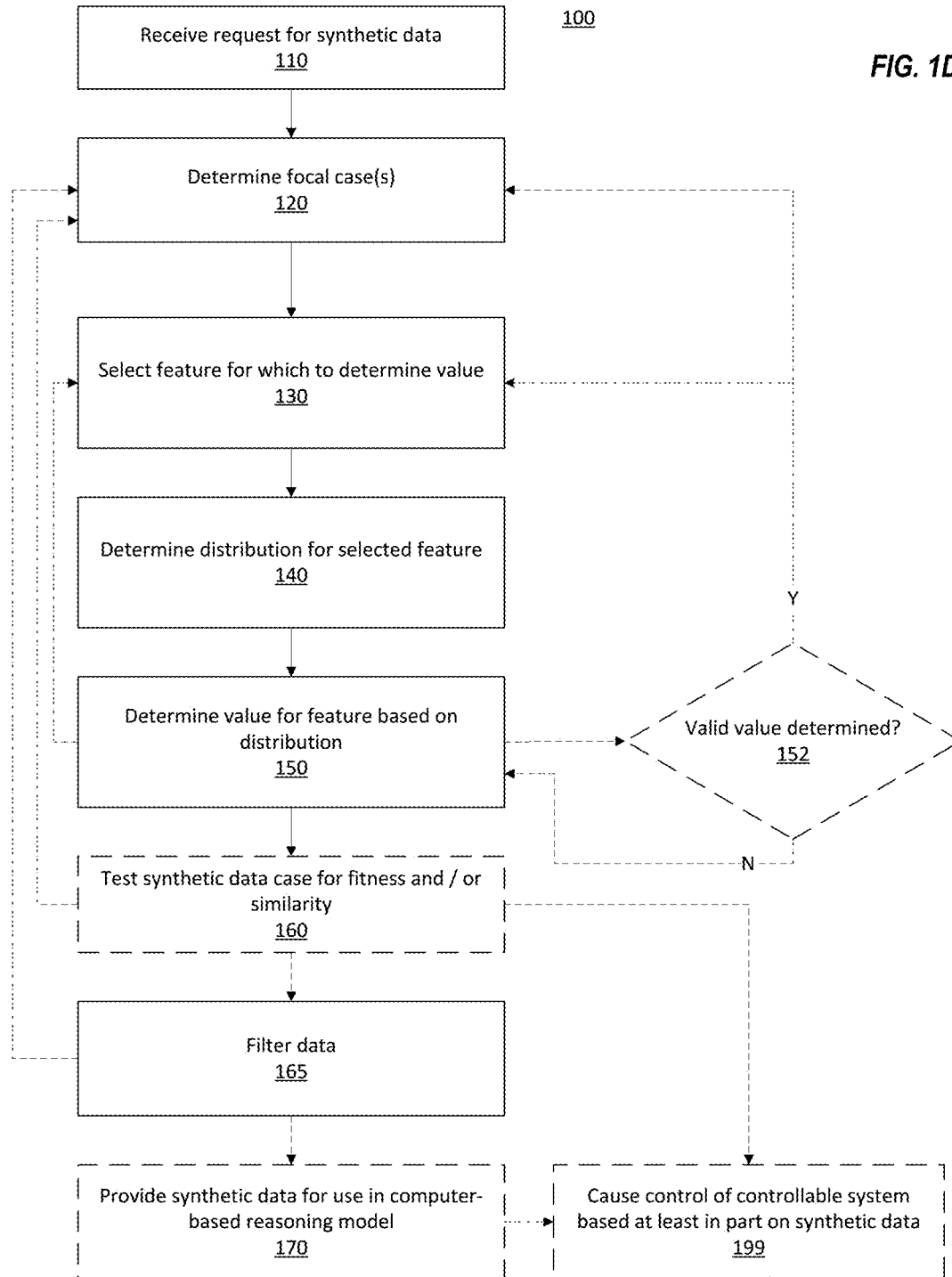

FIG. 1D is a flow diagram depicting example processes for synthetic data generation in computer-based reasoning systems. Similar numbers and text are used to describe similar actions in FIG. 1A, FIG. 1B, FIG. 1C, and FIG. 1D. The process 100 described in FIG. 1D may include different and/or additional steps. For example, the process 100 depicted in FIG. 1D includes filtering 165 data from the generated synthetic data.

As a general overview, the process 100 may include receiving 110 a request for synthetic hypergraph data to be generated based on a set of hypergraph training data, as well as one or more hypergraph feature filters which may define features (e.g., edges, wedges, triangles, claws, stars, etc.) to maintain (or generate) in the synthetic hypergraph data. The techniques, in some embodiments, may proceed by generating (120 and/or 121 to 150 or 160) more synthetic hypergraph data than needed, and then filtering 165 the synthetic data back down to a desired size (or size range) based at least in part on the one or more hypergraph feature filters. Stated another way, in some embodiments, the this is accomplished by generating an oversized synthetic hypergraph dataset (more than a desired size) and then filtering that set down while maintaining the filtered features.

Returning to the top of FIG. 1D, in some embodiments, a request for synthetic data may be received 110. Receiving 110 this request for synthetic data is described elsewhere herein. In some embodiments, this request for synthetic data may be a request for synthetic hypergraph data, and that synthetic hypergraph data may be generated based on a set of training hypergraph data cases. The request may also include a desired size of the resultant synthetic hypergraph dataset, though, in some embodiments. The desired size of the resultant synthetic hypergraph dataset is determined from a different request, setting, or based on the size of the training hypergraph dataset. Further, the request may include one or more hypergraph feature filters for the synthetic hypergraph data. In some embodiments, these feature filters may also, or instead, be determined based on the set of training hypergraph data cases from which the synthetic data is to be generated. For example, the set of training hypergraph data cases may include a certain number or percentage (or ratio) of hypergraph features, and the determined (or received) one or more hypergraph feature filters may be related to those certain number or percentage (or ratio) of hypergraph feature filters. For example, if the set of training hypergraph data cases have 600,000 claws (a type of graph feature) and a set of 1500 nodes or vertices, the one or more hypergraph feature filters may be determined to be either or both of attempting to maintain or maintaining the number (600,000) or ratio (400:1) of claws in the training hypergraph data (or perhaps maintaining those features within a tolerance of the number or ratio in the training hypergraph dataset). Further, in some embodiments, there may be two or more hypergraph feature filters. As an example, the hypergraph feature filters may include maintenance of the number or ratio of two or more of claws, triangles, edges, wedges, higher degree structures, etc. As a more particular example, the hypergraph feature filters may include maintaining 600,000 claws, 15,000 nodes, 50,000 wedges, and 5,000 edges. In some embodiments, the hypergraph feature filters may be to include (either determined based on the training hypergraph dataset or received in a request such as the received 110 request) at least a minimum number of a particular hypergraph feature (e.g., at least 500,000 claws), a maximum number of a hypergraph feature (e.g., at most 675,000 claws), and/or a combination of the two (e.g., at least 500,000 claws, but no more than 675,000 claws). Further, the one or more feature filters may preserve elements that are commonly denoted as being "small world" (e.g., numbers of cliques, near-cliques, a minimal clustering coefficient, etc., ability to traverse from any one node to any other node in a small number of hops) and/or scale free (e.g., a number and degree of hubs, average distance between nodes, etc.).

The training hypergraph data, generated synthetic hypergraph data, and filtered synthetic hypergraph data may each be any appropriate type of graph or other hypergraph or other graph-like data. In some embodiments, the techniques include processing the training hypergraph data cases to add additional data on one or more graph features (e.g., nodes, edges, wedges, etc.) in the training hypergraph data cases. Then the synthetic training data may be generated based on the augmented or amended training hypergraph data cases. For example, training hypergraph data may include (or be amended or edited to include) hypergraphs with numbers attached to represent a network of invoices with dollar amounts, quantities, fulfillments dates, order dates, invoice numbers, and/or any other attributes, weights, or data; and multiple invoices can go from a first node to the same second node, with different numbers. Generating the synthesized hypergraph data may include generating this additional data using the techniques described herein. For example, in some embodiments, the techniques may synthesize these as an adjacency list (e.g., an edge list), wedge list, a triangle list, etc. Further, in some embodiments, the synthetic graphs features may be represented as separate data elements (e.g., a synthetic edge may be represented as two vertices (and any associated data) with an edge as a separate data element representing connection of the two vertices) or as a single element (e.g., two vertices described along with the edge in a single data record). As another example, edges may be "decorated" with edge and node counts (e.g., node1 id, node1 edge count, node1 wedge count, node 2 id, node 2 edge count, node 2 wedge count, weight) in the training hypergraph data and the synthesized hypergraph data may be generated based on that "decorated" training data. In some embodiments, this may be useful where additional conditioning can keep the synthesized data more similar in these respects to the training data. As used herein, hypergraph may include its plain and ordinary meaning, including a hypergraph being a generalization of a graph in which an edge can join any number of vertices (whereas in a graph an edge may join just two vertices).

In some embodiments, not depicted in FIG. 1D, the process may also include one or more affinities, weights, or attributes for types of synthetic data to be generated related to the nodes or edges of the graph. For example, the request may include a request to generate not just nodes (or vertices) and connections, but also to generate (or generate more of) other hypergraph features, such as triangles, wedges, edges, stars, and higher order features. In some embodiments, the affinities for the types of synthetic data to be generated may not match the one or more hypergraph feature filters. For example, the one or more hypergraph feature filters may indicate a number or ratio of claws in the synthetic hypergraph data, but the affinity(ies) for generation may be to generate (or generate more) nodes, edges, and wedges from the synthetic training data. In some embodiments, affinities for the types of synthetic data to generate may overlap with or entirely match the one or more hypergraph feature filters. For example, the affinities may be to generate nodes, edges, wedges, claws, and the one or more hypergraph feature filters may be to retain a ratio range of claws at 390:1 to 423:1 and a number of wedges of 50,000.

In some embodiments, more than the desired amount or size of synthetic hypergraph data may be synthesized (e.g., as compared to desired size of the synthetic hypergraph dataset in the original request). This oversized set of synthetic hypergraph data may be generated using determined 120 focal cases (or determined 121 initial cases), selection 130 of features for which to determine values, determination 140 of distributions, determination 150 of values, and optionally testing 160 for fitness and/or similarity to data in the training hypergraph dataset, as discussed extensively herein. Further, in some embodiments, the affinities for the generation of the synthetic hypergraph data may be used to determine what type of hypergraph data to generate. Further, in some embodiments, synthetic node data cases may be generated based on nodes in the set of training hypergraph data, synthetic edge data cases may be generated based on the edges in the set of training hypergraph data, synthetic wedge data cases may be generated based on the wedges in the set of training hypergraph data, synthetic claw data cases may be generated based on the claws in the set of training hypergraph data, synthetic triangle data cases may be generated based on the triangles in the set of training hypergraph data, etc.

As noted herein, in some embodiments, it may be useful to generate not only those types of hypergraph features that will later be filtered, but also types of hypergraph features that will not be later filtered (and which may cause more instances of those to be filtered). Further, in some embodiments, types of hypergraph features may be generated (e.g., based on affinities) and all or a portion of those features may be used. For example, in some embodiments, the techniques may include:

generating more edges than needed for the desired size synthetic hypergraph dataset and filtering using the one or more hypergraph feature filters,
 generating more hypergraph features than needed for the desired size (e.g., wedges, claws, etc.) based on the one or more affinities for types of synthetic hypergraph data, and including in the synthetic hypergraph data one pair of edges from each feature (e.g., fewer than all of the edges of the wedge, claw, etc.) as the edges,
 generating more hypergraph features than needed for the desired size (e.g., edges, claws, triangles, etc.) than needed and using all edges in each case,
 generating more edges than needed for the desired size, conditioned on creating wedges (or other feature types, where conditioning synthetic data generation is described extensively elsewhere herein), and/or
 any other technique, including a combination of techniques, which may or may not use stochastic or probability-based sampling.

As discussed herein, in some embodiments, the amount or quantity of synthetic hypergraph data generated (optionally based on affinities) may be larger than a desired size of synthetic hypergraph data, and the later filtering 165 may result in a desired size (or within a tolerance of a desired size) of filtered, synthetic hypergraph data. Further, in some embodiments, the synthetic hypergraph data may be filtered more than once. As an example, in some embodiments, the techniques may synthesize hypergraph data using one or more hypergraph features (e.g., wedges), where the amount of data synthesized is more than a desired size for the synthetic hypergraph data, and this synthesized hypergraph data is filtered is reduced first from a directed weighted hypergraph into a regular undirected graph, then filtered again against that regular undirected graph with a higher probability to toss out edges that aren't part of triangles, resulting in a smaller, filtered synthetic hypergraph.

In some embodiments, after or instead of returning 190 the smaller, filtered synthetic hypergraph data, control of a controllable systems using the synthetic data is caused 199. Return 190 of synthetic data and causing 199 control of a controllable system are discussed extensively herein.

Example Time Series Embodiments

Data cases are discussed extensively elsewhere herein. Further to those discussions, and as discussed herein, in some embodiments, data cases may include features related to time series information for the features. For example, a data case at time "t0" may include N features. In some embodiments, in addition to those N features from time t0, one or more time series features may also be included, such as values from t(−1), t(−2), etc. The time series features may be previous value(s) for feature(s), difference(s) between the current value(s) and previous value(s), interpolated value(s) of previous value(s) for a fixed lag, differences between the current and previous value(s) divided by the timestep or time delta to the previous value(s) (akin to a "velocity"), and/or higher derivatives such as dividing by time twice or taking the change in velocity (acceleration). Further, in some embodiments, time (e.g., as a value that indicates when the data case was collected or as a value indicating the delta to the previous time step) may be included include as a feature, and/or unique IDs to each time series of data is included. Some embodiments include feature weighting (discussed elsewhere herein), that allows inclusion of more than one approach to time series inclusion, and determination of what works best.

As noted above, the previous values may be included for less than the N total features. For example, it may be known that some features do not or change little change over time (e.g., names of an individual may be assumed to not change over a small time period).

Time series features may be used in the same manner as other features. For example, the time series information for a data case may be used in distance measure(s), may be used to test k-anonymity, similarity, validity, closeness, etc. Further, in some embodiments, time series information may be generated as part of determining a synthetic data case.

Dataset Quality for Synthetic Data Generation

Figure 6:
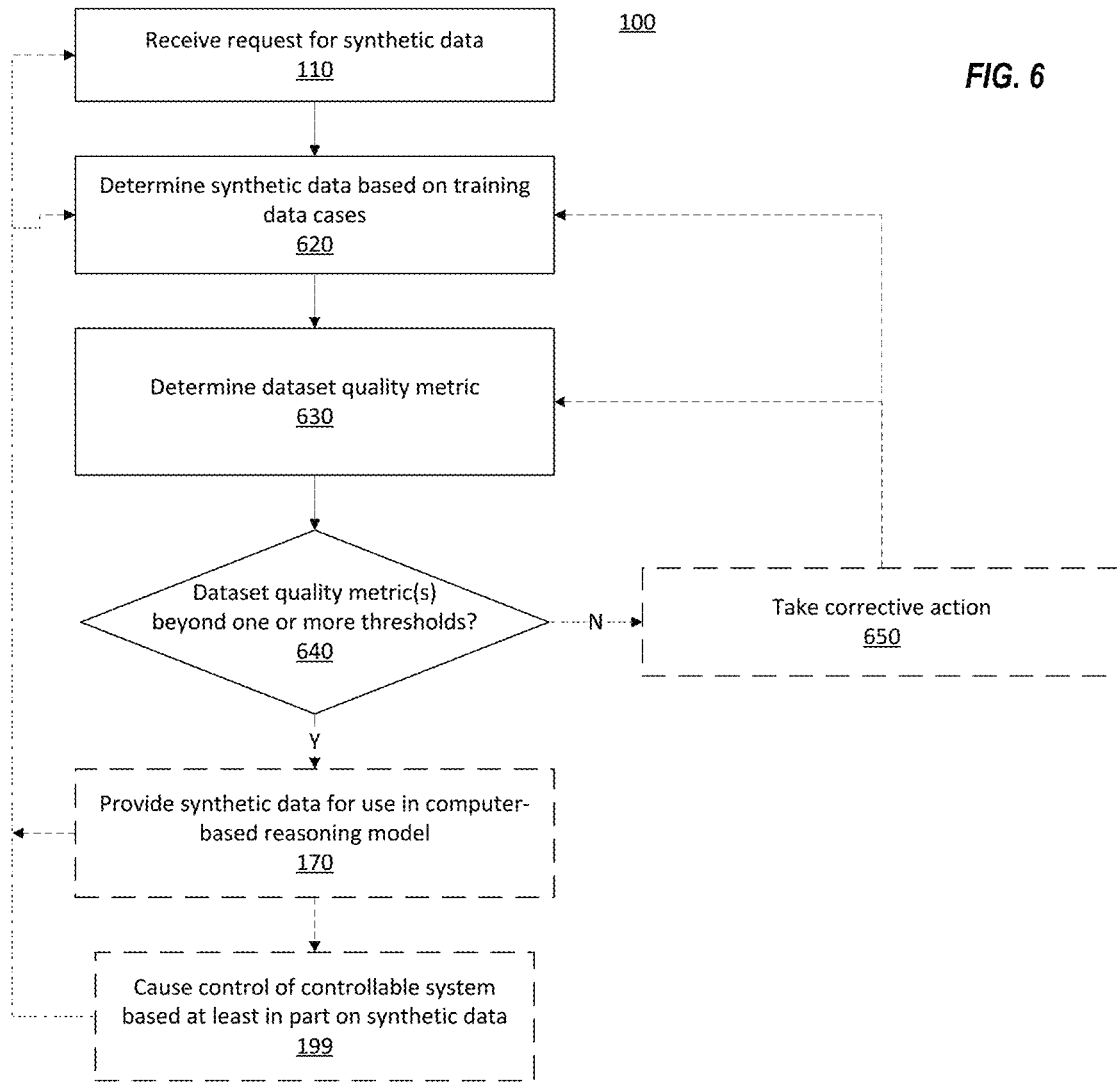
FIG. 6 is a flow diagram depicting example processes for using dataset quality metrics in synthetic data generation.

FIG. 6 is a flow diagram depicting various embodiments of using dataset quality metrics in synthetic data generation. Some similar label numbers and text are used to describe similar actions in FIG. 6, FIG. 1A, FIG. 1B, FIG. 1C, and FIG. 1D. The process 100 described in FIG. 6 may include different and/or additional steps. Embodiments and discussions of the similar numbers and similar text will not be repeated here, and should be considered incorporated into the discussion of FIG. 6 from the relevant sections herein.

In some embodiments, the techniques include receiving 110 a request for synthetic data and determining or generating 620 a set of synthetic data (or more than one set) based on a set of training data (or more than one set of training data). Determination or generation 620 of sets of synthetic data is discussed extensively herein (e.g., it is discussed in the context of FIG. 1A, FIG. 1B, FIG. 1C, and FIG. 1D). In some embodiments, the processes 100 of FIG. 1A, FIG. 1B, FIG. 1C, and FIG. 1D are used to determine 620 the set of synthetic data (including, optionally, testing fitness 160 using one or more dataset quality metrics as the synthetic data is being generated as discussed herein). The determined 620 set of synthetic data may be assessed in order to calculate various metrics (described herein and may include statistical quality metrics, model comparison metrics, and/or privacy metrics), which are used to determine 630 an overall dataset quality metric. If that dataset quality metric is beyond 640 a certain threshold, then the generated synthetic dataset will be considered of sufficient quality to be provided 170 for use in control systems, and then may be used to cause 199 control controllable systems (discussed extensively herein).

After receiving 110 a request for synthetic data (which is described extensively herein), one or more synthetic datasets are determined 620 based on the training dataset. Determination or generation of a set of synthetic data is discussed extensively herein. Such generation may include the use of focal cases from the set of training data to determine each feature for a new synthetic data case, preservation of certain features, creation of a database or other structured data (or unstructured data), time series data, hypergraph data, each of which is discussed extensively herein, and/or any of the other techniques and embodiments discussed herein.

As a parallel to the discussion with respect to FIG. 1A, FIG. 1B, FIG. 1C, and FIG. 1D, in some embodiments, fitness and/or similarity of the synthetic dataset me be tested using any of the techniques disclosed herein as part of determining 620 the synthetic dataset. Additionally, or instead, and not depicted in FIG. 6, the determination 630, comparison 640, and, if necessary, the optional corrective actions 650, of data quality assessment may be performed as part of a test of similarity and/or fitness 160 of data.

In some embodiments, determining 630 a dataset quality metric may include determining at least one statistical quality metric that compares the statistical properties of the set of training data cases and the set of two or more synthetic data cases; at least one model comparison metric that quantifies the machine learning model properties and performance of the set of training data cases and the set of two or more synthetic data cases; and/or at least one privacy metric, which quantifies the likelihood of identification of private data in the set of training data cases from the set of two or more synthetic data cases.

In some embodiments, determining 630 a dataset quality metric may include determining the dataset quality metric determined based on several other metrics. These other metrics may include one or more of the following:

Statistical quality metrics, that compares the statistical properties of the set of training data cases and the set of two or more synthetic data cases. In some embodiments, types of statistical quality metrics which may be used to determine the dataset quality metric may include:

Joint distribution metrics, which measure how well the joint distributions of two datasets match.

Marginal distribution metrics, which measure how well the marginal distributions of two datasets match.

Graph quality metrics, which measure the quality of data synthesis in the context of graphs.

Time series metrics, which measure the quality of time-series synthesis.

Model comparison metrics, which compare performance for running various machine learning models.

Privacy metrics, which is measure of privacy or similarity of data between two datasets.

Numerous embodiments of the metrics above are disclosed herein. In some embodiments, one or more of the metrics may be seen by an operator viewing the metric as a measure of one or more beneficial aspects of the synthetic data. In some embodiments, the dataset quality metric is calculated based on the other metrics. For example, the dataset quality metric may be the geometric mean of at least two metrics, which may include statistical quality metric(s), model comparison metric(s), and privacy metric(s).

In some embodiments, the dataset quality metric lies in a range from zero to infinity, and higher values may correspond to an increase in data quality.

Example Statistical Quality Metrics

In some embodiments, statistical quality metrics may be measures of the statistical properties of the set of training data cases and the set of two or more synthetic data cases. For example, a statistical quality metric may measure the similarity of the training dataset and synthetic dataset distributions. Some embodiments the statistical quality metric is a function of the p-value, which increases as similarity between the two distributions increases. Some embodiments of the statistical quality metric compare datasets using symmetric mean absolute percentage error (SMAPE) metrics, compare datasets using a stratified sigmoid metric, and/or raw metrics. SMAPE metrics may be calculated based, in some embodiments, on functions of the following:

$$\sigma'(p) = \begin{cases} 0 + g(p) & p < 0.001 \\ 1 + g(p - 0.001) & 0.001 \le p < 0.01 \\ 2 + g(p - 0.01) & 0.01 \le p < 0.05 \\ 3 + g(p - 0.05) & 0.05 \le p < 0.1 \\ 4 + g(p - 0.1) & p \ge 0.1 \end{cases}$$

$$g(p) = \sigma((20 \times p) - 10)$$

In some embodiments, stratified sigmoid metrics may be based calculated based on a function such as:

$$SMAPE = \min\left(1.0, \frac{2}{n}\sum_{i=1}^{n}\frac{|F - A|}{|A| + |F| + \epsilon}\right)$$

where A is the actual (original) result and F is the forecasted (generated) result.

Example Energy Statistics as Statistical Quality Metrics

The energy statistic (also known as the E-statistic) computes a test statistic for equal joint distributions of continuous variables. Given two datasets x and v:

$$A = \frac{1}{nm}\sum_{i=1}^{n}\sum_{j=1}^{m}\|x_i - y_j\|$$

$$B = \frac{1}{n^2}\sum_{i=1}^{n}\sum_{j=1}^{m}\|x_i - x_j\|$$

$$C = \frac{1}{m^2}\sum_{i=1}^{n}\sum_{j=1}^{m}\|y_i - y_j\|$$

Then, the energy statistic E is $$E(x,y) = 2A - B - C$$

In some embodiments, E is computed for the entire dataset first, then computed k more times for randomly-selected portions of the dataset to produce k E' energy statistics. Then a p-value is computed as:

$$p = \frac{\|\{E'_1, E'_2, \ldots\}\|}{k} \quad \forall E' \ge E$$

In some embodiments, the stratified sigmoid of this p-value and/or one or more of the E values may be used as one of the one or more statistical quality metrics.

Example MMD Statistical Metrics as Statistical Quality Metrics

In some embodiments, maximum mean discrepancy (MMD) statistical metrics can be used as one (or more) of the one or more statistical quality metrics. In some embodiments, the MMD statistical metrics may include calculating a p-value that indicates the similarity of the training data and distributions. Since large values of p (e.g., >0.05 or >0.10) indicate strong evidence for the null hypothesis (that there is no statistical difference between distributions), in some embodiments, a MMD statistical metrics may be determined as follows:

$$p + \epsilon$$

Where $\epsilon$ is a small positive number used to ensure that the MMD statistical metric is never zero unless an error has occurred. In some embodiments, a MMD statistical metric, the stratified sigmoid of the p-value (p), and or a function calculate based on one or both of them may be used as one of the statistical quality metrics.

Example Uses of Chi-squared ($\chi^2$) Metrics as Statistical Quality Metrics

Chi-squared ($\chi^2$) metrics may be considered a marginal distribution test. In some embodiments, a chi-squared metric may be determined one or more times as a statistical quality metric. In some embodiments, chi-squared calculations are determined a number of times equal to a function of the number of categorical features (n) in the datasets. For example, the chi-squared calculation may be determined one for each categorical feature, resulting in n $\chi^2$ statistics:

$$\chi^2 = \sum_{i=1}^{n}\frac{(O_i - E_i)^2}{E_i}$$

In some embodiments, these $\chi^2$ statistics may be converted top values using a table, and the chi-squared metric may be computed as:

$$\epsilon + \frac{1}{n}\sum_{i=1}^{n}\sigma'(p_i)$$

Where n is the number of categorical variables and $p_i$ is the p for categorical variable i.

Example Uses of Kolmogorov-Smirnov Metrics as Statistical Quality Metrics

The Kolmogorov-Smirnov test may be considered a marginal distribution test. A Kolmogorov-Smirnov test may be performed one or more times in order to calculate a Kolmogorov-Smirnov metric for use as a statistical quality metric. In some embodiments, Kolmogorov-Smirnov tests are performed a number of times equal to a function of the number of continuous features (n) in the datasets. For example, Kolmogorov-Smirnov tests may be performed one for each continuous feature in the datasets, resulting in n KS statistics, which may then be used to determine p values. Then, the Kolmogorov-Smirnov metric may be computed as:

$$\epsilon + \frac{1}{n}\sum_{i=1}^{n}\sigma'(p_i)$$

Where n is the number of continuous variables, $p_i$ is the p for continuous variable i, and $\sigma'$ is the stratified sigmoid.

Example Uses of Mann-Whitney Metrics as Statistical Quality Metrics

The Mann-Whitney statistics may be considered a marginal distribution test. In some embodiments, a Mann-Whitney statistic may be performed one or more times in order to calculate a Mann-Whitney metric for use as a statistical quality metric. In some embodiments, Mann-Whitney statistics are performed a number of times equal to a function of the number of continuous features (n) in the datasets. For example, Mann-Whitney tests may be performed one for each continuous feature in the datasets, resulting in n Mann-Whitney statistics which are converted to n p values. Then, the Mann-Whitney metric may be computed as:

$$\epsilon + \frac{1}{n}\sum_{i=1}^{n} \sigma'(p_i)$$

Where n is the number of continuous variables, $p_i$ is the p for categorical variable i, and $\sigma'$ is the stratified sigmoid.

Example Use of Descriptive Statistical Metrics as Statistical Quality Measures

Descriptive statistics is a term used to refer to various statistical measures of datasets, such as the count, mean, median, standard deviation, minimum, maximum, quartiles, skew, kurtosis, etc. in some embodiments, descriptive statistics may be computed for each dataset (e.g., training and synthetic) and stored in vectors, $\mathbb{A}$ and $\mathbb{B}$ respectively. Then, in some embodiments, the SMAPE between the two vectors may be determined using an equation such as:

$$s = \text{SMAPE}(A,B) + \text{epsilon}$$

Then, a descriptive statistical metric may be determined with an equation, such as:

$$5-(5*s)$$

Examples of Model Comparison Metrics

Model comparison metrics may quantify the machine learning model properties and performance of the set of training data cases and the set of two or more synthetic data cases (e.g., a set of two or more synthetic data cases). For example, model comparison metrics may compare the performance of training datasets and synthetic datasets across many machine learning models. In some embodiments, model comparison metrics may include one or more of classification, clustering, and regression metrics.

Examples of Classification Comparison Metrics as Model Comparison Metrics

In some embodiments, the Fowles-Mallows index is used as a model comparison metric. In various embodiments, the Fowles-Mallows index may be used to compute a model comparison metric. For example, such a model comparison metric may be computed as the ratio of the data points in the synthetic dataset's Fowlkes-Mallows index to the training dataset's Fowlkes-Mallows index, where the Fowlkes-Mallows index FM is determined as follows:

$$FM = \sqrt{\frac{TP}{TP+FP} \times \frac{TP}{TP+FN}}$$

Where a model trained on the set of two or more synthetic data cases is used to predict samples from the training data.

Then, in some embodiments, the classification comparison metric is computed as:

$$5-(5*(\text{SMAPE}(FMo,FMg)+\text{epsilon}))$$

Examples of Regression Comparison Metric as Model Comparison Metrics

In some embodiments, regression calculation may be used to determine regression comparison metrics, which are in turn used as model comparison metrics. In some embodiments, such a regression comparison metric may be determined in two parts as follows:

The SMAPE between original and generated R2, where R2 may refer to the coefficient of determination. This is referred to as $d_{R^2}$ The SMAPE between original and generated RMSE, where RMSE may refer to root mean squared error. This may be referred to as $d_{RMSE}$.

Then, the regression comparison metric may be computed as:

$$5-(5*\sqrt{d_{R^2} \times d_{RMSE}})$$

Examples of Clustering Comparison Metric as Model Comparison Metrics

In some embodiments, clustering comparison metrics be used as model comparison metrics. Further, clustering comparison calculations may be used to determine a clustering comparison metric by combining an intrinsic measurement and an extrinsic measurement. In some embodiments, the intrinsic measurement may be a Calinski-Harabasz score, and the extrinsic measurement may be mutual information. The intrinsic measurement may consist of two scores, $CH_o$ and $CH_g$, referring to training data and synthetic data Calinski-Harabasz scores, respectively. In some embodiments, mutual information may be computed as:

$$MI(U,V) = \sum_{i=1}^{|U|} \sum_{j=1}^{|V|} \frac{|U_i \cap V_j|}{N} \log \frac{N|U_i \cap V_j|}{|U_i||V_j|}$$

The clustering comparison metric may be computed as a function of $CH_o$, $CH_g$, and MI, such as:

$$\sqrt{\frac{CH_g}{CH_o + \epsilon} \times MI(O,G)}$$

In other embodiments, the clustering comparison metric may be calculated as two pieces. The first being a formulation of the mutual information, $d_{MI}$, which is scaled and then the sigmoid is taken. The second is $d_{CH}$ which is computed based on the SMAPE between the two CH scores.

$$d_{MI} = \frac{20}{\max MI(U,V)} - 10$$
$$d_{MI} = 5 * \sigma(d)$$
$$d_{CH} = 5 - (5 \times \text{SMAPE}(CH_o, CH_g))$$

The clustering comparison metric may be computed as a function of $d_{CH}$ and $d_m$ such as:

$$\sqrt{d_{CH} \times d_{MI}}$$

Examples of Privacy Metrics

In some embodiments, privacy metrics may quantify the likelihood of identification of private data in the set of training data cases from the set of two or more synthetic data cases. Not depicted in the figures, some of the embodiments herein may be performed based on the entire set of training data and/or based on clusters within the set of training data.

For example, in some embodiments, the closeness percentile metric may be based on the percentile of the distance of the synthetic data case within a particular cluster in the set of training data (vs. within the entire distribution of set of training data cases). This may be useful when the set of training data cases has clusters of data within it, and the percentile distances for the synthetic data cases are more accurate when taken as percentiles within just that cluster of data.

In some embodiments, the techniques include calculating clusters, equivalence classes, and/or groups of similar entries within a dataset, automatically. Any applicable clustering technique could be used, including A-BIRCH, which may be useful to cluster the data and treat that clustering as equivalence class assignments. Various embodiments of privacy metrics are discussion herein.

Examples of K-Anonymity Metrics as Privacy Metrics

K-anonymity may be useful as a measure of the number of unique values within equivalence classes (e.g., groups of entries within a dataset which are similar). In some embodiments, k-anonymity may be used to determine one of the one or more k-anonymity metrics. For example, k-anonymity may be used to determine a privacy metric. A k-anonymity metric determined based on k-anonymity may be determined based on the average k-anonymity over each sensitive attribute, where sensitive attributes may be those attributes that are may be used to disrupt privacy (e.g., in the context of individuals and their data, name, age, address, etc. may be sensitive attributes). In some embodiments, sensitive attributes may be determined by an operator, be determined by analyzing data, and/or may be determined by looking at column names or other metadata. Assuming an equivalence class $E_i$ contains $n_{E_i}$ values, $$k = \min(n_{E_1}, n_{E_2}, \ldots, n_{E_k})$$

In some embodiments, the k-anonymity metric (again, which may be a privacy metric) may be a function of the k-anonymity over each sensitive attribute, such an average of the k-anonymity over each sensitive attribute.

Examples of L-Diversity Metrics as Privacy Metrics l-diversity metrics may be useful as a measure of the entropy of values within equivalence classes (groups of entries within a dataset which are similar). In some embodiments, l-diversity may be used to determine one of the one or more l-diversity metrics. The l-diversity metric may be determined based on the average l-diversity over each sensitive attribute. Sensitive attributes are discussed elsewhere herein. A given dataset is l-diverse when:

$$\forall E, H(E) \geq \log(l)$$

In some embodiments, the l-diversity metric may be a function of the l-diversity over each sensitive attribute, such as the average of the l-diversity over each sensitive attribute.

Examples of t-Closeness Metrics as Privacy Metrics

In some embodiments, t-closeness metrics may measure the distance between the distribution of a sensitive attribute within an equivalence class and the distribution of that sensitive attribute globally. Any appropriate distance metric may be used, including those described herein. For example, some embodiments use an Earth mover's distance for continuous variables and Manhattan distance for categorical variables. A given dataset may be t-close when that calculated distance is no greater than t. In some embodiments, the t-closeness metric may be calculated as a function of the t-closeness over each sensitive variable, such as being equal to the average t-closeness over each sensitive attribute.

Examples of Entropy Comparison Metrics as Privacy Metrics

Entropy of a dataset may be a measure of how compressible or predictable a given feature is, which is generally correlated with the skewedness of the class distribution. In some embodiments, similar entropy values for a training dataset and a generated synthetic dataset may indicate similar class-wise distributions between the two datasets. KL-divergence metrics may be a measure how similar the distributions of the training and synthetic datasets are.

In some embodiments, a synthetic dataset may be considered more suitable for use (e.g., more likely to be private) when the entropy of the synthetic dataset is higher than the entropy in the training dataset (e.g., as measured by an entropy comparison metric that is a ratio of the two). For example, a synthetic dataset which does not have a sufficient entropy comparison ratio (e.g., higher or greater that 1.0) may be an indicator either that the training data is very noisy and unpredictable or that the generated synthetic dataset is not as private as desired along this metric. As another example, in some embodiments, if the synthetic dataset is significantly noisier without degrading accuracy, it may be considered more private along this measure.

In some embodiments, the entropy comparison metric may be computed as the entropy of the training dataset and synthetic dataset as $H(x) = -\Sigma_{i=1}^{n} P(X_i) \log_b P(X_i)$, and the entropy comparison metric may be computed as:

$$\frac{\sum_{i=1}^{k} H_i(G)}{k} / \frac{\sum_{i=1}^{j} H_i(O)}{j}$$

Where $H_i$ may refer to the entropy of the ith feature in the data and G and O refer to the synthetic and training data, respectively.

Examples of Data Element Distance Comparison Metrics as a Privacy Metrics

In some embodiments, data element distance comparison metric ("DEDCM") measures relative distances in the training dataset and compares them to the distance between closest data element(s) in the synthetic dataset to data element(s) in the training dataset. In some embodiments, the distance between the two closest points in training dataset (intra distance) and the closest data point in the synthetic dataset to the training dataset (inter distance) are determined. In some embodiments, these distances are computed using k-nearest neighbors. In some embodiments, any distance measure may be used, including any of those discussed herein. Various embodiments include one or two of two different DEDCM measures: average desirability and minimum desirability. Average desirability $d_{avg}$ may be a function of average inter-dataset distance and average intra-dataset distance, such as a ratio of those two. Minimum desirability $d_{min}$ may be a function of the minimum inter-dataset distance and the minimum intra-dataset distance, such as the ratio of those two. In some embodiments, DEDCM may then calculated as $$(d_{avg} * d_{min}) + d_{min}/2$$

Examples of Minimum Distance Ratio Metrics as a Privacy Metrics

In some embodiments, a DEDCM, such as a minimum distance ratio metric, may be calculated as a function of $d_{min}$ and used as a privacy metric. For example, if $d_{min}$ may be calculated as the minimum distance between a point in the synthetic dataset divided by minimum distance of two data elements in a training dataset and the minimum distance ratio metric may be based on a function (scaled, used as part of another measure, etc.) of $d_{min}$. In some embodiments, the minimum distance ratio metric may then be compared to a threshold in order to determine whether the closest point in the synthetic dataset to a point in the training dataset it at least as any two points in the training dataset. This may be useful in many cases, including when focusing on privacy in the densest regions of the data, where data elements may be quite similar.

$$\text{min distance ratio} = \frac{D_{min}(syn, \text{orig}\_i)}{D_{min}(\text{orig}\_i, \text{orig}\_j)}$$

In some embodiments, a ratio of 1.0 or higher may mean that privacy is being preserved between the synthetic dataset and the training dataset such that the "worst case" synthetic record is as least as different from the nearest real record (e.g., in either Manhattan or Euclidean space) as the two most similar unique records from the training dataset are from each other. For example, if the database records are of real people (sex, age, height, weight, race, income, etc.), then the synthetic person is as least as different from the most similar real person as the two most similar real people are from each other.

Examples of Minimum Distance Percentile Metrics as Privacy Metrics

Minimum distance percentile metrics may be used as privacy metrics. In some embodiments, minimum distance percentile metrics compare distances between the synthetic record(s) that are closest to the training dataset record(s) and the distribution of distances of training dataset records to the training dataset records' most similar records. The value of the metric may be calculated as a percentile (e.g., a quantile) where the synthetic record closest to a training dataset record would fall were the synthetic record in the original training dataset. In some embodiments, this metric may be useful for focusing on privacy in the denser regions of the data, while adding context to how much of the data is in the densest regions. An example equation for measuring a minimum percentile metric may be:

$$\text{min distance percentile metric} = \min(\Pr[D(syn, \text{orig}) \geq D(\text{orig}_i, \text{orig}_j)])$$

In some embodiments, and depending on implementation, a higher min distance percentile (metric) may indicate better privacy in the synthetic data. For example, in some embodiments, a percentile of 1.0 or higher may mean that in the "worst case," the synthetic and training dataset records that are most similar to each other are at least no closer than the closest 1.0% of data in the training dataset. For example, consider records of some basic physical characteristics of people (sex, age, height, weight, race, income, etc.). If a training dataset contained data of unique individuals that are also identical twins and, therefore, extremely similar to one another with an extremely small distance between their data elements, this metric may help characterize anonymity in the densest regions to contextualize the results from other privacy tests, such as minimum distance ratio metrics. For example, in some embodiments, synthesized data that looks like another person's twin may be unacceptable regarding privacy given most datasets. As a counter-example, in a dataset of physical characteristics of Olympic athletes in a given sport and/or weight class (which may be relatively homogeneous), such similarities may be acceptable if they provide sufficient privacy and anonymity for the synthetic data's purposes.

In some embodiments, the closeness percentile metric is reported for every datapoint, may be sorted based on percentile (e.g., the closest percentile being listed first), and/or may be compared to a threshold (discussed extensively herein).

Examples of Minimum Expected Distance to Actual Distance Metrics as Privacy Metrics In some embodiments, minimum expected distance to actual distance metrics may be used as privacy metrics. In some embodiments, minimum expected distance to actual distance metrics may be a function of the actual distance (e.g., Manhattan or Euclidean with standardized features or any other distance measure, such as those discussed herein) between synthetic data element(s) and the closest training data element(s), divided by the expected distance between training data elements and their nearest neighbors in that region of the data. In some embodiments, the expected distances may be computed via kNN machine learning techniques (e.g., those discussed herein), which may be robust estimators. This metric may be useful when focusing on privacy across the density of the data and may be particularly applicable to the regions of the data which are of moderate to low density, where the data is sparser and more anomalous. An example calculation of a minimum expected distance to actual distance metric may be the following:

$$\min \frac{D(syn, orig)}{E(D(orig_i, orig_j) \mid syn)}$$

In some embodiments, synthetic data elements with a minimum expected distance to actual distance metrics (e.g., as measure by the above ratio) of 1.0 (or higher) may indicate that in the "worst case," those synthetic and training data elements that are most similar to each other are about as similar as you would expect any two different records to be in that region of the training data. This metric may be useful when it is important to protect training dataset records that are outliers in the training dataset. For example, if the training data are profile data of people (sex, age, height, weight, race, income, etc.), then the training dataset may contain data of an extremely unique individual—for example, a billionaire whose record occupies a sparsely populated space within the training dataset. This metric may be useful when it is important to catch synthetic data elements that are too close to such outliers (e.g., below the 1.0 minimum) as defined by the density in that sparsely populated space.

Examples of KL-Divergence Metric as a Privacy Metric

In some embodiments, a KL-divergence metric may be used as a privacy metric. A KL-divergence metric may be determined based on the KL-divergence(s) between each feature in the training and synthetic datasets. In some embodiments, continuous features may be discretized in order to have the discrete KL-divergence computed on them. In some embodiments, KL-Divergence is computed as:

$$D_{KL}(P \| Q) = \Sigma_{x \in X} P(x) \log\left(\frac{P(x)}{Q(x)}\right)$$

The KL-divergence metric may then be computed as a function of KL-divergence for each feature. In some embodiments, the KL-divergence metric may be computed as the median KL divergence across features plus an E divided by epsilon.

Examples of Probability-Based Minimum Distance Metrics as Privacy Metrics

In some embodiments, probability-based minimum distance metrics may be used as privacy metrics. In some embodiments, kernel density estimation (KDE) may be used to estimate the probability density function (PDF) of the distribution of distances D between synthetic data elements and their k nearest training data points. This PDF can then be used to compute the probability p that the distance d between any synthetic data point g its nearest training data point r is less than 0.5×min(d∈D), e.g.:

$$P(d \leq 0.5 \times \min(d \in D)) = p$$

In some embodiments, this probability p may be used to determine a probability-based minimum distance metrics, and if that metric is beyond a threshold (e.g., less than 0.01), then privacy is likely being preserved. Otherwise, the data should be audited.

Examples of Calculating Dataset Quality Metrics

In some embodiments, the (overall) dataset quality metric ("DQM") may be determined based on a combination of statistical quality metrics, model comparison metrics, and/or privacy metrics. As one particular example, the DQM may be determined based on one or more statistical quality metrics, one or more model comparison metrics, and one or more privacy metrics. In some embodiments, the DQM may be determined based (at least in part) on:

One or more statistical quality metrics and one or more model comparison metrics One or more privacy metrics and one or more model comparison metrics One or more statistical quality metrics and one or more privacy metrics Two or more statistical quality metrics Two or more model comparison metrics Two or more privacy metrics And/or any combination of the above In some embodiments, the DQM is determined based on a function of the other metrics (discussed elsewhere herein), such as the mean, the median, geometric mean, the average, the sum, the product, a function of one of these, a combination of any of the foregoing, etc. For example, if just the geometric mean of the underlying metrics is used to calculate the DQM, then the DQM may be calculated based on Nth root of the sum of each of the N metrics raised to the Nth power.

Example Uses of Dataset Quality Metrics

In some embodiments, the dataset quality metric is compared 640 to one or more thresholds. Comparing 640 the determined 630 dataset quality metric may entail comparing the dataset quality metric to one or more thresholds. For example, a lower threshold and/or a higher threshold may be used for comparison 640 the dataset quality metric. For example, if the dataset quality metric is a geometric mean of the individual quality scores, then the dataset quality metric may be compared to a first threshold (such as 0.5 or 0.6 indicating that the dataset is of a first quality) and/or a second threshold (such as 1.0 or 1.1. indicating that the dataset is of a second quality, higher than the first quality). Depending on how the dataset quality is determined 630, the dataset quality metric may be compared to a high and low threshold (e.g., if it is desired that the dataset quality metric is within/or not within a particular band). In some embodiments, comparing the dataset quality metric to one or more thresholds may include scaling the metric, normalizing the metric (and/or the one or more thresholds), and/or other numerical calculations before comparing 640 the dataset quality metric to a threshold.

Further, not depicted in FIG. 6, comparing 640 one or more metrics to one or more thresholds may include performing such a comparison 640 without first computing a dataset quality metric. For example, one or more of each of statistical quality metrics, model comparison metrics, and/or privacy metrics may be determined and compared to threshold(s). As a particular example embodiment, comparing 640 may include comparing a dataset quality metric to one or more thresholds, and the comparison 640 may be met if the dataset quality metric is beyond those one or more thresholds (e.g., less or more than 0.5, 1, 2.5, 99, etc.). As another example, embodiments may include comparing 640 may include comparing a minimum distance ratio matric(s), minimum distance percentile metric(s), and/or minimum expected distance to actual distance metrics to one or more thresholds. In such an example, only if the metric(s) for particular datapoints are beyond a threshold (e.g., above or below a threshold), will the comparison be met.

Further, in some embodiments, two or more metrics may be compared 640 two or more thresholds. For example, in some embodiments, a dataset quality metric (e.g., calculated based on one or more statistical quality metrics, one or more model comparison metrics, and/or one or more privacy metrics) may be compared 640 to a first threshold and one or more statistical quality metrics, model comparison metrics, and/or privacy metrics may each be compared 640 to additional thresholds. As a more specific example embodiment, a dataset quality metric (e.g., any one or more of the more specific metrics) may be compared 640 to a first threshold(s), and a privacy metric (e.g., calculated based on one or more statistical quality metrics, one or more model comparison metrics, and/or one or more privacy metrics) may be compared 640 to a second threshold, and only if both of those two metrics meet those threshold tests, will the comparison 640 be met.

In some embodiments, optionally, if the dataset quality metric is not beyond one or more thresholds when compared 640, corrective action 650 may be taken. For example, in some embodiments, taking corrective action 650 may include determining 620 a new set of synthetic data and/or determining 630 additional dataset quality metrics. Determination or generation 620 of sets of synthetic data is discussed extensively herein (e.g., it is discussed in the context of FIG. 1A, FIG. 1B, FIG. 1C, and FIG. 1D). In some embodiments, determining 630 additional dataset quality metrics may include determining different dataset quality metrics than previously determined 630. For example, in some embodiments, if a first set of dataset quality metrics indicate that the dataset is not of sufficient quality (e.g., by comparing the metric to one or more thresholds), then different combination of statistical quality metrics, model comparison metrics, and/or, privacy metrics may be used to determine the dataset quality metric in order to provide a different or more refined understanding of the dataset. That newly determined 630 dataset quality metric may then be compared 640 to one or more dataset quality metrics.

In some embodiments, if the dataset quality metric is not beyond one or more thresholds when compared 640, then taking corrective action 650 may include removing one or more data cases from the set of synthetic data. For example, if one or more data cases in the set of synthetic data do not meet a threshold for a closeness percentile metric, then those data cases may be removed, replaced, and/or altered as part of taking corrective action 650. As a more specific example, an embodiment may automatically delete any data case that has a closeness percentile metric less than (or more than) some threshold, such as 0.5%, 1%, 5%, 19%, 50%, etc. This may be advantageous in embodiments where the set of training (original) data has elements that are closer to each other (in terms of distance) than would be useful to have any synthetic data case to a training data case.

As another example embodiment of taking corrective action 650 by removing one or more data cases from the set of synthetic data, if one or more data cases in the set of synthetic data do not meet a threshold for a dataset quality metric, then those data cases may be removed, replaced, and/or altered as part of taking corrective action 650. As a more specific example, an embodiment may automatically delete any data case that has a minimum distance ratio matric(s), minimum distance percentile metric(s), and/or minimum expected distance to actual distance metrics that are less than (or more than) some threshold(s), such as 0.01, 0.5, 1, 1.2, 7.5, etc. This may be advantageous in embodiments where the set of training (original) data has elements that are closer to each other (in terms of distance) than would be useful to have any synthetic data case to a training data case.

In some embodiments, taking corrective action 650 may include determining synthetic data elements along one or more of the metrics (including combined metrics) for review by a reviewer. For example, if one or more data elements do not meet thresholds for minimum distance ratio matric(s), minimum distance percentile metric(s), and/or minimum expected distance to actual distance metrics, then those synthetic data elements that do not meet the thresholds (and possibly more than just those, and perhaps even all synthetic data elements), may be listed in a list, perhaps ranked or rankable by those metrics. For example, in an embodiment that flags the synthetic data elements that do not meet thresholds for minimum distance ratio matric(s), minimum distance percentile metric(s), and/or minimum expected distance to actual distance metric(s), those data elements that do not meet the thresholds (and possibly other synthetic data elements) may be listed in a chart, spreadsheet, GUI, etc., and those may be rankable by minimum distance ratio matric(s), minimum distance percentile metric(s), and/or minimum expected distance to actual distance metric(s). This may be useful when it is beneficial to review the synthetic data elements that have the values for metrics that are (not) beyond the threshold, and in particular when the reviewer can make an assessment or determination whether the synthetic data element violation of the threshold(s) for particular metric(s) is nevertheless acceptable for the purposes of the generated synthetic dataset. Further, it may be beneficial to show rankable lists of the synthetic data elements along the various metrics even when dataset quality metrics are not violated (e.g., beyond or not beyond a threshold), when it is beneficial to assess whether particular data elements, even though they do not violate any thresholds, do not meet the purposes (e.g., privacy and/or accuracy with respect to the statistical properties of the training dataset) of the synthetic dataset. Further, in some embodiments, it may be beneficial to review all synthetic data in order to assess whether each synthetic data element meets the purpose of the synthetic dataset (e.g., privacy and/or accuracy with respect to the statistical properties of the training dataset). In some embodiments, not only are synthetic data elements presented for review, but additionally, related training data elements may be presented for review. For example, for minimum distance ratio matric(s), minimum distance percentile metric(s), and/or minimum expected distance to actual distance metric(s), the training data elements associated with the calculation of the metric may also be presented for review along with the corresponding synthetic data elements.

If the dataset quality metric is beyond 640 the one or more thresholds, then the synthetic dataset may be provided 170 for use in one or more computer-based reasoning models and/or used to cause 199 control of a controllable system. Numerous embodiments of providing 170 the dataset for use in a computer-based reasoning system and causing 199 control of a controllable system are discussed extensively herein.

Much of the discussion of checking dataset quality metrics herein is in the context of generation of a single set of synthetic data, and testing the dataset quality of that single set of synthetic data against the relevant training data. In some embodiments, however, determination of dataset quality may happen after a set of synthetic data cases has been generated, after two or more synthetic data cases have been generated (e.g., the set of synthetic data of the highest quality may be chosen for use), before a set of synthetic data has been fully generated (e.g., during generation of a set of synthetic data, it may be determined that the set of synthetic data if not of sufficient quality, and generation of that set of synthetic data may be halted, restarted, the set may be deleted, etc.), and/or a combination of the foregoing. In some embodiments, referring to FIG. 1A, FIG. 1B, FIG. 1C, and FIG. 1D, checking the dataset quality may be part of checking the fitness and/or similarity 160 of a data element (FIG. 1A, FIG. 1B, FIG. 1C, FIG. 1D). for example, after a synthetic data element is generated in FIG. 1A, FIG. 1B, FIG. 1C, or FIG. 1D, the dataset quality metric determination may check whether the minimum distance ratio matric(s), minimum distance percentile metric(s), and/or minimum expected distance to actual distance metric(s) are beyond particular thresholds. If those metric(s) are beyond threshold(s), then the synthetic data element may be removed, replaced, and/or altered as part of any corrective action.

Reinforcement Learning and Other Additional Embodiments

In some embodiments, the techniques may be used for reinforcement learning. For example, each time a synthetic data case is created, then the set of training cases can be updated and new synthetic data can be generated based on the updated set of training cases. In some embodiments, the techniques herein are used for reinforcement learning. For reinforcement learning, the outcome or goal feature(s) (e.g., the score of a game, or having a winning checkers match) are treated as conditioned inputs or features. For example, in the checkers example, the synthetic data case is generated with conditions of the current game board setup and where the move was part of a winning strategy. The "winning strategy" feature may have been set in the training dataset. For example, once a game has been won, an outcome feature is set to either "winning" or "losing" for all moves that had been made in the game. As such, each move in a winning game has the outcome feature set to "winning" and each move in a losing game has outcome set to "losing." As such, then the data is conditioned to pick only moves that are part of a winning game, that feature (outcome="winning") is used in the KNN calculation discussed elsewhere herein.

The reinforcement learning scenarios can also include ranges (like a score above, below, or within a certain threshold), and other criteria. For example, as discussed elsewhere herein, the techniques herein can be useful in reinforcement learning situations where synthetic data is needed on expensive, dangerous, and/or hard to reproduce scenarios. For example, if pipelines only fail (e.g., leak, explode, become clogged) 0.001% of the time, but training data is needed to train a computer-based reasoning system to detect when those scenarios are going to happen, the techniques herein can be used to synthesize training data for those rare cases. This allows additional training data for pipeline failure to be gathered without incurring the difficulty, danger, and cost of actual pipeline failures. In such an example, the failure of the pipeline could be one of the conditions on the synthetic data. So, as data is being generated, the focal cases determined 120 will be those associated with pipeline failure, and the subsequently generated features will represent the distribution of values of those features within the conditioned data.

In some embodiments, the techniques may be used to create synthetic data that replicates users, devices, etc. For example, data that is based on, is similar to user data (or device data, etc.) can be created using the techniques herein. Consider user data that cannot be used (because it is not anonymous) and where one would prefer not to anonymize the data. That data can be used to create synthetic user data. If the data includes personally identifiable information as features (e.g., name, SSN, etc.), those features could be assigned random values, and the rest of the features can be synthesized based on user data (and possibly conditions) using the techniques discussed herein. Alternatively, in some embodiments, features containing personally identifiable information could also be generated based on existing user data, but with very high surprisal, creating a much wider distribution than seen in the user data.

Overview of Surprisal, Entropy, and Divergence

Below is a brief summary of some concepts discussed herein. It will be appreciated that there are numerous ways to compute the concepts below, and that other, similar mathematical concepts can be used with the techniques discussed herein.

Entropy ("H(x)") is a measure of the average expected value of information from an event and is often calculated as the sum over observations of the probability of each observation multiple by the negative log of the probability of the observation.

$$H(x) = -\Sigma_i p(x_i) * \log p(x_i)$$

Entropy is generally considered a measure of disorder. Therefore, higher values of entropy represent less regularly ordered information, with random noise having high entropy, and lower values of entropy represent more ordered information, with a long sequence of zeros having low entropy. If logy is used, then entropy may be seen as representing the theoretical lower bound on the number of bits needed to represent the information in a set of observations. Entropy can also be seen as how much a new observation distorts a combined probability density or mass function of the observed space. Consider, for example, a universe of observations where there is a certain probability that each of A, B, or C occurs, and a probability that something other than A, B, or C occurs.

Surprisal ("I(x)") is a measure of how much information is provided by a new event $x_i$.

$$I(x_i) = -\log p(x_i)$$

Surprisal is generally a measure of surprise (or new information) generated by an event. The smaller the probability of $X_i$, the higher the surprisal.

Kullback-Leibler Divergence ("KL divergence" or "$Div_{KL}(x)$") is a measure of difference in information between two sets of observation. It is often represented as $Div_{KL}(x) = \Sigma_i p(x_i) * (\log p(x_i) - \log q(x_i))$, where $p(x_i)$ is the probability of $x_i$ after $x_i$ has occurred, and $q(x_i)$ is the probability of $x_i$ before $x_i$ has occurred.

Conviction Ratios Examples

In some embodiments, the relative surprisal or conviction within certain scopes, and in comparison to other scopes, can be determined. For example, a feature may have high conviction locally (within the near N neighboring cases, as measured by a distance measure such as those described herein), and lower conviction elsewhere, or vice versa. In the former, the feature would be considered locally stable and globally noisy. In the latter, the opposite would hold and it would be locally noisy and globally stable.

Many possible scopes for conviction determination could be used and compared. A few are presented here, and others may also be used. In some embodiments, each scope compared may be a function of the distance from a case. For example, as discussed elsewhere herein a region may be determined. The region may include the N most similar cases to the case in question, the most similar P percent (as compared to the entire model), the cases within distance D, or the cases within a local density distribution, as discussed elsewhere herein. For example, the N most similar cases to the suggested case (or to the input context) may be determined based on a distance measure, such as those described herein. The number N may be a constant, either globally or locally specified, or a relative number, such as a percentage of the total model size. Further, the cases in the region may also be determined based on density. For example, as discussed elsewhere herein, if the cases around the case of interest meet a particular density threshold, those most similar cases could be included in the regional set of cases (and cases not meeting those density thresholds could be excluded). Further, in some embodiments, the similarity (or distance) may be measured based on the context only, the action only, or the context and the action. In some embodiments, only a subset of the context and/or action is used to determine similarity (e.g., certainty score and/or distance).

The following are some example measures that may be determined:

W: Conviction of feature in the whole model;
X: Conviction of a feature outside the regional model;
Y: Conviction of a feature inside the regional model;
Z: Conviction of feature for local (k neighbors) model; where "local" would typically, but not always, constitute a smaller number of cases than the "regional" model.

As discussed elsewhere herein, conviction can be measured in numerous ways, including excluding a feature from a particular model or portion of a model and measure the conviction as a function the surprisal of putting the feature (or features, or data elements) back in. Conviction measures are discussed extensively herein.

As noted, above, other measures (other than W, X, Y, and Z, listed above) can be used. After two (or more) of the conviction measures are calculated, the ratio of those measures may be determined. For example, in some embodiments, a determined 120 conviction score (ratio) may indicate whether a suggested case or feature of a case is "noisy." The noisiness of a feature can be determined as a conviction score, in some embodiments, by determining local noisiness and/or relative noisiness. In some embodiments, local noisiness can be determined by looking for the minimum of Y (or looking for the number of cases with Y<1). Relative noisiness may be determined based on the ratio of Z to W. As another example, in some embodiments, a high feature conviction ratio between W and Y may indicate that the feature may be "noisy." The noisiness of the feature may be indicated based on the ratio of W to Y and/or Y to W.

In some embodiments, measure other that W, X, Y, and Z listed above may include measures based on feature importance to a given target, feature importance to the whole model, predictability of a feature with or without confidence bounds, measures of whether features contribute to or detract from accuracy, and/or the like. For example, in some embodiments, the techniques include determining prediction conviction for features based on a conviction of the accuracy of the prediction using residuals. Using such techniques may be beneficial when features that negatively impact accuracy in a region may be considered "noisy" and therefore be useful as a measure to include in a determination of whether to automatically cause 199 performance of a suggested action.

In some embodiments, once the noisiness of a case/feature is determined as a conviction score, a decision can later be made whether to cause 199 performance of the suggested action. For example, if the features (or action) of the suggested case are not noisy (locally and/or regionally, depending on the embodiment), then a system may be confident in performing the suggested action in the suggested case. If, however, the features (or action) of the suggested case are noisy, then that noisiness measure may be provided along with the suggested action. Ise, a human operator may then review the noisiness data and determine whether to perform the suggested action, a different action, or no action at all.

Prediction Conviction Examples

In some embodiments, the conviction score is a prediction conviction of a suggested case. As such, determining the certainty score can be determined as the prediction conviction. In some embodiments, when the prediction conviction is determined to be above a certain threshold, then performance of the suggested action can be caused 199. If the prediction conviction is determined to be below a certain threshold, then the prediction conviction score can be provided along with the suggested cases. A human operator may then review the prediction conviction (and any other explanation data) and determine whether to perform the suggested action, a different action, or no action at all.

Determination of prediction conviction is given below. First, familiarity conviction is discussed. Familiarity conviction is sometimes called simply "conviction" herein. Prediction conviction is also sometimes referred to as simply "conviction" herein. In each instance where conviction is used as the term herein, any of the conviction measures may be used. Further, when familiarity conviction or prediction conviction terms are used, those measure are appropriate, as are the other conviction measures discussed herein.

Feature Prediction Contribution Examples

In some embodiments, feature prediction contribution is determined as a conviction score. Various embodiments of determining feature prediction contribution are given herein. In some embodiments, feature prediction contribution can be used to flag what features are contributing most (or above a threshold amount) to a suggestion. Such information can be useful for either ensuring that certain features are not used for particular decision making and/or ensuring that certain features are used in particular decision making. If the feature prediction contribution of a prohibited feature is determined to be above a certain threshold, then the suggested action along with explanation data for the feature prediction contribution can be provided to a human operator, who may then perform the suggested action, a different action, or no action at all. If the feature prediction contribution for undesirable features is determined to be below a certain threshold, then performance of the suggested action may be caused 199 automatically.

Consider unknown and undesirable bias in a computer-based reasoning model. An example of this would be a decision-making computer-based reasoning model suggesting an action based on a characteristic that it should not, such deciding whether to approve a loan based on the height of an applicant. The designers, user, or other operators of a loan approval system may have flagged height as a prohibited factor for decision making. If it is determined that height was a factor (for example, the feature prediction contribution is above a certain threshold) in a loan decision, that information can be provided to a human operator, who may then decide to perform the suggested action (approve the loan notwithstanding that it was made at least in part based on height), a different action, or no action at all. If the feature prediction contribution of height is below the certain threshold, then the loan may be approved without further review based on the contribution of height to the decision.

As noted above, in some embodiments, there may also be features whose contribution are desired (e.g., credit score in the case of a loan approval). In such cases, if the feature prediction contribution for a feature whose contribution is desired is determined to be below a certain threshold, then the suggested action along with the feature prediction contribution may be provided to a human operator who may then decide to perform the suggested action (approve the loan notwithstanding that it was made at without contribution of the desired feature), a different action, or no action at all. If the feature prediction contribution of the desired feature is below the above threshold, then performance of the action may be caused 199 (e.g., loan may be approved) without further review based on the contribution of the desired feature (e.g., credit score) to the decision.

In some embodiments, not depicted in the figures, the feature contribution is used to reduce the size of a model in a computer-based reasoning system. For example, if a feature does not contribute much to a model, then it may be removed from the model. As a more specific example, the feature prediction contribution may be determined for multiple input contexts (e.g., tens of, hundreds of, thousands of, or more) input contexts and the feature contribution may be determined for each feature for each input context. Those features that never reach an exclusionary threshold amount of contribution to a decision (e.g., as determined by the feature prediction contribution) may be excluded from the computer-based reasoning model. In some embodiments, only those features that reach an inclusion threshold may be included in the computer-based reasoning model. In some embodiments, both an exclusionary lower threshold and inclusionary upper threshold may be used. In other embodiments, average contribution of a feature may be used to rank features and the top N features may be those included in the models. Excluding features from the model may be beneficial in embodiments where the size of the model causes the need for extra storage and/or computing power. In many computer-based reasoning systems, smaller models (e.g., with fewer features being analyzed) may be more efficient to store and when making decision. The reduced models may be used, for example, with any of the techniques described herein.

Familiarity Conviction Examples

Conviction and contribution measures may be used with the techniques herein. In some embodiments, conviction measures may be related in various ways to surprisal, including conviction being related to the ratio of observed surprisal to expected surprisal. Various of the conviction and contribution measures are discussed herein, including familiarity conviction. Familiarity conviction may be useful to employ conviction as measure of how much information the point distorts the model. To do so, the techniques herein may define a feature information measure, such as familiarity conviction, such that a point's weighted distance contribution affects other points' distance contribution and compared to the expected distance contribution of adding any new point. In some embodiments, it may be useful to employ conviction as measure of how much information the point distorts the model. To do so, one may define a feature information measure, such as familiarity conviction, such that a point's weighted distance contribution affects other points' distance contribution and compared to the expected distance contribution of adding any new point.

Definition 1. Given a point x ∈ X and the set K of its k nearest neighbors, a distance function d: $R^z \times Z \rightarrow R$, and a distance exponent a, the distance contribution of x may be the harmonic mean $$\phi(x) = \left(\frac{1}{|K|} \sum_{k \in K} \frac{1}{d(x,k)^a}\right)^{-1}. \quad (3)$$

Definition 2. Given a set of points $X \subset R^z$ for every x ∈ X and an integer $1 \leq k < |X|$ one may define the distance contribution probability distribution, C of X to be the set $$C = \left\{ \frac{\phi(x_1)}{\sum_{i=1}^{n} \phi(x_i)}, \frac{\phi(x_2)}{\sum_{i=1}^{n} \phi(x_i)}, \ldots, \frac{\phi(x_n)}{\sum_{i=1}^{n} \phi(x_i)} \right\} \quad (4)$$

for a function φ: X → R that returns the distance contribution.

Note that if φo(0)=∞, special consideration may be given to multiple identical points, such as splitting the distance contribution among those points.

Remark 1. C may be a valid probability distribution. In some embodiments, this fact is used to compute the amount of information in C.

Definition 3. The point probability of a point $x_i$, i=1, 2, ..., n may be $$l(i) = \frac{\phi(x_i)}{\sum_{i} \phi(x_i)} \quad (5)$$

where the index i is assigned the probability of the indexed point's distance contribution. One may denote this random variable L.

Remark 2. When points are selected uniformly at random, one may assume L is uniform when the distance probabilities have no trend or correlation.

Definition 4. The conviction of a point $x_i \in X$ may be $$\pi(x_i) = \frac{\frac{1}{|X|} \sum_{i} \mathbb{KL}(L \| L - \{i\} \cup \mathbb{E}l(i))}{\mathbb{KL}(L \| L - \{x_i\} \cup \mathbb{E}l(i))} \quad (6)$$

where KL is the Kullback-Leibler divergence. In some embodiments, when one assumes L is uniform, one may have that the expected probability $$\mathbb{E}l(i) = \frac{1}{n}.$$

Prediction Conviction Examples

In some embodiments, the conviction score is prediction conviction, and prediction conviction may be a proxy for accuracy of a prediction. Techniques herein may determine prediction conviction such that a point's weighted distance to other points is of primary importance and can be expressed as the information required to describe the position of the point in question relative to existing points.

Definition 5. Let ξ be the number of features in a model and n the number of observations. One may define the residual function of the training data X:

$$r: X \rightarrow R^\xi$$

$$r(x) = J_1(k,p), J_2(k,p), \ldots, J_\xi(k,p) \quad (7)$$

Where $J_i$ may be the residual of the model on feature i parameterized by the hyperparameters k and p evaluated on points near x. In some embodiments, one may refer to the residual function evaluated on all of the model data as $r_M$. in some embodiments, the feature residuals may be calculated as mean absolute error or standard deviation.

In some embodiments, one can quantify the information needed to express a distance contribution φ(x) by moving to a probability. In some embodiments, the exponential distribution may be selected to describe the distribution of residuals, as it may be the maximum entropy distribution constrained by the first moment. In some embodiments, a different distribution may be used for the residuals, such as the Laplace, lognormal distribution, Gaussian distribution, normal distribution, etc.

The exponential distribution may be represented or expressed as:

$$\frac{1}{\lambda} = \|r(x)\|_p \quad (8)$$

We can directly compare the distance contribution and p-normed magnitude of the residual. This is because the distance contribution is a locally weighted expected value of the distance from one point to its nearest neighbors, and the residual is an expected distance between a point and the nearest neighbors that are part of the model. Given the entropy maximizing assumption of the exponential distribution of the distances, we can then determine the probability that a distance contribution is greater than or equal to the magnitude of the residual $\|r(x)\|_p$ as:

$$P(\varphi(x) \geq \|r(x)\|_p) = e^{-\frac{1}{\|r(x)\|_p} \cdot \varphi(x)}. \quad (9)$$

We then convert the probability to self-information as:

$$I(x) = -\ln P(\varphi(x) \geq \|r(x)\|_p),  \quad (10)$$

which simplifies to:

$$I(x) = \frac{\varphi(x)}{\|r(x)\|_p}. \quad (11)$$

In some embodiments, the techniques may use prediction conviction on a per-feature basis, and equation 11a for I(x) may be used in place of equation 11:

$$I(x) = \frac{\varphi(x)}{|r(x)|}. \quad (11a)$$

As the distance contribution decreases, or as the residual vector magnitude increases, the less information may be needed to represent this point. One can then compare this to the expected value a regular conviction form, yielding a prediction conviction of:

$$\pi_p = \frac{\mathbb{E}I}{I(x)}, \quad (12)$$

where I is the self-information calculated for each point in the model.

Additional Prediction Conviction Examples

In some embodiments, $\varphi(x)$ may be the distance contribution of point x, and r(x) may be the magnitude of the expected feature residuals at point x using the same norm and same topological parameters as the distance contribution, putting both on the same scale.

The probability of both being less than the expected values may be:

$$P(\phi(x) > \mathbb{E}\phi(x)) \cdot P(r(x) > \mathbb{E}r(x)).$$

The self-information of this, which may be the negative log of the probability $$I = \frac{\phi(x)}{\mathbb{E}\phi(x)} + \frac{r(x)}{\mathbb{E}r(x)}.$$

The prediction conviction $$\pi_p = \frac{\mathbb{E}I}{I}$$

may men De calculated as:

$$\pi_p = \frac{\mathbb{E}\left(\frac{\phi(x)}{\mathbb{E}\phi(x)} + \frac{r(x)}{\mathbb{E}r(x)}\right)}{\frac{\phi(x)}{\mathbb{E}\phi(x)} + \frac{r(x)}{\mathbb{E}r(x)}}$$

$$\pi_p = \frac{\frac{\mathbb{E}\phi(x)}{\mathbb{E}\phi(x)} + \frac{\mathbb{E}r(x)}{\mathbb{E}r(x)}}{\frac{\phi(x)}{\mathbb{E}\phi(x)} + \frac{r(x)}{\mathbb{E}r(x)}},$$

which simplifies to:

$$\pi_p = \frac{2}{\frac{\phi(x)}{\mathbb{E}\phi(x)} + \frac{r(x)}{\mathbb{E}r(x)}}.$$

Feature Prediction Contribution Examples

In some embodiments, another feature information measure, Feature Prediction Contribution, may be related Mean Decrease in Accuracy (MDA). In MDA scores are established for models with all the features M and models with each feature held out $M_{-f_i}$, i=1 ... $\xi$. The difference $|M - M_{-f_i}|$ is the importance of each feature, where the result's sign is altered depending on whether the goal is to maximize or minimize score.

In some embodiments, prediction information $\pi_c$ is correlated with accuracy and thus may be used as a surrogate. The expected self-information required to express a feature is given by:

$$EI(M) = \frac{1}{\xi} \sum_i^\xi I(x_i),$$

and the expected self-information to express a feature without feature i is $$EI(M_{-i}) = \frac{1}{\xi} \sum_{j=0}^\xi I_{-i}(x_j).$$

One can now make two definitions:

Definition 6. The prediction contribution $\pi_c$ of feature i is $$\pi_c(i) = \frac{M - M_{-f_i}}{M}.$$

Definition 7. The prediction conviction, $\pi_p$ of feature i is $$\pi_p(i) = \frac{\frac{1}{\xi} \sum_{i=0}^\xi M_{-f_i}}{M_{-f_i}}.$$

Synthetic Data Generation Examples

In some embodiments, prediction conviction may express how surprising an observation is. As such, one may, effectively, reverse the math and use conviction to generate a new sample of data for a given amount of surprisal. In some embodiments, generally, the techniques may randomly select or predict a feature of a case from the training data and then resample it.

Given that some embodiments include calculating conditioned local residuals for a part of the model, as discussed elsewhere herein, the techniques may use this value to parameterize the random number distribution to generate a new value for a given feature. In order to understand this resampling method, it may be useful to discuss the approach used by the Mann-Whitney test, a powerful and widely used nonparametric test to determine whether two sets of samples were drawn from the same distribution. In the Mann-Whitney test, samples are randomly checked against one another to see which is greater, and if both sets of samples were drawn from the same distribution then the expectation is that both sets of samples should have an equal chance of having a higher value when randomly chosen samples are compared against each other.

In some embodiments, the techniques herein include resampling a point by randomly choosing whether the new sample is greater or less than the other point and then draw a sample from the distribution using the feature's residual as the expected value. In some embodiments, using the exponential distribution yields the double-sided exponential distribution (also known as the Laplace distribution), though lognormal and other distributions may be used as well.

If a feature is not continuous but rather nominal, then the local residuals can populate a confusion matrix, and an appropriate sample can be drawn based on the probabilities for drawing a new sample given the previous value.

As an example, the techniques may be used to generate a random value of feature i from the model with, for example, no other conditions on it. Because the observations within the model are representative of the observations made so far, a random instance is chosen from the observations using the uniform distribution over all observations. Then the value for feature i of this observation is resampled via the methods discussed elsewhere herein.

As another example, the techniques may be used to generate feature/of a data element or case, given that, in that data element or case, features $i \in \Xi$ have corresponding values $x_i$. The model labels feature j conditioned by all $x_i$ to find some value t. This new value t becomes the expected value for the resampling process described elsewhere herein, and the local residual (or confusion matrix) becomes the appropriate parameter or parameters for the expected deviation.

In some embodiments, the techniques include filling in the features for an instance by beginning with no feature values (or a subset of all the feature values) specified as conditions for the data to generate. The remaining features may be ordered randomly or may be ordered via a feature conviction value (or in any other manner described herein). When a new value is generated for the current feature, then the process restarts with the newly-set feature value as an additional condition on that feature.

Parameterizing Synthetic Data Via Prediction Conviction Examples

As discussed elsewhere, various embodiments use the double-sided exponential distribution as a maximum entropy distribution of distance in Lp space. One may then be able to derive a closed form solution for how to scale the exponential distributions based on a prediction conviction value. For example, a value, v, for the prediction conviction may be expressed as $$v = \pi_p(x) = \frac{EI}{I(x)} \tag{13}$$

which may be rearranged as $$I(x) = \frac{EI}{v}. \tag{14}$$

Substituting in the self-information described elsewhere herein:

$$\frac{\varphi(x)}{\|r(x)\|_p} = \frac{EI}{v}. \tag{15}$$

In some embodiments, that the units on both sides of Equation 15 match. This may be the case in circumstances where he natural logarithm and exponential in the derivation of Equation 15 cancel out, but leave the resultant in nats. We can rearrange in terms of distance contribution as:

$$\varphi(x) = \frac{\|r(x)\|_p \cdot EI}{v}. \tag{16}$$

If we let p=0, which may be desirable for conviction and other aspects of the similarity measure, then we can rewrite the distance contribution in terms of its parameter, $\lambda_i$, with expected mean of $$\frac{1}{\lambda_i}.$$

This becomes $$\Pi_i E(1/\lambda_i) = \frac{\Pi_i r_i EI}{v}. \tag{17}$$

In some embodiments, due to the number of ways surprisal may be assigned or calculated across the features, various solutions may exist. However, unless otherwise specified or conditioned, embodiments may include distributing surprisal uniformly across the features, holding expected proportionality constant. In some embodiments, the distance contribution may become the mean absolute error for the exponential distribution, such as:

$$E(1/\lambda_i) = r_i \frac{EI}{v}. \tag{18}$$

and solving for the $\lambda_i$ to parameterize the exponential distributions may result in:

$$\lambda_i = \frac{v}{R_i EI}. \tag{19}$$

In some embodiments, Equation 19, when combined with the value of the feature, may become the distribution by which to generate a new random number under the maximum entropy assumption of exponentially distributed distance from the value.

Reinforcement Learning Examples

In some embodiments, the techniques can generate data with a controlled amount of surprisal, which may be a novel way to characterize the classic exploration versus exploitation trade off in searching for an optimal solution to a goal. Traditionally, pairing a means to search, such as Monte Carlo tree search, with a universal function approximator, such as neural networks, may solve difficult reinforcement learning problems without domain knowledge. Because the data synthesis techniques described herein utilize the universal function approximator model (kNN) itself, it enables the techniques to be use in a reinforcement learning architecture that is similar and tightly coupled, as described herein.

In some embodiments, setting the conviction of the data synthesis to "1" (or any other appropriate value) yields a balance between exploration and exploitation. Because, in some embodiments, the synthetic data generation techniques described herein can also be conditioned, the techniques may condition the search on both the current state of the system, as it is currently observed, and a set of goal values for features. In some embodiments, as the system is being trained, it can be continuously updated with the new training data. Once states are evaluated for their ultimate outcome, a new set of features or feature values can be added to all of the observations indicating the final scores or measures of outcomes (as described elsewhere herein, e.g., in relation to outcome features). Keeping track of which observations belong to which training sessions (e.g., games) may be beneficial as a convenient way to track and update this data. In some embodiments, given that the final score or multiple goal metrics may already be in the kNN database, the synthetic data generation may allow querying for new data conditioned upon having a high score or winning conditions (or any other appropriate condition), with a specified amount of conviction.

In some embodiments, the techniques herein provide a reinforcement learning algorithm that can be queried for the relevant training data for every decision, as described elsewhere herein. The commonality among the similar cases, boundary cases, archetypes, etc. can be combined to find when certain decisions are likely to yield a positive outcome, negative outcome, or a larger amount of surprisal thus improving the quality of the model. In some embodiments, by seeking high surprisal moves, the system will improve the breadth of its observations.

Targeted and Untargeted Techniques for Determining Conviction and Other Measures In some embodiments, any of the feature information measures, conviction or contribution measures (e.g., surprisal, prediction conviction, familiarity conviction, and/or feature prediction contribution and/or feature prediction conviction) may be determined using an "untargeted" and/or a "targeted" approach. In the untargeted approach, the measure (e.g., a conviction measure) is determined by holding out the item in question and then measuring information gain associated with putting the item back into the model. Various examples of this are discussed herein. For example, to measure the untargeted conviction of a case (or feature), the conviction is measured in part based on taking the case (or feature) out of the model, and then measuring the information associated with adding the case (or feature) back into the model.

In order to determine a targeted measure, such as surprisal, conviction, or contribution of a data element (e.g., a case or a feature), in contrast to untargeted measures, everything is dropped from the model except the features or cases being analyzed (the "analyzed data element(s)") and the target features or cases ("target data element(s)"). Then the measure is calculated by measure the conviction, information gain, contribution, etc. based on how well the analyzed data element(s) predict the target data element(s) in the absence of the rest of the model.

In each instance that a measure, such as a surprisal, conviction, contribution, etc. measure, is discussed herein, the measure may be determined using either a targeted approach or an untargeted approach. For example, when the term "conviction" is used, it may refer to targeted or untargeted prediction conviction, targeted or untargeted familiarity conviction, and/or targeted or untargeted feature prediction conviction. Similarly, when surprisal, information, and/or contribution measures are discussed without reference to either targeted or untargeted calculation techniques, then reference may be being made to either a targeted or untargeted calculation for the measure.

Systems for Synthetic Data Generation in Computer-Based Reasoning Systems

Figure 2:
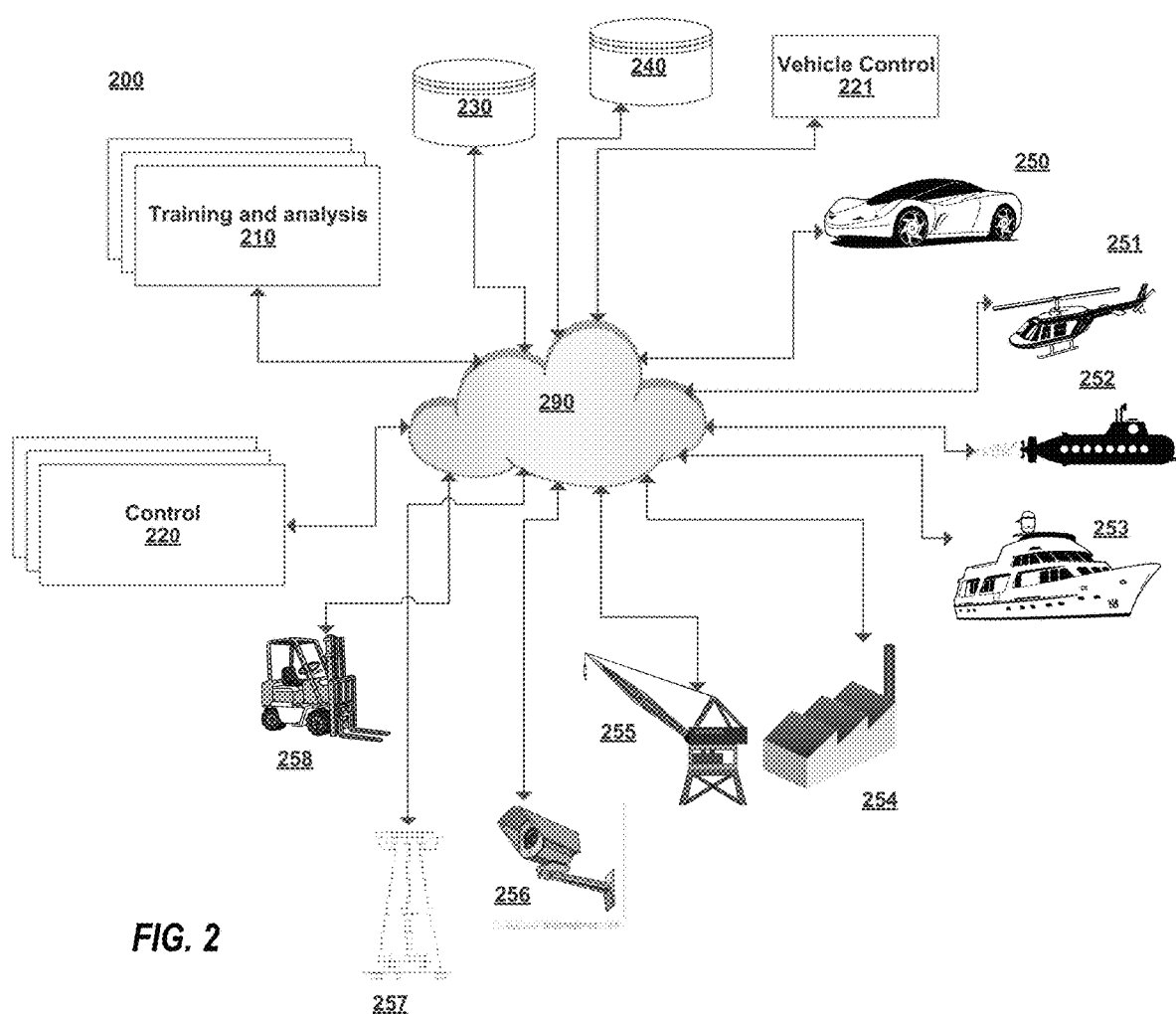
FIG. 2 is a block diagram depicting example systems for synthetic data generation in computer-based reasoning systems.

FIG. 2 is a block diagram depicting example systems for synthetic data generation in computer-based reasoning systems. Numerous devices and systems are coupled to a network 290. Network 290 can include the internet, a wide area network, a local area network, a Wi-Fi network, any other network or communication device described herein, and the like. Further, numerous of the systems and devices connected to 290 may have encrypted communication there between, VPNs, and or any other appropriate communication or security measure. System 200 includes a training and analysis system 210 coupled to network 290. The training and analysis system 210 may be used for collecting data related to systems 250-258 and creating computer-based reasoning models based on the training of those systems. Further, training and analysis system 210 may perform aspects of process 100 and/or 400 described herein. Control system 220 is also coupled to network 290. A control system 220 may control various of the systems 250-258. For example, a vehicle control 221 may control any of the vehicles 250-253, or the like. In some embodiments, there may be one or more network attached storages 230, 240. These storages 230, 240 may store training data, computer-based reasoning models, updated computer-based reasoning models, and the like. In some embodiments, training and analysis system 210 and/or control system 220 may store any needed data including computer-based reasoning models locally on the system.

FIG. 2 depicts numerous systems 250-258 that may be controlled by a control system 220 or 221. For example, automobile 250, helicopter 251, submarine 252, boat 253, factory equipment 254, construction equipment 255, security equipment 256, oil pump 257, or warehouse equipment 258 may be controlled by a control system 220 or 221.

Example Processes for Controlling Systems

Figure 4:
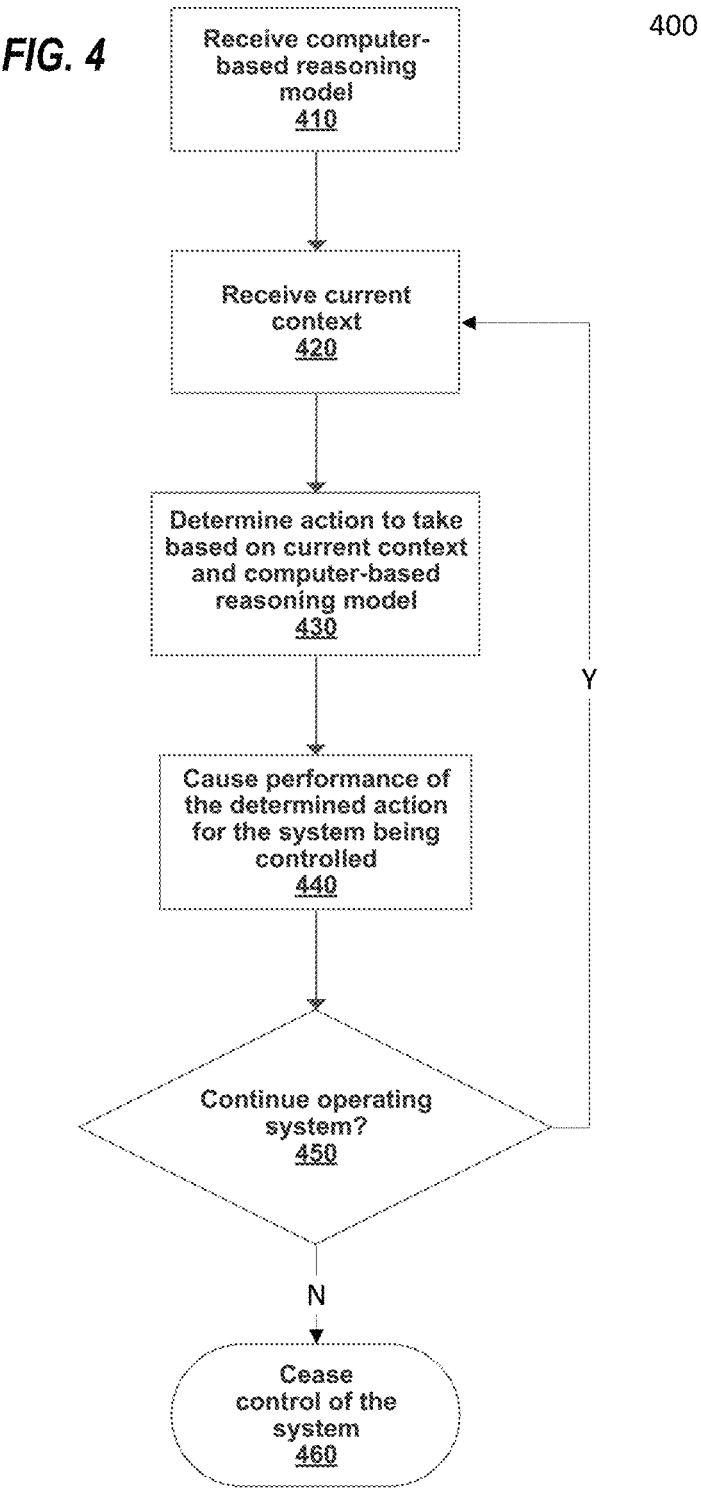
FIG. 4 is a flow diagram depicting example processes for controlling systems.

FIG. 4 depicts an example process 400 for controlling a system. In some embodiments and at a high level, the process 400 proceeds by receiving or receiving 410 a computer-based reasoning model for controlling the system. The computer-based reasoning model may be one created using process 100, as one example. In some embodiments, the process 400 proceeds by receiving 420 a current context for the system, determining 430 an action to take based on the current context and the computer-based reasoning model, and causing 440 performance of the determined action (e.g., labelling an image, causing a vehicle to perform the turn, lane change, waypoint navigation, etc.). If operation of the system continues 450, then the process returns to receive 420 the current context, and otherwise discontinues 460 control of the system. In some embodiments, causing 199 performance of a selected action may include causing 440 performance of a determined action (or vice-versa).

As discussed herein the various processes 100, 400, etc. may run in parallel, in conjunction, together, or one process may be a subprocess of another. Further, any of the processes may run on the systems or hardware discussed herein. The features and steps of processes 100, 400 could be used in combination and/or in different orders.

Self-Driving Vehicles

Returning to the top of the process 400, it begins by receiving 410 a computer-based reasoning model for controlling or causing control of the system. The computer-based reasoning model may be received in any appropriate matter. It may be provided via a network 290, placed in a shared or accessible memory on either the training and analysis system 210 or control system 220, or in accessible storage, such as storage 230 or 240.

In some embodiments (not depicted in FIG. 4), an operational situation could be indicated for the system. The operational situation is related to context, but may be considered a higher level, and may not change (or change less frequently) during operation of the system. For example, in the context of control of a vehicle, the operational situation may be indicated by a passenger or operator of the vehicle, by a configuration file, a setting, and/or the like. For example, a passenger Alicia may select "drive like Alicia" in order to have the vehicle driver like her. As another example, a fleet of helicopters may have a configuration file set to operate like Bob. In some embodiments, the operational situation may be detected. For example, the vehicle may detect that it is operating in a particular location (area, city, region, state, or country), time of day, weather condition, etc. and the vehicle may be indicated to drive in a manner appropriate for that operational situation.

The operational situation, whether detected, indicated by passenger, etc., may be changed during operation of the vehicle. For example, a passenger may first indicate that she would like the vehicle to drive cautiously (e.g., like Alicia), and then realize that she is running later and switch to a faster operation mode (e.g., like Carole). The operational situation may also change based on detection. For example, if a vehicle is operating under an operational situation for a particular portion of road, and detects that it has left that portion of road, it may automatically switch to an operational situation appropriate for its location (e.g., for that city), may revert to a default operation (e.g., a baseline program that operates the vehicle) or operational situation (e.g., the last used). In some embodiments, if the vehicle detects that it needs to change operational situations, it may prompt a passenger or operator to choose a new operational situation.

In some embodiments, the computer-based reasoning model is received before process 400 begins (not depicted in FIG. 4), and the process begins by receiving 420 the current context. For example, the computer-based reasoning model may already be loaded into a controller 220 and the process 400 begins by receiving 420 the current context for the system being controlled. In some embodiments, referring to FIG. 2, the current context for a system to be controlled (not depicted in FIG. 2) may be sent to control system 220 and control system 220 may receive 420 current context for the system.

Receiving 420 current context may include receiving the context data needed for a determination to be made using the computer-based reasoning model. For example, turning to the vehicular example, receiving 420 the current context may, in various embodiments, include receiving information from sensors on or near the vehicle, determining information based on location or other sensor information, accessing data about the vehicle or location, etc. For example, the vehicle may have numerous sensors related to the vehicle and its operation, such as one or more of each of the following: speed sensors, tire pressure monitors, fuel gauges, compasses, global positioning systems (GPS), RADARs, LiDARs, cameras, barometers, thermal sensors, accelerometers, strain gauges, noise/sound measurement systems, etc. Current context may also include information determined based on sensor data. For example, the time to impact with the closest object may be determined based on distance calculations from RADAR or LiDAR data, and/or may be determined based on depth-from-stereo information from cameras on the vehicle. Context may include characteristics of the sensors, such as the distance a RADAR or LiDAR is capable of detecting, resolution and focal length of the cameras, etc. Context may include information about the vehicle not from a sensor. For example, the weight of the vehicle, acceleration, deceleration, and turning or maneuverability information may be known for the vehicle and may be part of the context information. Additionally, context may include information about the location, including road condition, wind direction and strength, weather, visibility, traffic data, road layout, etc.

Referring back to the example of vehicle control rules for Bob flying a helicopter, the context data for a later flight of the helicopter using the vehicle control rules based on Bob's operation of the helicopter may include fuel remaining, distance that fuel can allow the helicopter to travel, location including elevation, wind speed and direction, visibility, location and type of sensors as well as the sensor data, time to impact with the N closest objects, maneuverability and speed control information, etc. Returning to the stop sign example, whether using vehicle control rules based on Alicia or Carole, the context may include LiDAR, RADAR, camera and other sensor data, location information, weight of the vehicle, road condition and weather information, braking information for the vehicle, etc.

The control system then determined 430 an action to take based on the current context and the computer-based reasoning model. For example, turning to the vehicular example, an action to take is determined 430 based on the current context and the vehicle control rules for the current operational situation. In some embodiments that use machine learning, the vehicle control rules may be in the form of a neural network (as described elsewhere herein), and the context may be fed into the neural network to determine an action to take. In embodiments using case-based reasoning, the set of context-action pairs closest (or most similar) to the current context may be determined. In some embodiments, only the closest context-action pair is determined, and the action associated with that context-action pair is the determined 430 action. In some embodiments, multiple context-action pairs are determined 430. For example, the N "closest" context-action pairs may be determined 430, and either as part of the determining 430, or later as part of the causing 440 performance of the action, choices may be made on the action to take based on the N closest context-action pairs, where "distance" for between the current context can be measured using any appropriate technique, including use of Euclidean distance, Minkowski distance, Damerau-Levenshtein distance, Kullback-Leibler divergence, and/or any other distance measure, metric, pseudometric, premetric, index, or the like.

In some embodiments, the actions to be taken may be blended based on the action of each context-action pair, with invalid (e.g., impossible or dangerous) outcomes being discarded. A choice can also be made among the N context-action pairs chosen based on criteria such as choosing to use the same or different operator context-action pair from the last determined action. For example, in an embodiment where there are context-action pair sets from multiple operators in the vehicle control rules, the choice of which context-action pair may be based on whether a context-action pair from the same operator was just chosen (e.g., to maintain consistency). The choice among the top N context-action pairs may also be made by choosing at random, mixing portions of the actions together, choosing based on a voting mechanism, etc.

Some embodiments include detecting gaps in the training data and/or vehicle control rules and indicating those during operation of the vehicle (for example, via prompt and/or spoken or graphical user interface) or offline (for example, in a report, on a graphical display, etc.) to indicate what additional training is needed (not depicted in FIG. 4). In some embodiments, when the computer-based reasoning system does not find context "close enough" to the current context to make a confident decision on an action to take, it may indicate this and suggest that an operator might take manual control of the vehicle, and that operation of the vehicle may provide additional context and action data for the computer-based reasoning system. Additionally, in some embodiments, an operator may indicate to a vehicle that she would like to take manual control to either override the computer-based reasoning system or replace the training data. These two scenarios may differ by whether the data (for example, context-action pairs) for the operational scenario are ignored for this time period, or whether they are replaced.

In some embodiments, the operational situation may be chosen based on a confidence measure indicating confidence in candidate actions to take from two (or more) different sets of control rules (not depicted in FIG. 4). Consider a first operational situation associated with a first set of vehicle control rules (e.g., with significant training from Alicia driving on highways) and a second operational situation associated with a second set of vehicle control rules (e.g., with significant training from Carole driving on rural roads). Candidate actions and associated confidences may be determined for each of the sets of vehicle control rules based on the context. The determined 430 action to take may then be selected as the action associated with the higher confidence level. For example, when the vehicle is driving on the highway, the actions from the vehicle control rules associated with Alicia may have a higher confidence, and therefore be chosen. When the vehicle is on rural roads, the actions from the vehicle control rules associated with Carole may have higher confidence and therefore be chosen. Relatedly, in some embodiments, a set of vehicle control rules may be hierarchical, and actions to take may be propagated from lower levels in the hierarchy to high levels, and the choice among actions to take propagated from the lower levels may be made on confidence associated with each of those chosen actions. The confidence can be based on any appropriate confidence calculation including, in some embodiments, determining how much "extra information" in the vehicle control rules is associated with that action in that context.

In some embodiments, there may be a background or baseline operational program that is used when the computer-based reasoning system does not have sufficient data to make a decision on what action to take (not depicted in FIG. 4). For example, if in a set of vehicle control rules, there is no matching context or there is not a matching context that is close enough to the current context, then the background program may be used. If none of the training data from Alicia included what to do when crossing railroad tracks, and railroad tracks are encountered in later operation of the vehicle, then the system may fall back on the baseline operational program to handle the traversal of the railroad tracks. In some embodiments, the baseline model is a computer-based reasoning system, in which case context-action pairs from the baseline model may be removed when new training data is added. In some embodiments, the baseline model is an executive driving engine which takes over control of the vehicle operation when there are no matching contexts in the vehicle control rules (e.g., in the case of a context-based reasoning system, there might be no context-action pairs that are sufficiently "close").

In some embodiments, determining 430 an action to take based on the context can include determining whether vehicle maintenance is needed. As described elsewhere herein, the context may include wear and/or timing related to components of the vehicle, and a message related to maintenance may be determined based on the wear or timing. The message may indicate that maintenance may be needed or recommended (e.g., because preventative maintenance is often performed in the timing or wear context, because issues have been reported or detected with components in the timing or wear context, etc.). The message may be sent to or displayed for a vehicle operator (such as a fleet management service) and/or a passenger. For example, in the context of an automobile with sixty thousand miles, the message sent to a fleet maintenance system may include an indication that a timing belt may need to be replaced in order to avoid a P percent chance that the belt will break in the next five thousand miles (where the predictive information may be based on previously-collected context and action data, as described elsewhere herein). When the automobile reaches ninety thousand miles and assuming the belt has not been changed, the message may include that the chance that the belt will break has increased to, e.g., P*4 in the next five thousand miles.

Performance of the determined 430 action is then caused 440. Turning to the vehicular example, causing 440 performance of the action may include direct control of the vehicle and/or sending a message to a system, device, or interface that can control the vehicle. The action sent to control the vehicle may also be translated before it is used to control the vehicle. For example, the action determined 430 may be to navigate to a particular waypoint. In such an embodiment, causing 440 performance of the action may include sending the waypoint to a navigation system, and the navigation system may then, in turn, control the vehicle on a finer-grained level. In other embodiments, the determined 430 action may be to switch lanes, and that instruction may be sent to a control system that would enable the car to change the lane as directed. In yet other embodiments, the action determined 430 may be lower-level (e.g., accelerate or decelerate, turn 4° to the left, etc.), and causing 440 performance of the action may include sending the action to be performed to a control of the vehicle, or controlling the vehicle directly. In some embodiments, causing 440 performance of the action includes sending one or more messages for interpretation and/or display. In some embodiments, the causing 440 the action includes indicating the action to be taken at one or more levels of a control hierarchy for a vehicle. Examples of control hierarchies are given elsewhere herein.

Some embodiments include detecting anomalous actions taken or caused 440 to be taken. These anomalous actions may be signaled by an operator or passenger, or may be detected after operation of the vehicle (e.g., by reviewing log files, external reports, etc.). For example, a passenger of a vehicle may indicate that an undesirable maneuver was made by the vehicle (e.g., turning left from the right lane of a 2-lane road) or log files may be reviewed if the vehicle was in an accident. Once the anomaly is detected, the portion of the vehicle control rules (e.g., context-action pair(s)) related to the anomalous action can be determined. If it is determined that the context-action pair(s) are responsible for the anomalous action, then those context-action pairs can be removed or replaced using the techniques herein.

Referring to the example of the helicopter fleet and the vehicle control rules associated with Bob, the vehicle control 220 may determine 430 what action to take for the helicopter based on the received 420 context. The vehicle control 220 may then cause the helicopter to perform the determined action, for example, by sending instructions related to the action to the appropriate controls in the helicopter. In the driving example, the vehicle control 220 may determine 430 what action to take based on the context of vehicle. The vehicle control may then cause 440 performance of the determined 430 action by the automobile by sending instructions to control elements on the vehicle.

If there are more 450 contexts for which to determine actions for the operation of the system, then the process 400 returns to receive 410 more current contexts. Otherwise, process 400 ceases 460 control of the system. Turning to the vehicular example, as long as there is a continuation of operation of the vehicle using the vehicle control rules, the process 400 returns to receive 420 the subsequent current context for the vehicle. If the operational situation changes (e.g., the automobile is no longer on the stretch of road associated with the operational situation, a passenger indicates a new operational situation, etc.), then the process returns to determine the new operational situation. If the vehicle is no longer operating under vehicle control rules (e.g., it arrived at its destination, a passenger took over manual control, etc.), then the process 400 will discontinue 460 autonomous control of the vehicle.

Many of the examples discussed herein for vehicles discuss self-driving automobiles. As depicted in FIG. 2, numerous types of vehicles can be controlled. For example, a helicopter 251 or drone, a submarine 252, or boat or freight ship 253, or any other type of vehicle such as plane or drone (not depicted in FIG. 2), construction equipment, (not depicted in FIG. 2), and/or the like. In each case, the computer-based reasoning model may differ, including using different features, using different techniques described herein, etc. Further, the context of each type of vehicle may differ. Flying vehicles may need context data such as weight, lift, drag, fuel remaining, distance remaining given fuel, windspeed, visibility, etc. Floating vehicles, such as boats, freight vessels, submarines, and the like may have context data such as buoyancy, drag, propulsion capabilities, speed of currents, a measure of the choppiness of the water, fuel remaining, distance capability remaining given fuel, and the like. Manufacturing and other equipment may have as context width of area traversing, turn radius of the vehicle, speed capabilities, towing/lifting capabilities, and the like.

Image Labelling

The techniques herein may also be used for image-labeling systems. For example, numerous experts may label images (e.g., identifying features of or elements within those images). For example, the human experts may identify cancerous masses on x-rays. Having these experts label all input images is incredibly time consuming to do on an ongoing basis, in addition to being expensive (paying the experts). The techniques herein may be used to train an image-labeling computer-based reasoning model based on previously-trained images. Once the image-labeling computer-based reasoning system has been built, then input images may be analyzed using the image-based reasoning system. In order to build the image-labeling computer-based reasoning system, images may be labeled by experts and used as training data. Using the techniques herein, the surprisal and/or conviction of the training data can be used to build an image-labeling computer-based reasoning system that balances the size of the computer-based reasoning model with the information that each additional image (or set of images) with associated labels provides. Once the image-labelling computer-based reasoning is trained, it can be used to label images in the future. For example, a new image may come in, the image-labelling computer-based reasoning may determine one or more labels for the image, and then the one or more labels may then be applied to the image. Thus, these images can be labeled automatically, saving the time and expense related to having experts label the images.

In some embodiments, processes 100, 400 may include determining the surprisal and/or conviction of each image (or multiple images) and the associated labels or of the aspects of the computer-based reasoning model. The surprisal and/or conviction for the one or more images may be determined and a determination may be made whether to select or include the one or more images (or aspects) in the image-labeling computer-based reasoning model based on the determined surprisal and/or conviction. While there are more sets of one or more images with labels to assess, the process may return to determine whether more image or label sets should be included or whether aspects should be included and/or changed in the model. Once there are no more images or aspects to consider, the process can turn to controlling the image analysis system using the image-labeling computer-based reasoning.

In some embodiments, process 100 may determine (e.g., in response to a request) synthetic data for use in the image-labeling computer-based reasoning model. Based on a model that uses the synthetic data, the process can cause 199 control of an image-labeling system using process 400. For example, if the data elements are related to images and labels applied to those images, then the image-labeling computer-based reasoning model trained on that data will apply labels to incoming images. Process 400 proceeds by receiving 410 an image-labeling computer-based reasoning model. The process proceeds by receiving 420 an image for labeling. The image-labeling computer-based reasoning model is then used to determine 430 labels for the input image. The image is then labeled 440. If there are more 450 images to label, then the system returns to receive 410 those images and otherwise ceases 460. In such embodiments, the image-labeling computer-based reasoning model may be used to select labels based on which training image is "closest" (or most similar) to the incoming image. The label(s) associated with that image will then be selected to apply to the incoming image.

Manufacturing and Assembly

The processes 100, 400 may also be used for manufacturing and/or assembly. For example, conviction can be used to identify normal behavior versus anomalous behavior of such equipment. Using the techniques herein, a crane (e.g., crane 255 of FIG. 2), robot arm, or other actuator is attempting to "grab" something and its surprisal is too high, it can stop, sound an alarm, shutdown certain areas of the facility, and/or request for human assistance. Anomalous behavior that is detected via conviction among sensors and actuators can be used to detect when there is some sort breakdown, unusual wear or mechanical or other malfunction, etc. It can also be used to find damaged equipment for repairs or buffing or other improvements for any robots or other machines that are searching and correcting defects in products or themselves (e.g., fixing a broken wire or smoothing out cuts made to the ends of a manufactured artifact made via an extrusion process). Conviction can also be used for cranes and other grabbing devices to find which cargo or items are closest matches to what is needed. Conviction can be used to drastically reduce the amount of time to train a robot to perform a new task for a new product or custom order, because the robot will indicate the aspects of the process it does not understand and direct training towards those areas and away from things it has already learned. Combining this with stopping ongoing actions when an anomalous situation is detected would also allow a robot to begin performing work before it is fully done training, the same way that a human apprentice may help out someone experienced while the apprentice is learning the job. Conviction can also inform what features or inputs to the robot are useful and which are not.

As an additional example in the manufacturing or assembly context, vibration data can be used to diagnose (or predict) issues with equipment. In some embodiments, the training data for the computer-based reasoning system would be vibration data (e.g., the output of one or more piezo vibration sensors attached to one or more pieces of manufacturing equipment) for a piece of equipment along with diagnosis of an issue or error that occurred with the equipment. The training data may similarly include vibration data for the manufacturing equipment that is not associated with an issue or error with the equipment. In subsequent operation of the same or similar equipment, the vibration data can be collected, and the computer-based reasoning model can be used to assess that vibration data to either diagnose or predict potential issues or errors with the equipment. For example, the vibration data for current (or recent) operation of one or more pieces of equipment, the computer-based reasoning model may be used to predict, diagnose, or otherwise determine issues or errors with the equipment. As a more specific example, a current context of vibration data for one or more pieces of manufacturing equipment may result in a diagnosis or prediction of various conditions, including, but not limited to: looseness of a piece of equipment (e.g., a loose screw), an imbalance on a rotating element (e.g., grime collected on a rotating wheel), misalignment or shaft runout (e.g., machine shafts may be out of alignment or not parallel), wear (e.g., ball or roller bearings, drive belts or gears become worn, they might cause vibration). As a further example, misalignment can be caused during assembly or develop over time, due to thermal expansion, components shifting or improper reassembly after maintenance. When a roller or ball bearing becomes pitted, for instance, the rollers or ball bearing will cause a vibration each time there is contact at the damaged area. A gear tooth that is heavily chipped or worn, or a drive belt that is breaking down, can also produce vibration. Diagnosis or prediction of the issue or error can be made based on the current or recent vibration data, and a computer-based reasoning model training data from the previous vibration data and associated issues or errors. Diagnosing or predicting the issues of vibration can be especially important where the vibration can cause other issues. For example, wear on a bearing may cause a vibration that then loosens another piece of equipment, which then can cause other issues and damage to equipment, failure of equipment, and even failure of the assembly or manufacturing process.

In some embodiments, techniques herein may determine (e.g., in response to a request) the surprisal and/or conviction of one or more data elements (e.g., of the manufacturing equipment) or aspects (e.g., features of context-action pairs or aspects of the model) to potentially include in the manufacturing control computer-based reasoning model. The surprisal and/or conviction for the one or more manufacturing elements may be determined and a determination may be made whether to select or include the one or more manufacturing data elements or aspects in the manufacturing control computer-based reasoning model based on the determined surprisal and/or conviction. While there are more sets of one or more manufacturing data elements or aspects to assess (e.g., from additional equipment and/or from subsequent time periods), the process may return to determine whether more manufacturing data elements or aspects sets should be included in the computer-based reasoning model. Once there are no more manufacturing data elements or aspects to consider for inclusion, the process can turn to controlling or causing control of the manufacturing system using the manufacturing control computer-based reasoning system.

In some embodiments, process 100 may determine (e.g., in response to a request) synthetic data for use in the manufacturing control computer-based reasoning model. Based on a model using the synthetic data, causing 199 control of a manufacturing system may be accomplished by process 400. For example, if the data elements are related to manufacturing data elements or aspects, then the manufacturing control computer-based reasoning model trained on that data will cause control manufacturing or assemble. Process 400 proceeds by receiving 410 a manufacturing control computer-based reasoning model. The process proceeds by receiving 420 a context. The manufacturing control computer-based reasoning model is then used to determine 430 an action to take. The action is then performed by the control system (e.g., caused by the manufacturing control computer-based reasoning system). If there are more 450 contexts to consider, then the system returns to receive 410 those contexts and otherwise ceases 460. In such embodiments, the manufacturing control computer-based reasoning model may be used to control a manufacturing system. The chosen actions are then performed by a control system.

Smart Voice Control

The processes 100, 400 may be used for smart voice control. For example, combining multiple inputs and forms of analysis, the techniques herein can recognize if there is something unusual about a voice control request. For example, if a request is to purchase a high-priced item or unlock a door, but the calendar and synchronized devices indicate that the family is out of town, it could send a request to the person's phone before confirming the order or action; it could be that an intruder has recorded someone's voice in the family or has used artificial intelligence software to create a message and has broken in. It can detect other anomalies for security or for devices activating at unusual times, possibly indicating some mechanical failure, electronics failure, or someone in the house using things abnormally (e.g., a child frequently leaving the refrigerator door open for long durations). Combined with other natural language processing techniques beyond sentiment analysis, such as vocal distress, a smart voice device can recognize that something is different and ask, improving the person's experience and improving the seamlessness of the device into the person's life, perhaps playing music, adjusting lighting, or HVAC, or other controls. The level of confidence provided by conviction can also be used to train a smart voice device more quickly as it can ask questions about aspects of its use that it has the least knowledge about. For example: "I noticed usually at night, but also some days, you turn the temperature down in what situations should I turn the temperature down? What other inputs (features) should I consider?"

Using the techniques herein, a smart voice device may also be able to learn things it otherwise may not be able to. For example, if the smart voice device is looking for common patterns in any of the aforementioned actions or purchases and the conviction drops below a certain threshold, it can ask the person if it should take on a particular action or additional autonomy without prompting, such as "It looks like you're normally changing the thermostat to colder on days when you have your exercise class, but not on days when it is cancelled; should I do this from now on and prepare the temperature to your liking?"

In some embodiments, processes 100, 400 may include determining (e.g., in response to a request) the surprisal and/or conviction of one or more data elements (e.g., of the smart voice system) or aspects (e.g., features of the data or parameters of the model) to potentially include in the smart voice system control computer-based reasoning model. The surprisal for the one or more smart voice system data elements or aspects may be determined and a determination may be made whether to include the one or more smart voice system data elements or aspects in the smart voice system control computer-based reasoning model based on the determined surprisal and/or conviction. While there are more sets of one or more smart voice system data elements or aspects to assess, the process may return to determine whether more smart voice system data elements or aspects sets should be included. Once there are no more smart voice system data elements or aspects to consider, the process can turn to controlling or causing control of the smart voice system using the smart voice system control computer-based reasoning model.

In some embodiments, process 100 may determine (e.g., in response to a request) synthetic data for use in the smart voice computer-based reasoning model. Based on a model that uses the synthetic data, the process can cause 199 control of a smart voice system using process 400. For example, if the data elements are related to smart voice system actions, then the smart voice system control computer-based reasoning model trained on that data will control smart voice systems. Process 400 proceeds by receiving 410 a smart voice computer-based reasoning model. The process proceeds by receiving 420 a context. The smart voice computer-based reasoning model is then used to determine 430 an action to take. The action is then performed by the control system (e.g., caused by the smart voice computer-based reasoning system). If there are more 450 contexts to consider, then the system returns to receive 410 those contexts and otherwise ceases 460. In such embodiments, the smart voice computer-based reasoning model may be used to control a smart voice system. The chosen actions are then performed by a control system.

Control of Federated Devices

The processes 100, 400 may also be used for federated device systems. For example, combining multiple inputs and forms of analysis, the techniques herein can recognize if there is something that should trigger action based on the state of the federated devices. For example, if the training data includes actions normally taken and/or statuses of federated devices, then an action to take could be an often-taken action in the certain (or related contexts). For example, in the context of a smart home with interconnected heating, cooling, appliances, lights, locks, etc., the training data could be what a particular user does at certain times of day and/or in particular sequences. For example, if, in a house, the lights in the kitchen are normally turned off after the stove has been off for over an hour and the dishwasher has been started, then when that context again occurs, but the kitchen light has not been turned off, the computer-based reasoning system may cause an action to be taken in the smart home federated systems, such as prompting (e.g., audio) whether the user of the system would like the kitchen lights to be turned off. As another example, training data may indicate that a user sets the house alarm and locks the door upon leaving the house (e.g., as detected via geofence). If the user leaves the geofenced location of the house and has not yet locked the door and/or set the alarm, the computer-based reasoning system may cause performance of an action such as inquiring whether it should lock the door and/or set an alarm. As yet another example, in the security context, the control may be for turning on/off cameras, or enact other security measures, such as sounding alarms, locking doors, or even releasing drones and the like. Training data may include previous logs and sensor data, door or window alarm data, time of day, security footage, etc. and when security measure were (or should have been) taken. For example, a context such as particular window alarm data for a particular basement window coupled with other data may be associated with an action of sounding an alarm, and when a context occurs related to that context, an alarm may be sounded.

In some embodiments, processes 100, 400 may include determining the surprisal and/or conviction of one or more data elements or aspects of the federated device control system for potential inclusion in the federated device control computer-based reasoning model. The surprisal for the one or more federated device control system data elements may be determined and a determination may be made whether to select or include the one or more federated device control system data elements in the federated device control computer-based reasoning model based on the determined surprisal and/or conviction. While there are more sets of one or more federated device control system data elements or aspects to assess, the process may return to determine whether more federated device control system data elements or aspect sets should be included. Once there are no more federated device control system data elements or aspects to consider, the process can turn to controlling or causing control of the federated device control system using the federated device control computer-based reasoning model.

In some embodiments, process 100 may determine (e.g., in response to a request) synthetic data for use in the federated device computer-based reasoning model. Based on a model that uses the synthetic data, the process can cause 199 control of a federated device system using process 400. For example, if the data elements are related to federated device system actions, then the federated device control computer-based reasoning model trained on that data will control federated device control system. Process 400 proceeds by receiving 410 a federated device control computer-based reasoning model. The process proceeds by receiving 420 a context. The federated device control computer-based reasoning model is then used to determine 430 an action to take. The action is then performed by the control system (e.g., caused by the federated device control computer-based reasoning system). If there are more 450 contexts to consider, then the system returns to receive 410 those contexts and otherwise ceases 460. In such embodiments, the federated device control computer-based reasoning model may be used to control federated devices. The chosen actions are then performed by a control system.

Control and Automation of Experiments

The processes 100, 400 may also be used to control laboratory experiments. For example, many lab experiments today, especially in the biological and life sciences, but also in agriculture, pharmaceuticals, materials science and other fields, yield combinatorial increases, in terms of numbers, of possibilities and results. The fields of design of experiment, as well as many combinatorial search and exploration techniques are currently combined with statistical analysis. However, conviction-based techniques such as those herein can be used to guide a search for knowledge, especially if combined with utility or fitness functions. Automated lab experiments (including pharmaceuticals, biological and life sciences, material science, etc.) may have actuators and may put different chemicals, samples, or parts in different combinations and put them under different circumstances. Using conviction to guide the machines enables them to home in on learning how the system under study responds to different scenarios, and, for example, searching areas of greatest uncertainty (e.g., the areas with low conviction as discussed herein). Conceptually speaking, when the conviction or surprisal is combined with a fitness, utility, or value function, especially in a multiplicative fashion, then the combination is a powerful information theoretic approach to the classic exploration vs exploitation trade-offs that are made in search processes from artificial intelligence to science to engineering. Additionally, such a system can automate experiments where it can predict the most effective approach, homing in on the best possible, predictable outcomes for a specific knowledge base. Further, like in the other embodiments discussed herein, it could indicate (e.g., raise alarms) to human operators when the results are anomalous, or even tell which features being measured are most useful (so that they can be appropriately measured) or when measurements are not sufficient to characterize the outcomes. This is discussed extensively elsewhere herein. If the system has multiple kinds of sensors that have "costs" (e.g., monetary, time, computation, etc.) or cannot be all activated simultaneously, the feature entropies or convictions could be used to activate or deactivate the sensors to reduce costs or improve the distinguishability of the experimental results.

In the context of agriculture, growers may experiment with various treatments (plant species or varietals, crop types, seed planting densities, seed spacings, fertilizer types and densities, etc.) in order to improve yield and/or reduce cost. In comparing the effects of different practices (treatments), experimenters or growers need to know if the effects observed in the crop or in the field are simply a product of the natural variation that occurs in every ecological system, or whether those changes are truly a result of the new treatments. In order to ameliorate the confusion caused by overlapping crop, treatment, and field effects, different design types can be used (e.g., demonstration strip, replication control or measurement, randomized block, split plot, factorial design, etc.). Regardless, however, of the type of test design type used, determination of what treatment(s) to use is crucial to success. Using the techniques herein to guide treatment selection (and possible design type) enables experimenters and growers to home in on how the system under study responds to different treatments and treatment types, and, for example, searching areas of greatest uncertainty in the "treatment space" (e.g., what are the types of treatments about which little is known?). Conceptually, the combination of conviction or surprisal with a value, utility, or fitness function such as yield, cost, or a function of yield and cost, become a powerful information theoretic approach to the classic exploration vs exploitation trade-offs that are made in search processes from artificial intelligence to science to engineering. Growers can use this information to choose treatments balancing exploitation (e.g., doing things similar to what has produced high yields previously) and exploration (e.g., trying treatments unlike previous ones, with yet-unknown results). Additionally, the techniques can automate experiments on treatments (either in selection of treatments, designs, or robotic or automated planting using the techniques described herein) where it can predict the most effective approach, and automatically perform the planting or other distribution (e.g., of fertilizer, seed, etc.) required of to perform the treatment. Further, like in the other embodiments discussed herein, it could indicate (e.g., raise alarms) to human operators when the results are anomalous, or even tell which features being measured are most useful or when measurements are not useful to characterize the outcomes (e.g., and may possibly be discarded or no longer measured). If the system has types of sensors (e.g., soil moisture, nitrogen levels, sun exposure) that have "costs" (e.g., monetary, time, computation, etc.) or cannot be all collected or activated simultaneously, the feature entropies or convictions could be used to activate or deactivate the sensors to reduce costs while protecting the usefulness of the experimental results.

In some embodiments, processes 100, 400 may include determining (e.g., in response to a request) the surprisal and/or conviction of one or more data elements or aspects of the experiment control system. The surprisal for the one or more experiment control system data elements or aspects may be determined and a determination may be made whether to select or include the one or more experiment control system data elements or aspects in an experiment control computer-based reasoning model based on the determined surprisal and/or conviction. While there are more sets of one or more experiment control system data elements or aspects to assess, the process may return to determine whether more experiment control system data elements or aspects sets should be included. Once there are no more experiment control system data elements or aspects to consider, the process can cause 199 control of the experiment control system using the experiment control computer-based reasoning model.

In some embodiments, process 100 may determine (e.g., in response to a request) synthetic data for use in the experiment control computer-based reasoning model. Based on a model that uses the synthetic data, the process can cause 199 control of an experiment control system using process 400. For example, if the data elements are related to experiment control system actions, then the experiment control computer-based reasoning model trained on that data will control experiment control system. Process 400 proceeds by receiving 410 an experiment control computer-based reasoning model. The process proceeds by receiving 420 a context. The experiment control computer-based reasoning model is then used to determine 430 an action to take. The action is then performed by the control system (e.g., caused by the experiment control computer-based reasoning system). If there are more 450 contexts to consider, then the system returns to receive 410 those contexts and otherwise ceases 460. In such embodiments, the experiment control computer-based reasoning model may be used to control experiment. The chosen actions are then performed by a control system.

Control of Energy Transfer Systems

The processes 100, 400 may also be used for control systems for energy transfer. For example, a building may have numerous energy sources, including solar, wind, grid-based electrical, batteries, on-site generation (e.g., by diesel or gas), etc. and may have many operations it can perform, including manufacturing, computation, temperature control, etc. The techniques herein may be used to control when certain types of energy are used and when certain energy consuming processes are engaged. For example, on sunny days, roof-mounted solar cells may provide enough low-cost power that grid-based electrical power is discontinued during a particular time period while costly manufacturing processes are engaged. On windy, rainy days, the overhead of running solar panels may overshadow the energy provided, but power purchased from a wind-generation farm may be cheap, and only essential energy consuming manufacturing processes and maintenance processes are performed.

In some embodiments, processes 100, 400 may include determining (e.g., in response to a request) the surprisal and/or conviction of one or more data elements or aspects of the energy transfer system. The surprisal for the one or more energy transfer system data elements or aspects may be determined and a determination may be made whether to select or include the one or more energy transfer system data elements or aspects in energy control computer-based reasoning model based on the determined surprisal and/or conviction. While there are more sets of one or more energy transfer system data elements or aspects to assess, the process may return to determine whether more energy transfer system data elements or aspects should be included. Once there are no more energy transfer system data elements or aspects to consider, the process can turn to controlling or causing control of the energy transfer system using the energy control computer-based reasoning model.

In some embodiments, process 100 may determine (e.g., in response to a request) synthetic data for use in the energy transfer computer-based reasoning model. Based on a model that uses the synthetic data, the process can cause 199 control of an energy transfer system using process 400. For example, if the data elements are related to energy transfer system actions, then the energy control computer-based reasoning model trained on that data will control energy transfer system. Process 400 proceeds by receiving 410 an energy control computer-based reasoning model. The process proceeds by receiving 420 a context. The energy control computer-based reasoning model is then used to determine 430 an action to take. The action is then performed by the control system (e.g., caused by the energy control computer-based reasoning system). If there are more 450 contexts to consider, then the system returns to receive 410 those contexts and otherwise ceases 460. In such embodiments, the energy control computer-based reasoning model may be used to control energy. The chosen actions are then performed by a control system.

Health Care Decision Making, Prediction, and Fraud Protection

The processes 100, 400 may also be used for health care decision making, prediction (such as outcome prediction), and fraud detection. For example, some health insurers require pre-approval, pre-certification, pre-authorization, and/or reimbursement for certain types of healthcare procedures, such as healthcare services, administration of drugs, surgery, hospital visits, etc. When analyzing pre-approvals, a health care professional must contact the insurer to obtain their approval prior to administering care, or else the health insurance company may not cover the procedure. Not all services require pre-approval, but many may, and which require it can differ among insurers. Health insurance companies may make determinations including, but not necessarily limited to, whether a procedure is medically necessary, whether it is duplicative, whether it follows currently-accepted medical practice, whether there are anomalies in the care or its procedures, whether there are anomalies or errors with the health care provider or professional, etc.

In some embodiments, a health insurance company may have many "features" of data on which health care pre-approval or reimbursement decisions are determined by human operators. These features may include diagnosis information, type of health insurance, requesting health care professional and facility, frequency and/or last claim of the particular type, etc. The data on previous decisions can be used to train the computer-based reasoning system. The techniques herein may be used to guide the health care decision making process. For example, when the computer-based reasoning model determines, with high conviction or confidence, that a procedure should be pre-approved or reimbursed, it may pre-approve or reimburse the procedure without further review. In some embodiments, when the computer-based reasoning model has low conviction re whether or not to pre-approve a particular procedure, it may flag it for human review (including, e.g., sending it back to the submitting organization for further information). In some embodiments, some or all of the rejections of procedure pre-approval or reimbursement may be flagged for human review.

Further, in some embodiments, the techniques herein can be used to flag trends, anomalies, and/or errors. For example, as explained in detail elsewhere herein, the techniques can be used to determine, for example, when there are anomalies for a request for pre-approval, diagnoses, reimbursement requests, etc. with respect to the computer-based reasoning model trained on prior data. When the anomaly is detected, (e.g., outliers, such as a procedure or prescription has been requested outside the normal range of occurrences per time period, for an individual that is outside the normal range of patients, etc.; and/or what may be referred to as "inliers"—or "contextual outliers," such as too frequently (or rarely) occurring diagnoses, procedures, prescriptions, etc.), the pre-approval, diagnosis, reimbursement request, etc. can be flagged for further review. In some cases, these anomalies could be errors (e.g., and the health professional or facility may be contacted to rectify the error), acceptable anomalies (e.g., patients that need care outside of the normal bounds), or unacceptable anomalies. Additionally, in some embodiments, the techniques herein can be used to determine and flag trends (e.g., for an individual patient, set of patients, health department or facility, region, etc.). The techniques herein may be useful not only because they can automate and/or flag pre-approval decision, reimbursement requests, diagnosis, etc., but also because the trained computer-based reasoning model may contain information (e.g., prior decision) from multiple (e.g., 10s, 100s, 1000s, or more) prior decision makers. Consideration of this large amount of information may be untenable for other approaches, such as human review.

The techniques herein may also be used to predict adverse outcomes in numerous health care contexts. The computer-based reasoning model may be trained with data from previous adverse events, and perhaps from patients that did not have adverse events. The trained computer-based reasoning system can then be used to predict when a current or prospective patient or treatment is likely to cause an adverse event. For example, if a patient arrives at a hospital, the patient's information and condition may be assessed by the computer-based reasoning model using the techniques herein in order to predict whether an adverse event is probable (and the conviction of that determination). As a more specific example, if a septuagenarian with a history of low blood pressure is admitted for monitoring a heart murmur, the techniques herein may flag that patient for further review. In some embodiments, the determination of a potential adverse outcome may be an indication of one or more possible adverse events, such as a complication, having an additional injury, sepsis, increased morbidity, and/or getting additionally sick, etc. Returning to the example of the septuagenarian with a history of low blood pressure, the techniques herein may indicate that, based on previous data, the possibility of a fall in the hospital is unduly high (possibly with high conviction). Such information can allow the hospital to try to ameliorate the situation and attempt to prevent the adverse event before it happens.

In some embodiments, the techniques herein include assisting in diagnosis and/or diagnosing patients based on previous diagnosis data and current patient data. For example, a computer-based reasoning model may be trained with previous patient data and related diagnoses using the techniques herein. The diagnosis computer-based reasoning model may then be used in order to suggest one or more possible diagnoses for the current patient. As a more specific example, a septuagenarian may present with specific attributes, medical history, family history, etc. This information may be used as the input context to the diagnosis computer-based reasoning system, and the diagnosis computer-based reasoning system may determine one or more possible diagnoses for the septuagenarian. In some embodiments, those possible diagnoses may then be assessed by medical professionals. The techniques herein may be used to diagnose any condition, including, but not limited to breast cancer, lung cancer, colon cancer, prostate cancer, bone metastases, coronary artery disease, congenital heart defect, brain pathologies, Alzheimer's disease, and/or diabetic retinopathy.

In some embodiments, the techniques herein may be used to generate synthetic data that mimics, but does not include previous patient data. This synthetic data generation is available for any of the uses of the techniques described herein (manufacturing, image labelling, self-driving vehicles, etc.), and can be particularly important in circumstances where using user data (such as patient health data) in a model may be contrary to policy or regulation. As discussed elsewhere herein, the synthetic data can be generated to directly mimic the characteristics of the patient population, or more surprising data can be generated (e.g., higher surprisal) in order to generate more data in the edge cases, all without a necessity of including actual patient data.

In some embodiments, processes 100, 400 may include determining (e.g., in response to a request) the surprisal and/or conviction of one or more data elements or aspects of the health care system. The surprisal or conviction for the one or more health care system data elements or aspects may be determined and a determination may be made whether to select or include the one or more health care system data elements or aspects in a health care system computer-based reasoning model based on the determined surprisal and/or conviction. While there are more sets of one or more health care system data elements or aspects to assess, the process may return to determine whether more health care system data elements or aspects should be included. Once there are no more health care system data elements or aspects to consider included in the model, the process can turn to controlling or causing control of the health care computer-based reasoning system using the health care system computer-based reasoning model.

In some embodiments, process 100 may determine (e.g., in response to a request) synthetic data for use in the health care system computer-based reasoning model. Based on a model that uses the synthetic data, the process can cause 199 control of a health care computer-based reasoning system using process 400. For example, if the data elements are related to health care system actions, then the health care system computer-based reasoning model trained on that data will control the health care system. Process 400 proceeds by receiving 410 a health care system computer-based reasoning model. The process proceeds by receiving 420 a context. The health care system computer-based reasoning model is then used to determine 430 an action to take. The action is then performed by the control system (e.g., caused by the health care system computer-based reasoning system). If there are more 450 contexts to consider, then the system returns to receive 410 those contexts and otherwise ceases 460. In such embodiments, the health care system computer-based reasoning model may be used to assess health care decisions, predict outcomes, etc. In some embodiments, the chosen action(s) are then performed by a control system.

Financial Decision Making, Prediction, and Fraud Protection

The processes 100 and/or 400 may also be used for financial decision making, prediction (such as outcome or performance prediction), and/or fraud detection. For example, some financial systems require approval, certification, authorization, and/or reimbursement for certain types of financial transactions, such as loans, lines of credit, credit or charge approvals, etc. When analyzing approvals, a financial professional may determine, as one example, whether to approve prior to loaning money. Not all services or transactions require approval, but many may, and which require it can differ among financial system or institutions. Financial transaction companies may make determinations including, but not necessarily limited to, whether a loan appears to be viable, whether a charge is duplicative, whether a loan, charge, etc. follows currently-accepted practice, whether there are anomalies associated with the loan or charge, whether there are anomalies or errors with the any party to the loan, etc.

In some embodiments, a financial transaction company may have many "features" of data on which financial system decisions are determined by human operators. These features may include credit score, type of financial transaction (loan, credit card transaction, etc.), requesting financial system professional and/or facility (e.g., what bank, merchant, or other requestor), frequency and/or last financial transaction of the particular type, etc. The data on previous decisions can be used to train the computer-based reasoning system. The techniques herein may be used to guide the financial system decision making process. For example, when the computer-based reasoning model determines, with high conviction or confidence, that a financial transaction should be approved (e.g., with high conviction), it may the approve the transaction without further review (e.g., by a human operator). In some embodiments, when the computer-based reasoning model has low conviction re whether or not to approve a particular transaction, it may flag it for human review (including, e.g., sending it back to the submitting organization for further information or analysis). In some embodiments, some or all of the rejections of approvals may be flagged for human review.

Further, in some embodiments, the techniques herein can be used to flag trends, anomalies, and/or errors. For example, as explained in detail elsewhere herein, the techniques can be used to determine, for example, when there are anomalies for a request for approval, etc. with respect to the computer-based reasoning model trained on prior data. When the anomaly is detected, (e.g., outliers, such as a transaction has been requested outside the normal range of occurrences per time period, for an individual that is outside the normal range of transactions or approvals, etc.; and/or what may be referred to as "inliers"—or "contextual outliers," such as too frequently (or rarely) occurring types of transactions or approvals, unusual densities or changes to densities of the data, etc.), the approval may be flagged for further review. In some cases, these anomalies could be errors (e.g., and the financial professional or facility may be contacted to rectify the error), acceptable anomalies (e.g., transactions or approvals are legitimate, even if outside of the normal bounds), or unacceptable anomalies. Additionally, in some embodiments, the techniques herein can be used to determine and flag trends (e.g., for an individual customer or financial professional, set of individuals, financial department or facility, systems, etc.). The techniques herein may be useful not only because they can automate and/or flag approval decisions, transactions, etc., but also because the trained computer-based reasoning model may contain information (e.g., prior decision) from multiple (e.g., 10s, 100s, 1000s, or more) prior decision makers. Consideration of this large amount of information may be untenable for other approaches, such as human review.

In some embodiments, the techniques herein may be used to generate synthetic data that mimics, but does not include previous financial data. This synthetic data generation is available for any of the uses of the techniques described herein (manufacturing, image labelling, self-driving vehicles, etc.), and can be particularly important in circumstances where using user data (such as financial data) in a model may be contrary to contract, policy, or regulation. As discussed elsewhere herein, the synthetic data can be generated to directly mimic the characteristics of the financial transactions and/or users, or more surprising data can be generated (e.g., higher surprisal) in order to generate more data in the edge cases, all without including actual financial data.

In some embodiments, processes 100 and/or 400 may include determining (e.g., in response to a request) the surprisal and/or conviction of one or more data elements or aspects of the financial system. The surprisal and/or conviction for the one or more financial system data elements or aspects may be determined and a determination may be made whether to select or include the one or more financial system data elements or aspects in a financial system computer-based reasoning model based on the determined surprisal and/or conviction. While there are more sets of one or more financial system data elements or aspects to assess, the process may return to determine whether more financial system data elements or aspects should be included. Once there are no more financial system data elements or aspects to consider included in the model, the process can turn to controlling or causing control of the financial system computer-based reasoning system using the financial system computer-based reasoning model.

In some embodiments, processes 100 and/or 400 may determine (e.g., in response to a request) synthetic data in the computer-based reasoning model for use in the financial system computer-based reasoning model. Based on a model that uses the synthetic data, the process can cause 199 control of a financial system computer-based reasoning system using process 400. For example, if the data elements are related to financial system actions, then the financial system computer-based reasoning model trained on that data will control the financial system. Process 400 proceeds by receiving 410 a financial system computer-based reasoning model. The process proceeds by receiving 420 a context. The financial system computer-based reasoning model is then used to determine 430 an action to take. The action is then performed by the control system (e.g., caused by the financial system computer-based reasoning system). If there are more 450 contexts to consider, then the system returns to receive 410 those contexts and otherwise ceases 460. In such embodiments, the financial system computer-based reasoning model may be used to assess financial system decisions, predict outcomes, etc. In some embodiments, the chosen action(s) are then performed by a control system.

Real Estate Future Value and Valuation Prediction

The techniques herein may also be used for real estate value estimation. For example, the past values and revenue from real estate ventures may be used as training data. This data may include, in addition to value (e.g., sale or resale value), compound annual growth rate ("CAGR"), zoning, property type (e.g., multifamily, Office, Retail, Industrial), adjacent business and types, asking rent (e.g., rent per square foot ("sqft") for each of Office, Retail, Industrial, etc. and/or per unit (for multifamily buildings), further, this may be based on all properties within the selected property type in a particular geography, for example), capitalization rate (or "cap rate" based on all properties within selected property type in a geography), demand (which may be quantified as occupied stock), market capitalization (e.g., an average modeled price per sqft multiplied by inventory sqft of the given property type and/or in a given geography), net absorption (net change in demand for a rolling 12 month period), net completions (e.g., net change in inventory sqft (Office, Retail, Industrial) or units (Multifamily) for a period of time, such as analyzed data element(s) rolling 12 month period), occupancy (e.g., Occupied sqft/total inventory sqft, 100%–vacancy %, etc.), stock (e.g., inventory square footage (Office, Retail, Industrial) or units (Multifamily), revenue (e.g., revenue generated by renting out or otherwise using a piece of real estate), savings (e.g., tax savings, depreciation), costs (e.g., taxes, insurance, upkeep, payments to property managers, costs for findings tenants, property managers, etc.), geography and geographic location (e.g., views of water, distance to shopping, walking score, proximity to public transportation, distance to highways, proximity to job centers, proximity to local universities, etc.), building characteristics (e.g., date built, date renovated, etc.), property characteristics (e.g., address, city, state, zip, property type, unit type(s), number of units, numbers of bedrooms and bathrooms, square footage(s), lot size(s), assessed value(s), lot value(s), improvements value(s), etc. —possibly including current and past values), real estate markets characteristics (e.g., local year-over-year growth, historical year-over-year growth), broader economic information (e.g., gross domestic product growth, consumer sentiment, economic forecast data), local economic information (e.g., local economic growth, average local salaries and growth, etc.), local demographics (e.g., numbers of families, couples, single people, number of working-age people, numbers or percentage of people with at different education, salary, or savings levels, etc.). The techniques herein may be used to train a real estate computer-based reasoning model based on previous properties. Once the real estate computer-based reasoning system has been trained, then input properties may be analyzed using the real estate reasoning system. Using the techniques herein, the surprisal and/or conviction of the training data can be used to build a real estate computer-based reasoning system that balances the size of the computer-based reasoning model with the information that each additional property record (or set of records) provides to the model.

The techniques herein may be used to predict performance of real estate in the future. For example, based on the variables associated discussed here, that are related, e.g., with various geographies, property types, and markets, the techniques herein may be used to find property types and geographies with the highest expected value or return (e.g., as CAGR). As a more specific example, a model of historical CAGR with asking rent, capitalization rate, demand, net absorption, net completions, occupancy, stock, etc. can be trained. That model may be used, along with more current data, to predict the CAGR of various property types and/or geographies over the coming X years (e.g., 2, 3, 5, or 10 years). Such information may be useful for predicting future value for properties and/or automated decision making.

As another example, using the techniques herein, a batch of available properties may be given as input to the real estate computer-based reasoning systems, and the real estate computer-based reasoning system may be used to determine what properties are likely to be good investments. In some embodiments, the predictions of the computer-based reasoning system may be used to purchase properties. Further, as discussed extensively herein, explanations may be provided for the decisions. Those explanation may be used by a controllable system to make investment decisions and/or by a human operator to review the investment predictions.

In some embodiments, processes 100, 400 may include determining the surprisal and/or conviction of each input real estate data case (or multiple real estate data cases) with respect to the associated labels or of the aspects of the computer-based reasoning model. The surprisal and/or conviction for the one or more real estate data cases may be determined and a determination may be made whether to select or include the one or more real estate data cases in the real estate computer-based reasoning model based on the determined surprisal and/or conviction. While there are more sets of one or more real estate data cases to assess, the process may return to determine whether more real estate data case sets should be included or whether aspects should be included and/or changed in the model. Once there are no more training cases to consider, the process can turn to controlling or causing control of predicting real estate investments information for possible use in purchasing real estate using the real estate computer-based reasoning.

In some embodiments, process 100 may determine (e.g., in response to a request) synthetic data for use in the real estate system computer-based reasoning model. Based on a model that uses the synthetic data, the process can cause 199 control of a real estate system, using, for example, process 400. For example, the training data elements are related to real estate, and the real estate computer-based reasoning model trained on that data will determined investment value(s) for real estate data cases (properties) under consideration. These investment values may be any appropriate value, such as CAGR, monthly income, resale value, income or resale value based on refurbishment or new development, net present value of one or more of the preceding, etc. In some embodiments, process 400 begins by receiving 410 a real estate computer-based reasoning model. The process proceeds by receiving 420 properties under consideration for labeling and/or predicting value(s) for the investment opportunity. The real estate computer-based reasoning model is then used to determine 430 values for the real estate under consideration. The prediction(s) for the real estate is (are) then made 440. If there are more 450 properties to consider, then the system returns to receive 410 data on those properties and otherwise ceases 460. In some embodiments, the real estate computer-based reasoning model may be used to determine which training properties are "closest" (or most similar) to the incoming property or property types and/or geographies predicted as high value. The investment value(s) for the properties under consideration may then be determined based on the "closest" properties or property types and/or geographies.

Cybersecurity

The processes 100, 400 may also be used for cybersecurity analysis. For example, a cybersecurity company or other organization may want to perform threat (or anomalous behavior) analysis, and in particular may want explanation data associated with the threat or anomalous behavior analysis (e.g., why was a particular event, user, etc. identified as a threat or not a threat?). The computer-based reasoning model may be trained using known threats/anomalous behavior and features associated with those threats or anomalous behavior. Data that represents neither a threat nor anomalous behavior (e.g., non-malicious access attempts, non-malicious emails, etc.) may also be used to train the computer-based reasoning model. In some embodiments, when a new entity, user, packet, payload, routing attempt, access attempt, log file, etc. is ready for assessment, the features associated with that new entity, user, packet, payload, routing attempt, access attempt, log file, etc. may be used as input in the trained cybersecurity computer-based reasoning system. The cybersecurity computer-based reasoning system may then determine the likelihood that the entity, user, packet, payload, routing attempt, access attempt, pattern in the log file, etc. is or represents a threat or anomalous behavior. Further, explanation data, such as a conviction measures, training data used to make a decision etc., can be used to mitigate the threat or anomalous behavior and/or be provided to a human operator in order to further assess the potential threat or anomalous behavior.

Any type of cybersecurity threat or anomalous behavior can be analyzed and detected, such as denial of service (DoS), distributed DOS (DDoS), brute-force attacks (e.g., password breach attempts), compromised credentials, malware, insider threats, advanced persistent threats, phishing, spear phishing, etc. and/or anomalous traffic volume, bandwidth use, protocol use, behavior of individuals and/or accounts, logfile pattern, access or routing attempt, etc. In some embodiments the cybersecurity threat is mitigated (e.g., access is suspended, etc.) while the threat is escalated to a human operator. As a more specific example, if an email is received by the email server, the email may be provided as input to the trained cybersecurity computer-based reasoning model. The cybersecurity computer-based reasoning model may indicate that the email is a potential threat (e.g., detecting and then indicating that email includes a link to a universal resource locator that is different from the universal resource location displayed in the text of the email). In some embodiments, this email may be automatically deleted, may be quarantined, and/or flagged for review.

In some embodiments, processes 100, 400 may include determining (e.g., in response to a request) the surprisal and/or conviction of one or more data elements or aspects of the cybersecurity system. The surprisal or conviction for the one or more cybersecurity system data elements or aspects may be determined and a determination may be made whether to select or include the one or more cybersecurity system data elements or aspects in a cybersecurity system computer-based reasoning model based on the determined surprisal and/or conviction. While there are more sets of one or more cybersecurity system data elements or aspects to assess, the process may return to determine whether more cybersecurity system data elements or aspects should be included. Once there are no more cybersecurity system data elements or aspects to consider, the process can turn to controlling or causing control of the cybersecurity computer-based reasoning system using the cybersecurity system computer-based reasoning model.

In some embodiments, process 100 may determine (e.g., in response to a request) synthetic data for use in the cybersecurity system computer-based reasoning model. Based on a model that uses the synthetic data, the process can cause 199 control of a cybersecurity computer-based reasoning system using process 400. For example, if the data elements are related to cybersecurity system actions, then the cybersecurity system computer-based reasoning model trained on that data will control the cybersecurity system (e.g., quarantine, delete, or flag for review, entities, data, network traffic, etc.). Process 400 proceeds by receiving 410 a cybersecurity system computer-based reasoning model. The process proceeds by receiving 420 a context. The cybersecurity system computer-based reasoning model is then used to determine 430 an action to take. The action is then performed by the control system (e.g., caused by the cybersecurity system computer-based reasoning system). If there are more 450 contexts to consider, then the system returns to receive 410 those contexts and otherwise ceases 460. In such embodiments, the cybersecurity system computer-based reasoning model may be used to assess cybersecurity threats, etc. In some embodiments, the chosen action(s) are then performed by a control system.

Example Control Hierarchies

In some embodiments, the technique herein may use a control hierarchy to control systems and/or cause actions to be taken (e.g., as part of controlling or causing 199 control of, or causing 440 performance in FIG. 1 and FIG. 4). There are numerous example control hierarchies and many types of systems to control, and hierarchy for vehicle control is presented below. In some embodiments, only a portion of this control hierarchy is used. It is also possible to add levels to (or remove levels from) the control hierarchy.

An example control hierarchy for controlling a vehicle could be:
  Primitive Layer—Active vehicle abilities (accelerate, decelerate), lateral, elevation, and orientation movements to control basic vehicle navigation
  Behavior Layer—Programmed vehicle behaviors which prioritize received actions and directives and prioritize the behaviors in the action.
  Unit Layer—Receives orders from command layer, issues moves/directives to the behavior layer.
  Command Layers (hierarchical)—Receives orders and gives orders to elements under its command, which may be another command layer or unit layer.

Example Data Cases, Data Elements, Contexts, and Operational Situations

In some embodiments, the cases, data cases, or data elements may include context data and action data in context-action pairs. Various embodiments discussed herein may include any of the context data and actions associated with control of systems. For example, context data may include the state of machines and/or sensors in a manufacturing plant and the actions may include control of parts of the manufacturing system (e.g., speed of certain machinery, turning machinery on or off, signaling something for operator review, etc.). Further, cases may relate to control of a vehicle, control of a smart voice control, health system, real estate system, image labelling systems, or any of the other examples herein. For example, context data may include data related to the operation of the vehicle, including the environment in which it is operating, and the actions taken may be of any granularity. Consider an example of data collected while a driver, Alicia, drives around a city. The collected data could be context and action data where the actions taken can include high-level actions (e.g., drive to next intersection, exit the highway, take surface roads, etc.), mid-level actions (e.g., turn left, turn right, change lanes) and/or low-level actions (e.g., accelerate, decelerate, etc.). The contexts can include any information related to the vehicle (e.g. time until impact with closest object(s), speed, course heading, breaking distances, vehicle weight, etc.), the driver (pupillary dilation, heart rate, attentiveness, hand position, foot position, etc.), the environment (speed limit and other local rules of the road, weather, visibility, road surface information, both transient such as moisture level as well as more permanent, such as pavement levelness, existence of potholes, etc.), traffic (congestion, time to a waypoint, time to destination, availability of alternate routes, etc.), and the like. These input data (e.g., context-action pairs for training a context-based reasoning system or input training contexts with outcome actions for training a machine learning system) can be saved and later used to help control a compatible vehicle in a compatible operational situation. The operational situation of the vehicle may include any relevant data related to the operation of the vehicle. In some embodiments, the operational situation may relate to operation of vehicles by particular individuals, in particular geographies, at particular times, and in particular conditions. For example, the operational situation may refer to a particular driver (e.g., Alicia or Carole). Alicia may be considered a cautious car driver, and Carole a faster driver. As noted above, and in particular, when approaching a stop sign, Carole may coast in and then brake at the last moment, while Alicia may slow down earlier and roll in. As another example of an operational situation, Bob may be considered the "best pilot" for a fleet of helicopters, and therefore his context and actions may be used for controlling self-flying helicopters.

In some embodiments, the operational situation may relate to the environment in which the system is operating. In the vehicle context, the locale may be a geographic area of any size or type, and may be determined by systems that utilize machine learning. For example, an operational situation may be "highway driving" while another is "side street driving". An operational situation may be related to an area, neighborhood, city, region, state, country, etc. For example, one operational situation may relate to driving in Raleigh, N.C. and another may be driving in Pittsburgh, Pa. An operational situation may relate to safe or legal driving speeds. For example, one operational situation may be related to roads with forty-five miles per hour speed limits, and another may relate to turns with a recommended speed of 20 miles per hour. The operational situation may also include aspects of the environment such as road congestion, weather or road conditions, time of day, etc. The operational situation may also include passenger information, such as whether to hurry (e.g., drive faster), whether to drive smoothly, technique for approaching stop signs, red lights, other objects, what relative velocity to take turns, etc. The operational situation may also include cargo information, such as weight, hazardousness, value, fragility of the cargo, temperature sensitivity, handling instructions, etc.

In some embodiments, the context and action may include system maintenance information. In the vehicle context, the context may include information for timing and/or wear-related information for individual or sets of components. For example, the context may include information on the timing and distance since the last change of each fluid, each belt, each tire (and possibly when each was rotated), the electrical system, interior and exterior materials (such as exterior paint, interior cushions, passenger entertainment systems, etc.), communication systems, sensors (such as speed sensors, tire pressure monitors, fuel gauges, compasses, global positioning systems (GPS), RADARs, LiDARs, cameras, barometers, thermal sensors, accelerometers, strain gauges, noise/sound measurement systems, etc.), the engine(s), structural components of the vehicle (wings, blades, struts, shocks, frame, hull, etc.), and the like. The action taken may include inspection, preventative maintenance, and/or a failure of any of these components. As discussed elsewhere herein, having context and actions related to maintenance may allow the techniques to predict when issues will occur with future vehicles and/or suggest maintenance. For example, the context of an automobile may include the distance traveled since the timing belt was last replaced. The action associated with the context may include inspection, preventative replacement, and/or failure of the timing belt. Further, as described elsewhere herein, the contexts and actions may be collected for multiple operators and/or vehicles. As such, the timing of inspection, preventative maintenance and/or failure for multiple automobiles may be determined and later used for predictions and messaging.

Causing performance of an identified action can include causing a control system to control the target system based on the identified action. In the self-controlled vehicle context, this may include sending a signal to a real car, to a simulator of a car, to a system or device in communication with either, etc. Further, the action to be caused can be simulated/predicted without showing graphics, etc. For example, the techniques might cause performance of actions in the manner that includes, determining what action would be take, and determining whether that result would be anomalous, and performing the techniques herein based on the determination that such state would be anomalous based on that determination, all without actually generating the graphics and other characteristics needed for displaying the results needed in a graphical simulator (e.g., a graphical simulator might be similar to a computer game).

Numerous other examples of cases, data, contexts and actions are discussed herein.

Example of Certainty and Conviction

In some embodiments, certainty score is a broad term encompassing it plain and ordinary meaning, including the certainty (e.g., as a certainty function) that a particular set of data fits a model, the confidence that a particular set of data conforms to the model, or the importance of a feature or case with regard to the model. Determining a certainty score for a particular case can be accomplished by removing the particular case from the case-based or computer-based reasoning model and determining the conviction score of the particular case based on an entropy measure associated with adding that particular case back into the model. Any appropriate entropy measure, variance, confidence, and/or related method can be used for making this determination, such as the ones described herein. In some embodiments, certainty or conviction is determined by the expected information gain of adding the case to the model divided by the actual information gain of adding the case. For example, in some embodiments, certainty or conviction may be determined based on Shannon Entropy, Renyi entropy, Hartley entropy, min entropy, Collision entropy, Renyi divergence, diversity index, Simpson index, Gini coefficient, Kullback-Leibler divergence, Fisher information, Jensen-Shannon divergence, Symmetrised divergence. In some embodiments, certainty scores are conviction scores and are determined by calculating the entropy, comparing the ratio of entropies, and/or the like.

In some embodiments, the conviction of a case may be computed based on looking only at the K nearest neighbors when adding the feature back into the model. The K nearest neighbors can be determined using any appropriate distance measure, including use of Euclidean distance, 1-Kronecker delta, Minkowski distance, Damerau-Levenshtein distance, and/or any other distance measure, metric, pseudometric, premetric, index, or the like. In some embodiments, influence functions are used to determine the importance of a feature or case.

In some embodiments, determining certainty or conviction scores can include determining the conviction of each feature of multiple features of the cases in the computer-based reasoning model. In this context the word "feature" is being used to describe a data field as across all or some of the cases in the computer-based reasoning model. The word "field," in this context, is being used to describe the value of an individual case for a particular feature. For example, a feature for a theoretical computer-based reasoning model for self-driving cars may be "speed". The field value for a particular case for the feature of speed may be the actual speed, such as thirty-five miles per hour.

Returning to determining certainty or conviction scores, in some embodiments, determining the conviction of a feature may be accomplished by removing the feature from the computer-based reasoning model and determining a conviction score of the feature based on an entropy measure associated with adding the feature back into the computer-based reasoning model. For example, returning to the example above, removing a speed feature from a self-driving car computer-based reasoning model could include removing all of the speed values (e.g., fields) from cases from the computer-based reasoning model and determining the conviction of adding speed back into the computer-based reasoning model. The entropy measure used to determine the conviction score for the feature can be any appropriate entropy measure, such as those discussed herein. In some embodiments, the conviction of a feature may also be computed based on looking only at the K nearest neighbors when adding the feature back into the model. In some embodiments, the feature is not actually removed, but only temporarily excluded.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
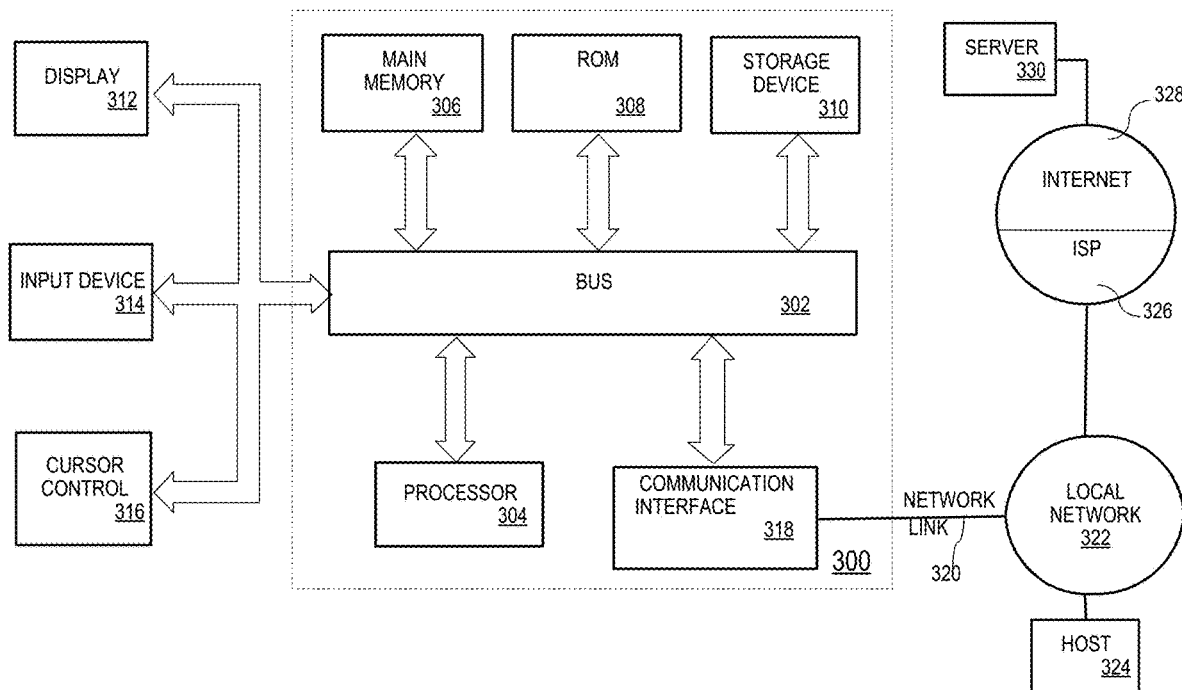
FIG. 3 is a block diagram of example hardware for synthetic data generation in computer-based reasoning systems.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as an OLED, LED or cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. The input device 314 may also have multiple input modalities, such as multiple 2-axes controllers, and/or input buttons or keyboard. This allows a user to input along more than two dimensions simultaneously and/or control the input of more than one type of action.

Computer system 300 may implement the techniques described herein using customized hard-wired logic, one or more ASICs or FPGAs, firmware and/or program logic which in combination with the computer system causes or programs computer system 300 to be a special-purpose machine. According to some embodiments, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium storing instructions which, when executed by one or more computing devices, cause the one or more computing devices to perform a process of:
    receiving a request for generation of synthetic data based on a set of training data cases that meets a dataset quality threshold;
    repeatedly determining new a synthetic data case based on a set of one or more focal training data cases to generate a set of two or more synthetic data cases, wherein each set of one or more focal cases are determined from the set of training data cases;
    determining a dataset quality metric for the set of two or more synthetic data cases based on the set of training data cases and the set of two or more synthetic data cases, wherein the dataset quality metric is determined based at least in part on at least one dataset privacy metric, which quantifies the likelihood of identification of private data in the set of training data cases from the set of two or more synthetic data cases;
    when the dataset quality metric for particular synthetic data cases in the set of two or more synthetic data cases does not meet a dataset quality threshold, taking corrective action for the particular synthetic data cases in the set of two or more synthetic data cases to produce a new set of two or more synthetic data cases to use as the set of two or more synthetic data cases;
    when the dataset quality metric for the set of two or more synthetic data cases meets the dataset quality threshold, causing control of a controllable system using the set of two or more synthetic data cases.

2. The non-transitory computer readable medium of claim 1, wherein taking corrective action comprises one or more of:
    modifying one or more of the particular synthetic data cases to produce a new set of two or more synthetic data cases to use as the set of two or more synthetic data cases;
    deleting one or more of the particular synthetic data cases to produce a new set of two or more synthetic data cases to use as the set of two or more synthetic data cases; and
    replacing one or more of the particular synthetic data cases to produce a new set of two or more synthetic data cases to use as the set of two or more synthetic data cases.

3. The non-transitory computer readable medium of claim 1, wherein determining at least one dataset quality metric comprises determining a dataset privacy metric based at least in part on a data element distance comparison metric, and when the dataset privacy metric for particular synthetic data cases in the set of two or more synthetic data cases does not meet the dataset quality threshold, taking corrective action for the particular synthetic data cases in set of two or more synthetic data cases to produce a new set of two or more synthetic data cases to use as the set of two or more synthetic data cases.

4. The non-transitory computer readable medium of claim 1, wherein determining at least one dataset quality metric comprises determining a dataset privacy metric based at least in part on a minimum distance ratio metric, and when the dataset privacy metric for particular synthetic data cases in the set of two or more synthetic data cases does not meet the dataset quality threshold, taking corrective action for the particular synthetic data cases in set of two or more synthetic data cases to produce a new set of two or more synthetic data cases to use as the set of two or more synthetic data cases.

5. The non-transitory computer readable medium of claim 1, wherein determining at least one dataset quality metric comprises determining a dataset privacy metric based at least in part on a minimum distance percentile metric, and when the dataset privacy metric for particular synthetic data cases in the set of two or more synthetic data cases does not meet the dataset quality threshold, taking corrective action for the particular synthetic data cases in set of two or more synthetic data cases to produce a new set of two or more synthetic data cases to use as the set of two or more synthetic data cases.

6. The non-transitory computer readable medium of claim 1, wherein determining at least one dataset quality metric comprises determining a dataset privacy metric based at least in part on a minimum expected distance to actual distance metric, and when the dataset privacy metric for particular synthetic data cases in the set of two or more synthetic data cases does not meet the dataset quality threshold, taking corrective action for the particular synthetic data cases in set of two or more synthetic data cases to produce a new set of two or more synthetic data cases to use as the set of two or more synthetic data cases.

7. The non-transitory computer readable medium of claim 1, wherein determining at least one dataset quality metric comprises determining a dataset privacy metric based at least in part on a probability-based minimum distance metric, and when the dataset privacy metric for particular synthetic data cases in the set of two or more synthetic data cases does not meet the dataset quality threshold, taking corrective action for the particular synthetic data cases in set of two or more synthetic data cases to produce a new set of two or more synthetic data cases to use as the set of two or more synthetic data cases.

8. A system for executing instructions, wherein said instructions are instructions which, when executed by one or more computing devices, cause performance of a process including:
    receiving a request for generation of synthetic data based on a set of training data cases that meets a dataset quality threshold;
    repeatedly determining new a synthetic data case based on a set of one or more focal training data cases to generate a set of two or more synthetic data cases, wherein each set of one or more focal cases are determined from the set of training data cases;
    determining a dataset quality metric for the set of two or more synthetic data cases based on the set of training data cases and the set of two or more synthetic data cases, wherein the dataset quality metric is determined based at least in part on:
  at least one statistical quality metric that compares statistical properties of the set of training data cases and the set of two or more synthetic data cases;
  at least one model comparison metric that quantifies machine learning model properties and performance of the set of training data cases and the set of two or more synthetic data cases;
  at least one dataset privacy metric, which quantifies the likelihood of identification of private data in the set of training data cases from the set of two or more synthetic data cases;
when the dataset quality metric for particular synthetic data cases in the set of two or more synthetic data cases does not meet a dataset quality threshold, taking corrective action for the particular synthetic data cases in the set of two or more synthetic data cases to produce a new set of two or more synthetic data cases to use as the set of two or more synthetic data cases;
when the dataset quality metric for the set of two or more synthetic data cases meets the dataset quality threshold, causing control of a controllable system using the set of two or more synthetic data cases.

9. The system of claim 8, wherein taking corrective action comprises one or more of:
  modifying one or more of the particular synthetic data cases to produce a new set of two or more synthetic data cases to use as the set of two or more synthetic data cases;
  deleting one or more of the particular synthetic data cases to produce a new set of two or more synthetic data cases to use as the set of two or more synthetic data cases; and
  replacing one or more of the particular synthetic data cases to produce a new set of two or more synthetic data cases to use as the set of two or more synthetic data cases.

10. The system of claim 8, wherein determining at least one dataset quality metric comprises determining a dataset privacy metric based at least in part on a data element distance comparison metric, and when the dataset privacy metric for particular synthetic data cases in the set of two or more synthetic data cases does not meet the dataset quality threshold, taking corrective action for the particular synthetic data cases in set of two or more synthetic data cases to produce a new set of two or more synthetic data cases to use as the set of two or more synthetic data cases.

11. The system of claim 8, wherein determining at least one dataset quality metric comprises determining a dataset privacy metric based at least in part on a minimum distance ratio metric, and when the dataset privacy metric for particular synthetic data cases in the set of two or more synthetic data cases does not meet the dataset quality threshold, taking corrective action for the particular synthetic data cases in set of two or more synthetic data cases to produce a new set of two or more synthetic data cases to use as the set of two or more synthetic data cases.

12. The system of claim 8, wherein determining at least one dataset quality metric comprises determining a dataset privacy metric based at least in part on a minimum distance percentile metric, and when the dataset privacy metric for particular synthetic data cases in the set of two or more synthetic data cases does not meet the dataset quality threshold, taking corrective action for the particular synthetic data cases in set of two or more synthetic data cases to produce a new set of two or more synthetic data cases to use as the set of two or more synthetic data cases.

13. The system of claim 8, wherein determining at least one dataset quality metric comprises determining a dataset privacy metric based at least in part on a minimum expected distance to actual distance metric, and when the dataset privacy metric for particular synthetic data cases in the set of two or more synthetic data cases does not meet the dataset quality threshold, taking corrective action for the particular synthetic data cases in set of two or more synthetic data cases to produce a new set of two or more synthetic data cases to use as the set of two or more synthetic data cases.

14. The system of claim 8, wherein determining at least one dataset quality metric comprises determining a dataset privacy metric based at least in part on a probability-based minimum distance metric, and when the dataset privacy metric for particular synthetic data cases in the set of two or more synthetic data cases does not meet the dataset quality threshold, taking corrective action for the particular synthetic data cases in set of two or more synthetic data cases to produce a new set of two or more synthetic data cases to use as the set of two or more synthetic data cases.

15. A method comprising:
  receiving a request for generation of synthetic data based on a set of training data cases that meets a dataset quality threshold;
  repeatedly determining new a synthetic data case based on a set of one or more focal training data cases to generate a set of two or more synthetic data cases, wherein each set of one or more focal cases are determined from the set of training data cases;
  determining a dataset quality metric for the set of two or more synthetic data cases based on the set of training data cases and the set of two or more synthetic data cases, wherein the dataset quality metric is determined based at least in part on one or more of:
    at least one statistical quality metric that compares statistical properties of the set of training data cases and the set of two or more synthetic data cases;
    at least one model comparison metric that quantifies machine learning model properties and performance of the set of training data cases and the set of two or more synthetic data cases;
    at least one dataset privacy metric, which quantifies the likelihood of identification of private data in the set of training data cases from the set of two or more synthetic data cases;
  when the dataset quality metric for particular synthetic data cases in the set of two or more synthetic data cases does not meet a dataset quality threshold, taking corrective action for the particular synthetic data cases in the set of two or more synthetic data cases to produce a new set of two or more synthetic data cases to use as the set of two or more synthetic data cases;
  when the dataset quality metric for the set of two or more synthetic data cases meets the dataset quality threshold, causing control of a controllable system using the set of two or more synthetic data cases.

16. The method of claim 15, wherein taking corrective action comprises one or more of:
  modifying one or more of the particular synthetic data cases to produce a new set of two or more synthetic data cases to use as the set of two or more synthetic data cases;

deleting one or more of the particular synthetic data cases to produce a new set of two or more synthetic data cases to use as the set of two or more synthetic data cases; and replacing one or more of the particular synthetic data cases to produce a new set of two or more synthetic data cases to use as the set of two or more synthetic data cases.

17. The method of claim 15, wherein determining at least one dataset quality metric comprises determining a dataset privacy metric based at least in part on a data element distance comparison metric, and when the dataset privacy metric for particular synthetic data cases in the set of two or more synthetic data cases does not meet the dataset quality threshold, taking corrective action for the particular synthetic data cases in set of two or more synthetic data cases to produce a new set of two or more synthetic data cases to use as the set of two or more synthetic data cases.

18. The method of claim 15, wherein determining at least one dataset quality metric comprises determining a dataset privacy metric based at least in part on a minimum distance ratio metric, and when the dataset privacy metric for particular synthetic data cases in the set of two or more synthetic data cases does not meet the dataset quality threshold, taking corrective action for the particular synthetic data cases in set of two or more synthetic data cases to produce a new set of two or more synthetic data cases to use as the set of two or more synthetic data cases.

19. The method of claim 15, wherein determining at least one dataset quality metric comprises determining a dataset privacy metric based at least in part on a minimum distance percentile metric, and when the dataset privacy metric for particular synthetic data cases in the set of two or more synthetic data cases does not meet the dataset quality threshold, taking corrective action for the particular synthetic data cases in set of two or more synthetic data cases to produce a new set of two or more synthetic data cases to use as the set of two or more synthetic data cases.

20. The method of claim 15, wherein determining at least one dataset quality metric comprises determining a dataset privacy metric based at least in part on a minimum expected distance to actual distance metric, and when the dataset privacy metric for particular synthetic data cases in the set of two or more synthetic data cases does not meet the dataset quality threshold, taking corrective action for the particular synthetic data cases in set of two or more synthetic data cases to produce a new set of two or more synthetic data cases to use as the set of two or more synthetic data cases.

* * * * *